(12) United States Patent
Fang et al.

(10) Patent No.: US 11,368,729 B2
(45) Date of Patent: Jun. 21, 2022

(54) MEDIA DATA TRANSMISSION METHOD, CLIENT, AND SERVER

(71) Applicant: Huawei Technologies Co., Ltd., Shenzhen (CN)

(72) Inventors: Huameng Fang, Shenzhen (CN); Yuqun Fan, Shenzhen (CN); Peiyun Di, Shenzhen (CN); Ye-Kui Wang, San Diego, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/164,838

(22) Filed: Feb. 1, 2021

(65) Prior Publication Data

US 2021/0160552 A1 May 27, 2021

Related U.S. Application Data

(63) Continuation of application No. PCT/CN2019/072735, filed on Jan. 22, 2019.

(30) Foreign Application Priority Data

Aug. 2, 2018 (CN) .......................... 201810873806.X
Sep. 11, 2018 (WO) .................. PCT/CN2018/10536

(51) Int. Cl.
*H04N 21/2343* (2011.01)
*H04N 21/258* (2011.01)
(Continued)

(52) U.S. Cl.
CPC ... *H04N 21/2343* (2013.01); *H04N 21/25866* (2013.01); *H04N 21/435* (2013.01); *H04N 21/4402* (2013.01)

(58) Field of Classification Search
CPC ......... H04N 21/2343; H04N 21/25866; H04N 21/435; H04N 21/4402; H04N 21/816;
(Continued)

(56) References Cited

U.S. PATENT DOCUMENTS

2013/0182078 A1 7/2013 Kitaura
2013/0278755 A1* 10/2013 Stams ..................... G06T 7/602
(Continued)

FOREIGN PATENT DOCUMENTS

CN 105491353 A 4/2016
CN 105898254 A 8/2016
(Continued)

OTHER PUBLICATIONS

Schulzrinne et al., "RTP: A Transport Protocol for Real-Time Applications," RFC3550, total 89 pages (Jul. 2003).
(Continued)

*Primary Examiner* — Anthony Bantamoi
(74) *Attorney, Agent, or Firm* — Leydig, Voit & Mayer, Ltd.

(57) ABSTRACT

A media data transmission method and an apparatus. The method includes: A client sends first information to a server. The client receives video data packets that correspond to a second target video picture and that are sent by the server. The first information is used to indicate spatial information of a region in which a first target video picture is located, and the first target video picture includes a video picture within a current viewport. The second target video picture includes the first target video picture, at least one of the video data packets corresponding to the second target video picture carries at least one piece of second information, and the
(Continued)

second information is used to indicate spatial information of a region in which the second target video picture is located.

19 Claims, 11 Drawing Sheets

(51) Int. Cl.
*H04N 21/435* (2011.01)
*H04N 21/4402* (2011.01)

(58) Field of Classification Search
CPC ............ H04N 21/235; H04N 21/4728; H04N 21/64322; H04N 21/6437; H04N 21/262; H04N 21/4508
See application file for complete search history.

(56) References Cited

U.S. PATENT DOCUMENTS

| | | | |
|---|---|---|---|
| 2018/0160160 A1* | 6/2018 | Swaminathan | H04N 21/2662 |
| 2018/0167613 A1* | 6/2018 | Hannuksela | H04N 19/115 |
| 2019/0191203 A1* | 6/2019 | Asbun | H04N 21/2668 |

FOREIGN PATENT DOCUMENTS

| | | | |
|---|---|---|---|
| CN | 105915937 A | | 8/2016 |
| CN | 105916060 A | | 8/2016 |
| CN | 106791888 A | | 5/2017 |
| CN | 107318008 A | | 11/2017 |
| CN | 107395984 A | | 11/2017 |
| CN | 107396077 A | | 11/2017 |
| CN | 107995493 A | | 5/2018 |
| CN | 108040260 A | | 5/2018 |
| CN | 108111832 A | | 6/2018 |
| WO | 2018067680 A1 | | 4/2018 |
| WO | 2018108104 A1 | | 6/2018 |

OTHER PUBLICATIONS

"Information technology—Coded representation of immersive media (MPEGI)—Part 2: Omnidirectional media format," ISO/IEC FDIS 23090-2:201x (E) ISO/IEC JTC 1/SC 29/WG 11, total 182 pages (Apr. 26, 2018).

* cited by examiner

MEDIA DATA TRANSMISSION METHOD, CLIENT, AND SERVER

CROSS-REFERENCE TO RELATED APPLICATIONS

This application is a continuation of International Application No. PCT/CN2019/072735, filed on Jan. 22, 2019, which claims priority to Chinese Patent Application No. 201810873806.X, filed on Aug. 2, 2018 and claims priority to the International Application No. PCT/CN2018/105036, filed on Sep. 11, 2018. The disclosures of the aforementioned applications are hereby incorporated by reference in their entireties.

TECHNICAL FIELD

This application relates to the field of streaming media transmission technologies, and, to a media data transmission method, a client, and a server.

BACKGROUND

The ISO/IEC 23090-2 standard specification is also referred to as the OMAF (omnidirectional media format) standard specification. The specification defines a media application format that can implement omnidirectional media presentation in an application. Omnidirectional media mainly refers to a panoramic video (a 360-degree video) and associated audio. In the OMAF specification, a list of projection methods that can be used to convert a spherical video into a two-dimensional video is specified. Further, how to store, in an ISO base media file format (ISOBMFF), omnidirectional media and metadata associated with the media is described. Also specified are how to encapsulate omnidirectional media data in a streaming media system and how to transmit the omnidirectional media data by using transmission methods such as dynamic adaptive streaming over hypertext transfer protocol (HTTP) (dynamic adaptive streaming over HTTP, DASH) transmission or dynamic adaptive streaming transmission that is specified in the ISO/IEC 23009-1 standard.

The fast development of virtual reality (VR) technologies is accompanied with wider application of panoramic videos. According to VR technologies based on 360-degree panoramic videos, a stimulation environment can be created to bring dynamic three-dimension interactive visual experience to a user. A panoramic video includes a series of panoramic pictures, and the panoramic pictures may be generated through computer rendering, or may be generated by merging, by using a merging algorithm, video pictures that are shot by a plurality of cameras from a plurality of different angles. Generally, when watching a panoramic video, a user watches only a small part of the entire panoramic picture at each moment. When the panoramic picture is being provided for the user by using a remote server, only content to be watched at each moment may be transmitted for the user, to save transmission bandwidth.

When a user watches a panoramic video by using a client, only a small part of an entire panoramic picture is watched at each moment. Therefore, when video data is provided for the user by using a remote server, only video content that can be watched by the user at a current viewport may be transmitted to the client, to save transmission bandwidth. When a viewport of the user changes, video content within a changed field of viewport needs to be transmitted to the client. Therefore, how to transmit video content within a field of the current viewport of the user to the user in a timely manner and reduce a transmission delay as much as possible is a problem that needs to be resolved.

SUMMARY

This application provides a media data transmission method, a client, and a server, to reduce a transmission delay for transmitting video content within a field of a current viewport to the client.

According to a first aspect, a media data transmission method is provided. The method includes: A client sends first information to a server. The first information is used to indicate spatial information of a region in which a first target video picture is located. The client receives video data packets that correspond to a second target video picture and that are sent by the server. At least one of the video data packets corresponding to the second target video picture jointly carries second information, and the second information is used to indicate spatial information of a region in which the second target video picture is located The second target video picture includes the first target video picture, and the first target video picture includes a video picture within a current viewport.

It should be understood that, that the second target video picture includes the first target video picture may mean that the second target video picture includes only the first target video picture, or may mean that the second target video picture further includes another video picture in addition to the first target video picture. In other words, in addition to sending the first target video picture to the client, the server may further send, to the client, a video picture other than the first target video picture.

The current viewport may be a viewport at which a user watches a video by using the client. When the user's viewport changes, the client may send new first information to the server, to request to obtain video content within a new viewport.

It should be understood that, that at least one of the video data packets jointly carries second information may mean that each of the at least one video data packet carries at least a part of the second information, and the at least one video data packet carries the entire second information.

In addition, the at least one video data packet may further carry bitstream data while jointly carrying the second information. The bitstream data herein is data obtained after a video picture is encoded.

It should be understood that the region in which the first target video picture is located may be a region that is just covered or occupied by the first target video picture. In other words, all video pictures in the region in which the first target video picture is located belong to the first target video picture, and all video pictures in the first target video picture are in the region in which the first target video picture is located. Similarly, the second target video picture also meets a similar requirement.

The spatial information of the region in which the first target video picture is located may also be referred to as regional spatial information of the region in which the first target video picture is located, and the spatial information of the region in which the first target video picture is located is used to indicate a spatial range or a spatial position of the region in which the first target video picture is located.

The spatial position of the region in which the first target video picture is located may be with respect to a coordinate system, and the coordinate system may be a three-dimensional coordinate system or a two-dimensional coordinate system. For example, when a three-dimensional coordinate system is used to represent the spatial position of the region in which the first target video picture is located, the origin of the three-dimensional coordinate system may be the center point of a panoramic video picture, the top-left corner of a panoramic video picture, or another point in a fixed position of a panoramic video picture. In addition, a spatial position of the first target video picture may also be a position of the first target video picture in a region in which the panoramic video picture is located (in this case, a coordinate system other than the three-dimensional coordinate system, for example, a spherical coordinate system, may be used to represent the spatial position of the first target video picture).

Optionally, the first target video picture or the second target video picture is a part of the panoramic video picture.

In this application, after obtaining the first information that represents the video content within the current viewport, the server can send, to the client in real time, position-related information of the second target video picture and the second target video picture that are required by the user, so that a delay for obtaining the position-related information of the second target video picture by the client can be reduced.

The second information is directly carried in the video data packets corresponding to the first target video picture, so that the client can obtain the position-related information of the second target video picture more quickly, thereby reducing a transmission delay.

In some implementations of the first aspect, the first target video picture is the video picture within the current viewport, and the first information includes spatial information of the current viewport.

The spatial information of the current viewport may also be referred to as regional spatial information of the current viewport.

When the first information includes the spatial information of the current viewport, the client has directly reported the spatial information of the current viewport by using the first information. The server determines the second target video picture based on the spatial information of the current viewport, and directly carries spatial position information of a target video picture in the video data packets of the second target video picture that are sent to the client.

Optionally, the spatial information of the current viewport includes spatial position information of the current viewport.

Optionally, the spatial position information of the current viewport is any one type of the following information: spherical coordinate values of the center point of a sphere region corresponding to the current viewport, spherical coordinate values of the top-left corner of the sphere region corresponding to the current viewport, planar coordinate values of the center point of a plane region corresponding to the current viewport, and planar coordinate values of the top-left corner of the plane region corresponding to the current viewport.

Optionally, the spherical coordinate values of the center point of the sphere region corresponding to the current viewport are (X, Y, Z). X corresponds to an azimuth or a yaw of spherical coordinates, Y corresponds to a pitch or elevation angle (pitch or elevation) of the spherical coordinates, and Z corresponds to a tilt angle (tilt) or a roll angle (roll) of the spherical coordinates.

Optionally, the planar coordinate values of the center point of the plane region corresponding to the current viewport are (X, Y). X and Y respectively represent a horizontal coordinate and a vertical coordinate, in a two-dimensional rectangular coordinate system, of the center point of the plane region corresponding to the current viewport.

Optionally, the planar coordinate values of the top-left corner of the plane region corresponding to the current viewport are (X, Y). X and Y respectively represent a horizontal coordinate and a vertical coordinate, in the two-dimensional rectangular coordinate system, of the top-left corner of the plane region corresponding to the current viewport.

It should be understood that the spatial position information of the current viewport may alternatively be two-dimensional coordinate values of the top-right corner, the bottom-left corner, the bottom-right corner, or any specified position of the plane region corresponding to the current viewport.

In some implementations of the first aspect, the first target video picture is the video picture within the current viewport, and the first information includes viewport information of the current viewport.

Optionally, the viewport information of the current viewport includes spatial information of the current viewport and viewpoint information of the current viewport.

The spatial information of the current viewport includes at least one of: viewport direction information of the current viewport, viewport direction change speed information of the current viewport, and viewport coverage range information of the current viewport.

The viewpoint information of the current viewport includes at least one of: viewpoint position information of the current viewport, viewpoint displacement speed information of the current viewport, and acceleration information of a viewpoint displacement speed of the current viewport.

In some implementations of the first aspect, the method further includes: The client sends first viewpoint information to the server. The first viewpoint information is used to indicate a current viewpoint at which the current viewport is located.

The client reports, to the server, viewpoint information of a viewpoint at which the current viewport is located, so that the client can obtain, from the server, a video picture that matches the current viewpoint, thereby improving a watching effect of the user.

The first viewpoint information may include a plurality of types of information of the current viewpoint.

Optionally, the first viewpoint information includes at least one of: spatial position information of the current viewpoint, position change speed information of the current viewpoint, and acceleration information of a position change speed of the current viewpoint.

When the client reports the spatial position information of the current viewpoint to the server, the server may be enabled to deliver, to the client, a video picture in a viewport region corresponding to the current viewpoint, so that the client obtains the video picture that matches the current viewpoint.

After the client reports the position change speed information of the current viewpoint and/or the acceleration information of the position change speed of the current viewpoint to the server, the server can perform, based on the information reported by the client, predictive rendering, pre-fetching, and delivery on the video picture to be sent to the client. In this way, a delay for transmitting the video picture to the client can be reduced, thereby improving user experience.

The spatial position information of the current viewpoint may be coordinate values of a position of the current viewpoint. The spatial position information of the current viewpoint may be coordinate values in a three-dimensional coordinate system (which may be any type of three-dimensional coordinate system such as a Cartesian coordinate system or a spherical coordinate system).

The position of the current viewpoint (which may also be referred to as the position in which the current viewpoint is located) may be a changeable position, and the position change speed information of the current viewpoint is information used to indicate a position change speed of the current viewpoint.

In some implementations of the first aspect, the first viewpoint information includes spatial position information of the current viewpoint. The method further includes: The client sends first indication information to the server. The first indication information includes a first identifier. A value of the first identifier is used to indicate whether the spatial position information of the current viewpoint is relative spatial position information or absolute spatial position information. When the first identifier is a first value, the spatial position information of the current viewpoint is relative spatial position information; or when the first identifier is a second value, the spatial position information of the current viewpoint is absolute spatial position information.

When the spatial position information of the current viewpoint is the relative spatial position information, the spatial position information of the current viewpoint may be relative position information of the current viewpoint relative to a start viewpoint, a specified viewpoint, or a previous viewpoint. When the spatial position information of the current viewpoint is the absolute position information, the spatial position information of the current viewpoint may be relative position information of the current viewpoint relative to a specific fixed coordinate system (where the fixed coordinate system may be a preset fixed coordinate system).

It should be understood that the first identifier may correspond to one bit, or may correspond to a plurality of bits. When the first identifier corresponds to one bit, the first value and the second value may be 0 and 1 respectively, or the first value and the second value may be 1 and 0 respectively.

The spatial information of the current viewport may include only viewport direction information of the current viewport, or may include both viewport direction information of the current viewport and position information of a viewpoint at which the current viewport is located.

The first indication information may be carried in a real-time transport control protocol RTCP source description report sent by the client to the server.

In this application, when the spatial position information of the current viewpoint is the relative spatial position information, an amount of data included in the reported spatial information of the current viewpoint can be reduced, thereby reducing resource overheads.

To better indicate composition of the spatial information of the current viewport, the client may send indication information to the server, to indicate the composition of the spatial information of the current viewport. In this way, the server can accurately obtain the spatial information of the current viewport.

In some implementations of the first aspect, the method further includes: The client sends second indication information to the server. The second indication information includes a second identifier, a value of the second identifier is used to indicate composition of the spatial information of the current viewport, and the value of the second identifier is used to indicate at least one of the following cases: When the second identifier is a third value, the spatial information of the current viewport includes viewport direction information of the current viewport; and when the second identifier is a fourth value, the spatial information of the current viewport includes the viewport direction information of the current viewport and position information of a viewpoint at which the current viewport is located.

Optionally, when the second identifier is a fifth value, the spatial information of the current viewport includes the viewport direction information of the current viewport, the position information of the viewpoint at which the current viewport is located, and viewport size information of the current viewport (which may also be referred to as viewport coverage range size information of the current viewport).

It should be understood that the spatial information of the current viewport may include at least one of: the viewport direction information of the current viewport, the position information of the viewpoint at which the current viewport is located, and the viewport size information of the current viewport. A different value of the second identifier may indicate any combination of information included in the spatial information of the current viewport.

For example, the second identifier may be the following different values to indicate the composition of the spatial information of the current viewport.

When the value of the second identifier is X, it indicates that the spatial information of the current viewport includes the viewport size information of the current viewport;

when the value of the second identifier is Y, it indicates that the spatial information of the current viewport includes the position information of the viewpoint at which the current viewport is located;

when the value of the second identifier is Z, it indicates that the spatial information of the current viewport includes the position information of the viewpoint at which the current viewport is located and the viewport size information of the current viewport; or when the value of the second identifier is W, it indicates that the spatial information of the current viewport includes the position information of the viewpoint at which the current viewport is located, the viewport size information of the current viewport, and the viewport direction information of the current viewport.

Optionally, the second indication information may be carried in the real-time transport control protocol RTCP source description report sent by the client to the server.

In some implementations of the first aspect, the client sends third indication information to the server. The third indication information includes a third identifier, and a value of the third identifier is used to indicate whether the viewport direction information of the current viewport is relative or absolute viewport direction information or relative direction information. When (the value of) the third identifier is a sixth value, the viewport direction information of the current viewport is absolute viewport direction information; or when (the value of) the third identifier is a seventh value, the viewport direction information of the current viewport is relative viewport direction information.

The third indication information may be carried in the real-time transport control protocol RTCP source description report sent by the client to the server.

When the viewport direction information of the current viewport is absolute viewport direction information, the viewport direction information of the current viewport may be viewport direction information relative to a specific fixed coordinate system; or when the viewport direction information of the current viewport is relative viewport direction information, the viewport direction information of the current viewport may be viewport direction information relative to a specific previous viewport direction (for example, a deflection angle relative to a previous viewport direction, or a deflection angle relative to an initial viewport direction).

In this application, when a viewport direction of the current viewport is the relative viewport direction information, an amount of data included in the viewport direction information of the current viewport can be reduced, thereby reducing resource overheads.

Optionally, the first information, the first viewpoint information, the first indication information, and the second indication information are all carried in the real-time transport control protocol RTCP source description report sent by the client to the server.

The first information, the first viewpoint information, the first indication information, and the second indication information are all carried in the RTCP source description report, so that the plurality of pieces of information can be sent to the server by sending the RTCP source description report once, thereby reducing a quantity of interactions between the client and the server, and reducing resource overheads.

In some implementations of the first aspect, the spatial information of the current viewport includes region range information of the current viewport.

Optionally, the region range information of the current viewport includes an azimuth range (or a yaw range) and a pitch or elevation range of the current viewport.

Optionally, the region range information of the current viewport includes the width and the height of a two-dimensional viewport region corresponding to the current viewport.

It should be understood that the region range of the user's viewport may alternatively be fixed. In this case, the client needs to report the region range information of the viewport to the server only once. When the user's viewport changes again, the user needs to report only position information of a current viewport, without repeatedly reporting the region range information.

It should be understood that the region range information of the current viewport may be used to indicate a range of a region in which the current viewport is located.

Optionally, the region range information of the current viewport includes an azimuth range (or a yaw range) and a pitch or elevation range of the region in which the current viewport is located.

Optionally, the region range information of the current viewport includes the width and the height of a plane region corresponding to the current viewport.

For example, the region range information of the current viewport is H and V. H and V respectively represent an azimuth range and a pitch or elevation range of VR spherical coordinates.

In some implementations of the first aspect, a panoramic video picture includes at least two sub-regions obtained by dividing the panoramic video picture, the current viewport covers at least one sub-region, the first information is used to indicate the sub-region covered by the current viewport, and the sub-region covered by the current viewport is merged to obtain the region in which the first target video picture is located.

When the first information indicates the sub-region covered by the current viewport, the client directly reports, to the server, information about the sub-region covered by the current viewport. In this way, after receiving the first information, the server can directly obtain the information about the sub-region covered by the current viewport, and directly determine the second target video picture based on the information, so that complexity of determining the second target video picture by the server can be reduced.

It should be understood that, in this application, sub-regions covered by the current viewport include both a sub-region completely covered by the region in which the current viewport is located and a sub-region partially covered by the region in which the current viewport is located.

For example, if the region in which the current viewport is located completely covers a sub-region 1, and covers a part of a sub-region 2 and a part of a sub-region 3, the sub-regions covered by the current viewport includes the sub-region 1, the sub-region 2, and the sub-region 3.

In some implementations of the first aspect, the second information includes the spatial information of the region in which the second target video picture is located.

In some implementations of the first aspect, the spatial information of the region in which the second target video picture is located includes spatial position information of the region in which the second target video picture is located. The spatial position information of the region in which the second target video picture is located is at least one type of the following information: spherical coordinate values of the center point of a sphere region corresponding to the second target video picture, spherical coordinate values of the top-left corner of the sphere region corresponding to the second target video picture, planar coordinate values of the center point of a plane region corresponding to the second target video picture, and planar coordinate values of the top-left corner of the plane region corresponding to the second target video picture.

For example, the spherical coordinate values of the center point of the sphere region corresponding to the second target video picture are (X, Y, Z). X corresponds to an azimuth or a yaw of spherical coordinates, Y corresponds to a pitch or elevation angle (pitch or elevation) of the spherical coordinates, and Z corresponds to a tilt angle (tilt) or a roll angle (roll) of the spherical coordinates.

Optionally, the spherical coordinate values of the center point of the sphere region corresponding to the second target video picture are (X, Y). X and Y respectively represent a horizontal coordinate and a vertical coordinate, in a two-dimensional rectangular coordinate system, of the center point of the sphere region corresponding to the second target video picture.

Optionally, the spherical coordinate values of the top-left corner of the sphere region corresponding to the second target video picture are (X, Y). X and Y respectively represent a horizontal coordinate and a vertical coordinate, in the two-dimensional rectangular coordinate system, of the top-left corner of the sphere region corresponding to the second target video picture.

It should be understood that the spatial position information of the region in which the second target video picture is located may alternatively be two-dimensional coordinate values of the top-right corner, the bottom-left corner, the bottom-right corner, or any specified position of the sphere region corresponding to the second target video picture.

In some implementations of the first aspect, the spatial information of the second target video picture includes region range information of the second target video picture.

Optionally, the region range information of the second target video picture includes an azimuth range (or a yaw range) and a pitch or elevation range of the region in which the second target video picture is located.

For example, the region range information of the second target video picture is H and V. H and V respectively represent an azimuth range and a pitch or elevation range of VR spherical coordinates.

Optionally, the region range information of the second target video picture includes the width and the height of a two-dimensional video picture corresponding to the second target video picture.

In some implementations of the first aspect, the panoramic video picture includes the at least two sub-regions obtained by dividing the panoramic video picture, the current viewport covers the at least one sub-region, the second information is used to indicate a sub-region covered by the second target video picture, and the sub-region covered by the second target video picture is merged to obtain the region in which the second target video picture is located.

In some implementations of the first aspect, the second information includes at least one piece of third information, each of the at least one video data packet carries third information, the at least one video data packet jointly carries the at least one piece of third information, and third information carried in any one of the at least one video data packet is used to indicate a sub-region to which a video picture corresponding to the any one video data packet belongs.

For example, the second target video picture corresponds to 100 video data packets, and the second information includes only one piece of third information. In this case, the third information may be carried only in the first video data packet or the 100th data packet. Alternatively, when the second information includes 10 pieces of third information, the 10 pieces of third information may be carried in any 10 video data packets in the 100 video data packets.

In some implementations of the first aspect, the at least one video data packet includes a video data packet that carries a viewport identifier.

It should be understood that any one of the at least one video data packet may carry the viewport identifier, and the viewport identifier is used to indicate a viewport at which a video picture corresponding to the any one video data packet is located. In addition, the viewport identifier may be bound to a sub-region ID. In other words, there is a correspondence between the sub-region ID and the viewport identifier.

The client can distinguish, based on viewport identifiers, between video data packets corresponding to different viewports, so as to merge video pictures corresponding to video data packets within a specific viewport.

Optionally, the second target video picture is the same as the first target video picture.

When the second target video picture includes only the first target video picture, bandwidth occupied for transmitting the target video picture can be reduced.

In some implementations of the first aspect, the second target video picture further includes a video picture other than the first target video picture.

When the second target video picture includes the video picture other than the first target video picture, the client may further display a video picture beyond the current viewport while displaying the video picture within the current viewport, so that the user can also watch the video picture when turning suddenly (or changing a watching viewport suddenly).

Optionally, the first target video picture further includes a panoramic video picture.

Thanks to transmission of the panoramic video picture, not only the first video picture corresponding to the current viewport but also the panoramic video picture can be displayed, so that the user can also watch the video picture when turning suddenly (for example, turning around suddenly). In this way, a specific buffering function can be implemented, and the video content can be watched when the user turns suddenly.

Optionally, picture quality of the panoramic video picture is lower than picture quality of the first target video picture.

When a panoramic video picture needs to be transmitted, a data transmission amount can be reduced to some extent by transmitting a panoramic video picture with comparatively low picture quality, thereby reducing bandwidth occupation.

In some implementations of the first aspect, the method further includes: The client receives a description file sent by the server. The description file carries first viewport information or second viewport information, the first viewport information is used to indicate a maximum region range that is of a viewport and that is supported by the server, and the second viewport information is used to indicate a region range of an initial viewport.

The client can obtain, by receiving the description file, an initial viewport of the server or a field of viewport supported by the server, so that after subsequently receiving video data packets, the client merges, based on an initial viewport and a field of viewport supported by the client, video pictures obtained through decoding.

It should be understood that a range, indicated by the first information, of the region in which the first target video picture is located shall fall within the maximum region range that is of the viewport, that is supported by the server, and that is indicated by the first viewport information.

It should be understood that, when the description file carries the second viewport information, the client may present a video picture based on the initial viewport after the client is powered on. Then, the client may present a video picture based on the current viewport of the user.

For example, the client presents a video picture within a viewport 1 (where the viewport 1 is the initial viewport) after the client is powered on, but the user wants to watch a video picture within a viewport 2 (where the viewport 2 is the current viewport of the user). Then, the client may switch from the viewport 1 to the viewport 2, and presents the video picture within the viewport 2.

The initial viewport herein may be a preset viewport. The video picture within the initial viewport is first presented each time the client is powered on.

Optionally, region range information of the initial viewport includes an azimuth range (or a yaw range) and a pitch or elevation range of the region in which the initial viewport is located.

Optionally, the region range information of the initial viewport includes the width and the height of a plane region corresponding to the initial viewport.

For example, the region range information of the initial viewport is H and V. H and V respectively represent an azimuth range and a pitch or elevation range of VR spherical coordinates.

Optionally, in addition to indicating the region range of the initial viewport, the second viewport information may be further used to indicate a region range of a default viewport.

It should be understood that, when the server does not obtain viewport information of the client or information about the video picture corresponding to the current viewport, the server can directly send a video picture within the default viewport to the client, so that the client presents the video picture within a field of the default viewport.

Optionally, before the client receives the description file sent by the server, the method further includes: The client sends a video description command to the server.

Sending the video description command to the server can trigger the server to send the description file to the client.

In some implementations of the first aspect, when the description file carries the second viewport information, the description file further carries third viewport information. The third viewport information is further used to indicate a spatial position of the initial viewport.

Optionally, the third viewport information is any one type of the following information: spherical coordinate values of the center point of a sphere region corresponding to the initial viewport, spherical coordinate values of the top-left corner of the sphere region corresponding to the initial viewport, planar coordinate values of the center point of a plane region corresponding to the initial viewport, and planar coordinate values of the top-left corner of the plane region corresponding to the initial viewport.

Optionally, the spherical coordinate values of the center point of the sphere region corresponding to the initial viewport are (X, Y, Z). X corresponds to an azimuth or a yaw of spherical coordinates, Y corresponds to a pitch or elevation angle (pitch or elevation) of the spherical coordinates, and Z corresponds to a tilt angle (tilt) or a roll angle (roll) of the spherical coordinates.

Optionally, the planar coordinate values of the center point of the plane region corresponding to the initial viewport are (X, Y). X and Y respectively represent a horizontal coordinate and a vertical coordinate, in a two-dimensional rectangular coordinate system, of the center point of the plane region corresponding to the initial viewport.

Optionally, the planar coordinate values of the top-left corner of the plane region corresponding to the initial viewport are (X, Y). X and Y respectively represent a horizontal coordinate and a vertical coordinate, in the two-dimensional rectangular coordinate system, of the top-left corner of the plane region corresponding to the initial viewport.

In some implementations of the first aspect, the method further includes: The client receives a description file sent by the server. The panoramic video picture includes the at least two sub-regions obtained by dividing the panoramic video picture, the description file carries sub-region description information of each sub-region, each sub-region is a sub-region in a region in which the panoramic video picture is located, and the sub-region description information includes spatial information of a sub-region.

The description file carries the sub-region description information, so that the client can merge video pictures based on information about sub-regions after receiving video data packets corresponding to a target video picture, to obtain video content within the current viewport.

Optionally, before the client receives the description file sent by the server, the method further includes: The client sends a video description command to the server.

Sending the video description command to the server can trigger the server to send the description file to the client.

In some implementations of the first aspect, the sub-region description information includes spatial information of each sub-region on a plane, the sub-region description information further includes mapping-type information of a video picture in each sub-region, and spatial information of each sub-region on a sphere is determined based on the mapping-type information and the spatial information of the sub-region on the plane.

Optionally, the spatial information of the sub-region on the plane is two-dimensional coordinate values of the center point of the sub-region or two-dimensional coordinate values of the top-left corner of the sub-region.

Optionally, the two-dimensional coordinate values of the center point of the sub-region are (X, Y). X and Y respectively represent a horizontal coordinate and a vertical coordinate, in a two-dimensional rectangular coordinate system, of the center point of a two-dimensional viewport region.

Optionally, the two-dimensional coordinate values of the top-left corner of the sub-region are (X, Y). X and Y respectively represent a horizontal coordinate and a vertical coordinate, in the two-dimensional rectangular coordinate system, of the top-left corner of the two-dimensional viewport region.

It should be understood that the spatial information of the sub-region on the plane may alternatively be two-dimensional coordinate values of the top-right corner, the bottom-left corner, the bottom-right corner, or any specified position of the sub-region.

Optionally, a mapping type indicated by the mapping-type information is any one of a longitude and latitude map, a hexahedron, and an octahedron.

In some implementations of the first aspect, the sub-region description information includes spatial information of each sub-region on a sphere, and the sub-region description information further includes shape information of each sub-region.

Optionally, the spatial information of the sub-region on the sphere may be represented by using an azimuth, a pitch or elevation angle, and a tilt angle of the center point of the sub-region.

The shape information of the sub-region may indicate a shape type of the sub-region. For example, the shape type of the sub-region may be enclosed by four great circles, or may be enclosed by two great circles and one small circle.

In some implementations of the first aspect, three-dimensional spatial information of the sub-region includes a mapping type of a sub-regional picture, shape information of the sub-region, angle information of the sub-region, and region range information of the sub-region.

Optionally, the description file further includes panoramic bitstream description information, and the panoramic bitstream description information includes mapping-type information and size information of the panoramic video picture.

Optionally, the first information is carried in a real-time transport control protocol (RTCP) source description report sent by the client to the server, and video data packets in a target video picture are streaming media real-time transmit protocol (RTP) video data packets.

Optionally, the first information and the second information are information in a user-defined TLV format.

Optionally, the first information and the second information are information in a signal format defined for a multimedia transmission application in MPEG Media Transport (MMT).

Information used to transmit the current viewpoint or the current viewpoint between the client and the server may be information in a real-time transport protocol, may be information in a user-defined TLV format, or may be information in a format defined in MMT and that is used for a multimedia transmission application.

In some implementations of the first aspect, the at least one video data packet jointly carries second viewpoint information, and the second viewpoint information is used to indicate a viewpoint corresponding to the second target video picture.

Optionally, the second viewpoint information may include a plurality of types of information about the viewpoint corresponding to the second target video picture.

It is assumed that the viewpoint corresponding to the second target video picture is a first viewpoint. In this case, the second viewpoint information may include at least one of: spatial position information of the first viewpoint, position change speed information of the first viewpoint, and acceleration information of a position change speed of the first viewpoint.

The second viewpoint information is similar to the first viewpoint information, and may also include the information included in the first viewpoint information. For details, refer to related content of the first viewpoint information. Details are not described herein again.

A viewpoint corresponding to a to-be-displayed target video picture is carried in a video data packet, so that the client can present the to-be-displayed target video picture based on the corresponding viewpoint, thereby improving a displaying effect.

According to a second aspect, a media data transmission method is provided. The method includes: A client receives a description file sent by a server. The description file carries session description information of at least two sessions, the at least two sessions are sessions between the client and the server, each of the at least two sessions is used to transmit bitstream data of a sub-regional picture corresponding to the session, the session description information includes spatial information of a sub-region corresponding to the bitstream data of the sub-regional picture that is transmitted by using each session, the sub-region is obtained by dividing a region in which a panoramic video picture is located, and the sub-regional picture is a video picture in a sub-region. The client sends first information to the server. The first information is used to indicate a session corresponding to a sub-region covered by a current viewport, and the first information is determined based on the current viewport and the session description information. The client receives bitstream data of a target video picture, where the bitstream data of the target video picture is sent by the server. The target video picture includes a picture in the sub-region to which the current viewport belongs.

The current viewport may be a viewport at which a user watches a video by using the client. When the user's viewport changes, the client may send new first information to the server, to request to obtain video content within a new viewport.

Optionally, the target video picture is a panoramic video picture.

It should be understood that the at least two sessions are all or some of sessions set up between the client and the server.

In this application, before the target video picture transmitted by the server is received, a description file that carries session description information of each session is obtained, so that the client processes the received bitstream data of the target video picture based on the description information.

It should be understood that each of the at least two sessions may be used to transmit the bitstream data of the sub-regional picture corresponding to the session, or one session may be used to transmit video pictures in all sub-regions.

For example, the target video picture includes video pictures in a sub-region 1 (which corresponds to a session 1), a sub-region 2 (which corresponds to a session 2), and a sub-region 3 (which corresponds to a session 3). In this case, the session 1, the session 2, and the session 3 may be used to transmit the video pictures in the sub-region 1, the sub-region 2, and the sub-region 3, respectively. Alternatively, one session (any one of the session 1, the session 2, and the session 3) may be used to transmit the video pictures in the sub-region 1 to the sub-region 3.

In some implementations of the second aspect, that the client receives bitstream data of a target video picture, where the bitstream data of the target video picture is sent by the server includes: The client receives, by using the session corresponding to the sub-region covered by the current viewport, bitstream data of a sub-regional picture covered by the current viewport, to obtain the bitstream data of the target video picture.

In some implementations of the second aspect, regional spatial information of the sub-region is spatial information of the sub-region in a plane region, and the session description information further includes mapping-type information of the bitstream data of the sub-regional picture transmitted by using each session.

In some implementations of the second aspect, regional spatial information of the sub-region is spatial information of the sub-region in a sphere region, and the session description information further includes shape information of the sub-region corresponding to the bitstream data of the sub-regional picture transmitted by using each session.

In some implementations of the second aspect, the first information is carried in a real-time transport control protocol RTCP source description report sent by the client to the server.

In some implementations of the second aspect, the first information is information in a TLV format.

It should be understood that the foregoing limitations on and explanations for corresponding content in the implementations of the first aspect are also applicable to the implementations of the second aspect.

According to a third aspect, a media data transmission method is provided. The method includes: A server receives first information sent by a client. The first information is used to indicate a spatial position of a region in which a first target video picture is located, and the first target video picture includes a video picture within a current viewport. The server determines a second target video picture based on the first information. The second target video picture includes the first target video picture. The server sends, to the client, video data packets corresponding to the second target video picture. At least one of the video data packets corresponding to the second target video picture jointly carries second information, and the second information is used to indicate spatial information of a region in which the second target video picture is located.

In this application, after obtaining the first information that represents video content within the current viewport, the server can send, to the client in real time, position-related information of the second target video picture and the second target video picture that are required by a user, so that a delay for obtaining the position-related information of the second target video picture by the client can be reduced.

In some implementations of the third aspect, the first target video picture is the video picture within the current viewport, and the first information includes spatial information of the current viewport.

In some implementations of the third aspect, the first target video picture is the video picture within the current viewport, and the first information includes viewport information of the current viewport.

Optionally, the viewport information of the current viewport includes spatial information of the current viewport and viewpoint information of the current viewport.

The spatial information of the current viewport includes at least one of: viewport direction information of the current viewport, viewport direction change speed information of the current viewport, and viewport coverage range information of the current viewport.

The viewpoint information of the current viewport includes at least one of: viewpoint position information of the current viewport, viewpoint displacement speed information of the current viewport, and acceleration information of a viewpoint displacement speed of the current viewport.

In some implementations of the third aspect, the method further includes: The server receives first viewpoint information sent by the client. The first viewpoint information is used to indicate a current viewpoint at which the current viewport is located.

The server receives viewpoint information that is of the viewpoint at which the current viewport is located and that is reported by the client. In this way, the server can transmit, to the client, a video picture that matches the current viewpoint, thereby improving a watching effect of the user.

The first viewpoint information may include a plurality of types of information of the current viewpoint.

Optionally, the first viewpoint information includes at least one of: spatial position information of the current viewpoint, position change speed information of the current viewpoint, and acceleration information of a position change speed of the current viewpoint.

When obtaining the spatial position information of the current viewpoint reported by the client, the server can obtain a video picture in a viewport region corresponding to the current viewpoint, and deliver the video picture to the client, so that the client can obtain the video picture that matches the current viewpoint, thereby improving a displaying effect.

After the server obtains the position change speed information of the current viewpoint and/or the acceleration information of the position change speed of the current viewpoint reported by the client, the server can perform, based on the reported information, predictive rendering, pre-fetching, and delivery on the video picture to be sent to the client. In this way, a delay for transmitting the video picture to the client can be reduced, thereby improving user experience.

Optionally, the spatial position information of the current viewpoint may be coordinate values of a position of the current viewpoint. The spatial position information of the current viewpoint may be coordinate values in a three-dimensional coordinate system (which may be any type of three-dimensional coordinate system such as a Cartesian coordinate system or a spherical coordinate system).

The position of the current viewpoint (which may also be referred to as the position in which the current viewpoint is located) may be a changeable position, and the position change speed information of the current viewpoint is information used to indicate a position change speed of the current viewpoint.

In some implementations of the third aspect, the first viewpoint information includes spatial position information of the current viewpoint. The method further includes: The server receives first indication information sent by the client. The first indication information includes a first identifier. A value of the first identifier is used to indicate whether the spatial position information of the current viewpoint is relative spatial position information or absolute spatial position information. When the first identifier is a first value, the spatial position information of the current viewpoint is relative spatial position information; or when the first identifier is a second value, the spatial position information of the current viewpoint is absolute spatial position information.

When the spatial position information of the current viewpoint is the relative spatial position information, the spatial position information of the current viewpoint may be relative position information of the current viewpoint relative to a start viewpoint, a specified viewpoint, or a previous viewpoint.

The spatial information of the current viewport may include only viewport direction information of the current viewport, or may include both viewport direction information of the current viewport and position information of a viewpoint at which the current viewport is located.

To better indicate composition of the spatial information of the current viewport, the client may send indication information to the server, to indicate the composition of the spatial information of the current viewport. In this way, the server can accurately obtain the spatial information of the current viewport.

In some implementations of the third aspect, the method further includes: The server receives second indication information sent by the client. The second indication information includes a second identifier, a value of the second identifier is used to indicate composition of the spatial information of the current viewport, and the value of the second identifier is used to indicate at least one of the following cases: When the second identifier is a third value, the spatial information of the current viewport includes viewport direction information of the current viewport; and when the second identifier is a fourth value, the spatial information of the current viewport includes the viewport direction information of the current viewport and position information of a viewpoint at which the current viewport is located.

Optionally, when the second identifier is a fifth value, the spatial information of the current viewport includes the viewport direction information of the current viewport, the position information of the viewpoint at which the current viewport is located, and viewport size information of the current viewport.

It should be understood that the spatial information of the current viewport may include at least one of: the viewport direction information of the current viewport, the position information of the viewpoint at which the current viewport is located, and the viewport size information of the current viewport. A different value of the second identifier may indicate any combination of information included in the spatial information of the current viewport.

Optionally, the first information, the first viewpoint information, the first indication information, and the second indication information are all carried in a real-time transport control protocol RTCP source description report sent by the client to the server.

The first information, the first viewpoint information, the first indication information, and the second indication information are all carried in the RTCP source description report, so that the plurality of pieces of information sent by the client can be obtained by receiving the RTCP source description report once, thereby reducing a quantity of interactions between the client and the server, and reducing resource overheads.

In some implementations of the third aspect, a panoramic video picture includes at least two sub-regions obtained by dividing the panoramic video picture, the current viewport covers at least one sub-region, the first information is used to indicate the sub-region covered by the current viewport, and the sub-region covered by the current viewport is merged to obtain the region in which the first target video picture is located.

In some implementations of the third aspect, the second information includes the spatial information of the region in which the second target video picture is located.

In some implementations of the third aspect, the panoramic video picture includes the at least two sub-regions obtained by dividing the panoramic video picture, the current viewport covers the at least one sub-region, the second information is used to indicate a sub-region covered by the second target video picture, and the sub-region covered by the second target video picture is merged to obtain the region in which the second target video picture is located.

In some implementations of the third aspect, the second information includes at least one piece of third information, each of the at least one video data packet carries third information, the at least one video data packet jointly carries the at least one piece of third information, and third information carried in any one of the at least one video data packet is used to indicate a sub-region to which a video picture corresponding to the any one video data packet belongs.

In some implementations of the third aspect, the at least one video data packet includes a video data packet that carries a viewport identifier.

In some implementations of the third aspect, the method further includes: The server sends a description file to the client. The description file carries first viewport information or second viewport information, the first viewport information is used to indicate a maximum region range that is of a viewport and that is supported by the server, and the second viewport information is used to indicate a region range of an initial viewport.

In some implementations of the third aspect, when the description file carries the second viewport information, the description file further carries third viewport information. The third viewport information is further used to indicate a spatial position of the initial viewport.

In some implementations of the third aspect, the method further includes: The server sends a description file to the client. The panoramic video picture includes the at least two sub-regions obtained by dividing the panoramic video picture, the description file carries sub-region description information of each sub-region, and the sub-region description information includes spatial information of a sub-region.

In some implementations of the third aspect, the sub-region description information includes spatial information of each sub-region on a plane, the sub-region description information further includes mapping-type information of a video picture in each sub-region, and spatial information of each sub-region on a sphere is determined based on the mapping-type information and the spatial information of the sub-region on the plane.

In some implementations of the third aspect, the sub-region description information includes spatial information of each sub-region on a sphere, and the sub-region description information further includes shape information of each sub-region.

The foregoing limitations on and explanations for corresponding content in the implementations of the first aspect are also applicable to the implementations of the third aspect.

In some implementations of the third aspect, the at least one video data packet jointly carries second viewpoint information, and the second viewpoint information is used to indicate a viewpoint corresponding to the second target video picture.

Optionally, the second viewpoint information may include a plurality of types of information about the viewpoint corresponding to the second target video picture.

It is assumed that the viewpoint corresponding to the second target video picture is a first viewpoint. In this case, the second viewpoint information may include at least one of: spatial position information of the first viewpoint, position change speed information of the first viewpoint, and acceleration information of a position change speed of the first viewpoint.

The server carries, in a video data packet, a viewpoint corresponding to a to-be-displayed target video picture, so that the client can present the to-be-displayed target video picture based on the corresponding viewpoint, thereby improving a displaying effect.

According to a fourth aspect, a media data transmission method is provided. The method includes: A server sends a description file to a client. The description file carries session description information of at least two sessions, the at least two sessions are sessions between the client and the server, each of the at least two sessions is used to transmit bitstream data of a sub-regional picture corresponding to the session, the session description information includes spatial information of a sub-region corresponding to the bitstream data of the sub-regional picture that is transmitted by using each session, the sub-region is obtained by dividing a region in which a panoramic video picture is located, and the sub-regional picture is a video picture in a sub-region. The server receives first information sent by the client. The first information is used to indicate a session corresponding to a sub-region covered by a current viewport, and the first information is determined based on the current viewport and the session description information. The server sends bitstream data of a target video picture to the client. The target video picture includes a video picture in the sub-region covered by the current viewport.

It should be understood that the at least two sessions are all or some of sessions set up between the client and the server.

In this application, before transmitting the target video picture to the client, the server transmits, to the client, the description file that carries the session description information of each session, so that the client processes the received bitstream data of the target video picture based on the description information.

In some implementations of the fourth aspect, that the client receives bitstream data of a target video picture, where the bitstream data of the target video picture is sent by the server includes: The client receives, by using the session corresponding to the sub-region covered by the current viewport, bitstream data of a sub-regional picture covered by the current viewport, to obtain the bitstream data of the target video picture.

In some implementations of the fourth aspect, regional spatial information of the sub-region is spatial information of the sub-region in a plane region, and the session description information further includes mapping-type information of the bitstream data of the sub-regional picture transmitted by using each session.

In some implementations of the fourth aspect, regional spatial information of the sub-region is spatial information of the sub-region in a sphere region, and the session description information further includes shape information of the sub-region corresponding to the bitstream data of the sub-regional picture transmitted by using each session.

In some implementations of the fourth aspect, the first information is carried in a real-time transport control protocol RTCP source description report sent by the client to the server.

In some implementations of the fourth aspect, the first information is information in a TLV format.

It should be understood that the foregoing limitations on and explanations for corresponding content in the implementations of the first aspect are also applicable to the implementations of the fourth aspect.

According to a fifth aspect, a client is provided. The client includes modules configured to perform the method in any implementation of the first aspect or the second aspect.

It should be understood that the client is a device capable of presenting a video picture to a user.

According to a sixth aspect, a server is provided. The server includes modules configured to perform the method in any implementation of the third aspect or the fourth aspect.

It should be understood that the server is a device capable of storing a video picture, and the server may provide a video picture for a client, so that the client can present the video picture to a user.

According to a seventh aspect, a client is provided, including a non-volatile memory and a processor that are coupled to each other. The processor is configured to invoke program code stored in the memory, to perform some or all steps of the method in any implementation of the first aspect or the second aspect.

According to an eighth aspect, a server is provided, including a non-volatile memory and a processor that are coupled to each other. The processor is configured to invoke program code stored in the memory, to perform some or all steps of the method in any implementation of the third aspect or the fourth aspect.

According to a ninth aspect, a computer-readable storage medium is provided. The computer-readable storage medium stores program code, and the program code includes instructions used to perform some or all steps of the method in any implementation of the first aspect, the second aspect, the third aspect, and the fourth aspect.

According to a tenth aspect, a computer program product is provided. When the computer program product runs on a computer, the computer is enabled to execute instructions used to perform some or all steps of the method in any implementation of the first aspect, the second aspect, the third aspect, and the fourth aspect.

DESCRIPTION OF EMBODIMENTS

The following describes technical solutions of this application with reference to the accompanying drawings.

Figure 1:
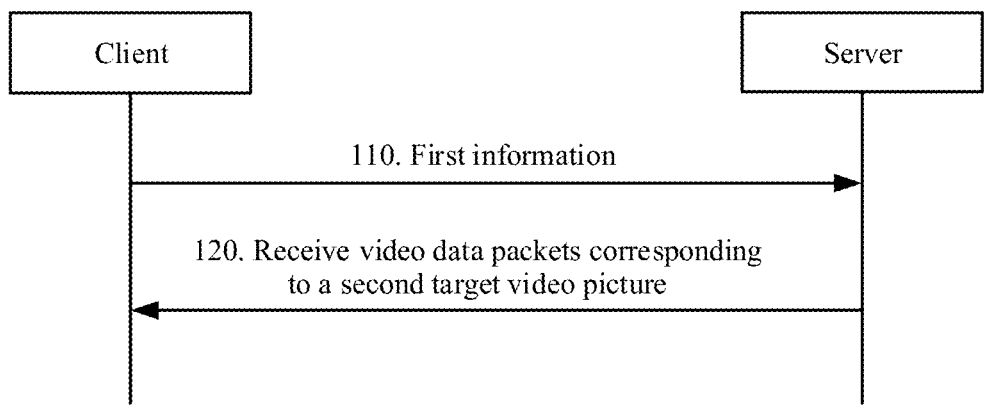
FIG. 1 is a schematic flowchart of a media data transmission method according to an embodiment of this application.

FIG. 1 is a schematic flowchart of a media data transmission method according to an embodiment of this application. The method shown in FIG. 1 may be performed by a client.

The client may be a program that is located on a terminal device and that provides a video playing service for a customer. The terminal device may be a device that has a function of playing a panoramic video, for example, a VR device.

The method shown in FIG. 1 includes step 110 and step 120. The following describes in detail step 110 and step 120.

110. The client sends first information to a server.

The first information is information used to determine video content within a current viewport. The first information may be used to indicate spatial information of a region in which a first target video picture is located, and the first target video picture includes a video picture within the current viewport.

Optionally, the current viewport may be a viewport at which a user watches a video by using the client.

By sending the first information to the server, the client requests to obtain the video content within the current viewport. If the user's viewport changes, the client sends new first information to the server to request to obtain video content within a new viewport.

120. The client receives video data packets that correspond to a second target video picture and that are sent by the server.

At least one of the video data packets corresponding to the second target video picture jointly carries second information, the second information is used to indicate spatial information of a region in which the second target video picture is located, and the second target video picture includes the first target video picture.

It should be understood that, that the second target video picture includes the first target video picture may mean that the second target video picture includes only the first target video picture, or may mean that the second target video picture further includes another video picture in addition to the first target video picture. In other words, in addition to sending the first target video picture to the client, the server may further send, to the client, a video picture other than the first target video picture.

It should be understood that, that at least one of the video data packets jointly carries second information may mean that each of the at least one video data packet carries at least a part of the second information, and the at least one video data packet carries the entire second information.

In addition, the at least one video data packet may further carry bitstream data while jointly carrying the second information. The bitstream data herein is data obtained after a video picture is encoded.

It should be understood that the region in which the first target video picture is located may be a region that is just covered or occupied by the first target video picture. In other words, all video pictures in the region in which the first target video picture is located belong to the first target video picture, and all video pictures in the first target video picture are in the region in which the first target video picture is located. Similarly, the second target video picture also meets a similar requirement.

The spatial information of the region in which the first target video picture is located may also be referred to as regional spatial information of the region in which the first target video picture is located, and the spatial information of the region in which the first target video picture is located is used to indicate a spatial range or a spatial position of the region in which the first target video picture is located.

The spatial position of the region in which the first target video picture is located may be with respect to a coordinate system, and the coordinate system may be a three-dimensional coordinate system or a two-dimensional coordinate system. For example, when a three-dimensional coordinate system is used to represent the spatial position of the region in which the first target video picture is located, the origin of the three-dimensional coordinate system may be the center point of a panoramic video picture, the top-left corner of a panoramic video picture, or another point in a fixed position of a panoramic video picture. In addition, a spatial position of the first target video picture may also be a position of the first target video picture in a region in which the panoramic video picture is located (in this case, a coordinate system other than the three-dimensional coordinate system, for example, a spherical coordinate system, may be used to represent the spatial position of the first target video picture).

Optionally, the second information includes at least one piece of third information, each of the at least one video data packet carries third information, the at least one video data packet jointly carries the at least one piece of third information, and third information carried in any one of the at least one video data packet is used to indicate a sub-region to which a video picture corresponding to the any one video data packet belongs.

For example, the second target video picture corresponds to 100 video data packets, and the second information includes only one piece of third information. In this case, the third information may be carried only in the first video data packet or the 100th data packet. Alternatively, when the second information includes 10 pieces of third information, the 10 pieces of third information may be carried in any 10 video data packets in the 100 video data packets.

In this application, after obtaining related information that represents the video content within the current viewport, the server can send, to the client in real time, position-related information of a target video picture and the target video picture that are required by the user, so that a delay for obtaining the position-related information of the target video picture by the client can be reduced.

Optionally, in an embodiment, the first target video picture is the video picture within the current viewport, and the first information includes spatial information of the current viewport.

The spatial information of the current viewport may also be referred to as regional spatial information of the current viewport.

When the first information includes the spatial information of the current viewport, the client has directly reported the spatial information of the current viewport by using the first information. The server determines the second target video picture based on the spatial information of the current viewport, and directly carries spatial position information of a target video picture in the video data packets of the second target video picture that are sent to the client.

Optionally, the spatial information of the current viewport includes spatial position information of the current viewport.

The spatial position information of the current viewport includes the following cases:

(1) Spherical coordinate values of the center point of the current viewport

For example, the spherical coordinate values of the center point of the current viewport are (X, Y, Z). X corresponds to an azimuth or a yaw of spherical coordinates, Y corresponds to a pitch or elevation angle (pitch or elevation) of the spherical coordinates, and Z corresponds to a tilt angle (tilt) or a roll angle (roll) of the spherical coordinates.

(2) Two-dimensional coordinate values of the center point of a two-dimensional viewport region corresponding to the current viewport For example, the two-dimensional coordinate values of the center point of the two-dimensional viewport region corresponding to the current viewport are (X, Y). X and Y respectively represent a horizontal coordinate and a vertical coordinate, in a two-dimensional rectangular coordinate system, of the center point of the two-dimensional viewport region.

(3) Two-dimensional coordinate values of the top-left corner/top-right corner/bottom-left corner/bottom-right corner of the two-dimensional viewport region corresponding to the current viewport For example, the two-dimensional coordinate values of the top-left corner of the two-dimensional viewport region corresponding to the current viewport are (X, Y). X and Y respectively represent a horizontal coordinate and a vertical coordinate, in the two-dimensional rectangular coordinate system, of the top-left corner of the two-dimensional viewport region.

Optionally, the spatial information of the current viewport includes region range information of the current viewport.

The region range information of the current viewport includes the following cases:

(4) Azimuth range (or a yaw range) and a pitch or elevation range of the current viewport For example, the azimuth range (or the yaw range) of the current viewport is 110 degrees, and the pitch or elevation range is 90 degrees.

(5) Coverage range of the current viewport includes the width and the height of a two-dimensional viewport region corresponding to the current viewport.

It should be understood that the coverage range of the user's viewport may alternatively be fixed. In this case, the client needs to report the region range information of the viewport to the server only once. When the user's viewport changes again, the user needs to report only position information of a current viewport, without repeatedly reporting the region range information.

Optionally, the spatial information of the region in which the second target video picture is located includes spatial position information of the region in which the second target video picture is located.

The spatial position information of the region in which the second target video picture is located includes the following several cases:

(6) Spherical coordinate values of the center point of the second target video picture For example, the spherical coordinate values of the center point of the second target video picture are (X, Y, Z). X corresponds to an azimuth or a yaw of spherical coordinates, Y corresponds to a pitch or elevation angle (pitch or elevation) of the spherical coordinates, and Z corresponds to a tilt angle (tilt) or a roll angle (roll) of the spherical coordinates.

(7) Two-dimensional coordinate values of the center point of a two-dimensional picture corresponding to the second target video picture For example, the two-dimensional coordinate values of the center point of the two-dimensional picture corresponding to the second target video picture are (X, Y). X and Y respectively represent a horizontal coordinate and a vertical coordinate, in a two-dimensional rectangular coordinate system, of the center point of a two-dimensional viewport region.

(8) Two-dimensional coordinate values of the top-left corner/top-right corner/bottom-left corner/bottom-right corner of the two-dimensional picture corresponding to the second target video picture For example, the two-dimensional coordinate values of the top-left corner of the two-dimensional picture corresponding to the second target video picture are (X, Y). X and Y respectively represent a horizontal coordinate and a vertical coordinate, in the two-dimensional rectangular coordinate system, of the top-left corner of the two-dimensional viewport region.

Optionally, the spatial information of the second target video picture includes region range information of the second target video picture.

The region range information of the second target video picture includes the following specific cases:

(9) A coverage range of the second target video picture includes an azimuth range (or a yaw range) and a pitch or elevation range of the second target video picture.

(10) The coverage range of the second target video picture includes the width and the height of a two-dimensional video picture corresponding to the second target video picture.

For example, the region range information of the second target video picture is H and V. H and V respectively represent an azimuth range and a pitch or elevation range of VR spherical coordinates.

Optionally, in an embodiment, the panoramic video picture includes the at least two sub-regions obtained by dividing the panoramic video picture, the current viewport covers the at least one sub-region, the second information is used to indicate a sub-region covered by the second target video picture, and the sub-region covered by the second target video picture is merged to obtain the region in which the second target video picture is located.

Optionally, the at least one video data packet includes a video data packet that carries a viewport identifier.

It should be understood that any one of the at least one video data packet may carry the viewport identifier, and the viewport identifier is used to indicate a viewport at which a video picture corresponding to the any one video data packet is located. In addition, the viewport identifier may be bound to a sub-region ID. In other words, there is a correspondence between the sub-region ID and the viewport identifier.

The client can distinguish, based on viewport identifiers, between video data packets corresponding to different viewports, so as to merge video pictures corresponding to video data packets within a specific viewport.

Optionally, the second target video picture is the same as the first target video picture.

When the second target video picture includes only the first target video picture, bandwidth occupied for transmitting the target video picture can be reduced.

Optionally, in an embodiment, the second target video picture further includes a video picture other than the first target video picture.

When the second target video picture includes the video picture other than the first target video picture, the client may further display a video picture beyond the current viewport while displaying the video picture within the current viewport, so that the user can also watch the video picture when turning suddenly (or changing a watching viewport suddenly).

Optionally, the first target video picture further includes a panoramic video picture.

Thanks to transmission of the panoramic video picture, not only the first video picture corresponding to the current viewport but also the panoramic video picture can be displayed, so that the user can also watch the video picture when turning suddenly (for example, turning around suddenly). In this way, a specific buffering function can be implemented, and the video content can be watched when the user turns suddenly.

Optionally, picture quality of the panoramic video picture is lower than picture quality of the first target video picture.

When a panoramic video picture needs to be transmitted, a data transmission amount can be reduced to some extent by transmitting a panoramic video picture with comparatively low picture quality, thereby reducing bandwidth occupation.

Optionally, in an embodiment, the method shown in FIG. 1 further includes: The client receives a description file sent by the server. The description file carries first viewport information or second viewport information.

The first viewport information is used to indicate a maximum region range that is of a viewport and that is supported by the server, and the second viewport information is used to indicate a region range of an initial viewport.

The client can obtain, by receiving the description file, an initial viewport of the server or a field of viewport supported by the server, so that after subsequently receiving video data packets, the client merges, based on an initial viewport and a field of viewport supported by the client, video pictures obtained through decoding.

It should be understood that a range, indicated by the first information, of the region in which the first target video picture is located shall fall within the maximum region range that is of the viewport, that is supported by the server, and that is indicated by the first viewport information.

It should be understood that, when the description file carries the second viewport information, the client may present a video picture based on the initial viewport after the client is powered on. Then, the client may present a video picture based on the current viewport of the user.

For example, the client presents a video picture within a viewport 1 (where the viewport 1 is the initial viewport) after the client is powered on, but the user wants to watch a video picture within a viewport 2 (where the viewport 2 is the current viewport of the user). Then, the client may switch from the viewport 1 to the viewport 2, and presents the video picture within the viewport 2.

The initial viewport herein may be a preset viewport. The video picture within the initial viewport is first presented each time the client is powered on.

It should be understood that region range information of the initial viewport may include an azimuth range (or a yaw range) and a pitch or elevation range of the region in which the initial viewport is located. The region range information of the initial viewport may also include the width and the height of a plane region corresponding to the initial viewport.

For example, the region range information of the initial viewport is H and V. H and V respectively represent an azimuth range and a pitch or elevation range of VR spherical coordinates.

Optionally, in addition to indicating the region range of the initial viewport, the second viewport information may be further used to indicate a region range of a default viewport.

It should be understood that, when the server does not obtain viewport information of the client or information about the video picture corresponding to the current viewport, the server can directly send a video picture within the default viewport to the client, so that the client presents the video picture within a field of the default viewport.

Optionally, before the client receives the description file sent by the server, the method further includes: The client sends a video description command to the server.

Sending the video description command to the server can trigger the server to send the description file to the client.

Optionally, in an embodiment, when the description file carries the second viewport information, the description file further carries third viewport information. The third viewport information is further used to indicate a spatial position of the initial viewport.

Optionally, the third viewport information is any one type of the following information (11) to (14):

(11) spherical coordinate values of the center point of a sphere region corresponding to the initial viewport;

(12) spherical coordinate values of the top-left corner of the sphere region corresponding to the initial viewport;

(13) planar coordinate values of the center point of a plane region corresponding to the initial viewport; and

(14) planar coordinate values of the top-left corner of the plane region corresponding to the initial viewport.

For example, the spherical coordinate values of the center point of the sphere region corresponding to the initial viewport are (X, Y, Z). X corresponds to an azimuth or a yaw of spherical coordinates, Y corresponds to a pitch or elevation angle (pitch or elevation) of the spherical coordinates, and Z corresponds to a tilt angle (tilt) or a roll angle (roll) of the spherical coordinates.

For example, the planar coordinate values of the center point of the plane region corresponding to the initial viewport are (X, Y). X and Y respectively represent a horizontal coordinate and a vertical coordinate, in a two-dimensional rectangular coordinate system, of the center point of the plane region corresponding to the initial viewport.

For example, the planar coordinate values of the top-left corner of the plane region corresponding to the initial viewport are (X, Y). X and Y respectively represent a horizontal coordinate and a vertical coordinate, in the two-dimensional rectangular coordinate system, of the top-left corner of the plane region corresponding to the initial viewport.

Optionally, in an embodiment, the method shown in FIG. 1 further includes: The client receives a description file sent by the server. The panoramic video picture includes the at least two sub-regions obtained by dividing the panoramic video picture, the description file carries sub-region description information of each sub-region, each sub-region is a sub-region in a region in which the panoramic video picture is located, and the sub-region description information includes spatial information of a sub-region.

The description file carries the sub-region description information, so that the client can merge video pictures based on information about sub-regions after receiving video data packets corresponding to a target video picture, to obtain video content within the current viewport.

Optionally, before the client receives the description file sent by the server, the method shown in FIG. 1 further includes: The client sends a video description command to the server.

Sending the video description command to the server can trigger the server to send the description file to the client.

Optionally, in an embodiment, the sub-region description information includes spatial information of each sub-region on a plane, the sub-region description information further includes mapping-type information of a video picture in each sub-region, and spatial information of each sub-region on a sphere is determined based on the mapping-type information and the spatial information of the sub-region on the plane.

Optionally, the spatial information of the sub-region on the plane is two-dimensional coordinate values of the center point of the sub-region or two-dimensional coordinate values of the top-left corner of the sub-region.

For example, the two-dimensional coordinate values of the center point of the sub-region are (X, Y). X and Y respectively represent a horizontal coordinate and a vertical coordinate, in a two-dimensional rectangular coordinate system, of the center point of a two-dimensional viewport region.

For example, the two-dimensional coordinate values of the top-left corner of the sub-region are (X, Y). X and Y respectively represent a horizontal coordinate and a vertical coordinate, in the two-dimensional rectangular coordinate system, of the top-left corner of the two-dimensional viewport region.

It should be understood that the spatial information of the sub-region on the plane may alternatively be two-dimensional coordinate values of the top-right corner, the bottom-left corner, the bottom-right corner, or any specified position of the sub-region.

Optionally, a mapping type indicated by the mapping-type information is any one of a longitude and latitude map, a hexahedron, and an octahedron.

Optionally, in an embodiment, the sub-region description information includes spatial information of each sub-region on a sphere, and the sub-region description information further includes shape information of each sub-region.

Optionally, the spatial information of the sub-region on the sphere may be represented by using an azimuth, a pitch or elevation angle, and a tilt angle of the center point of the sub-region.

The shape information of the sub-region may indicate a shape type of the sub-region. For example, the shape type of the sub-region may be enclosed by four great circles, or may be enclosed by two great circles and one small circle.

Optionally, in an embodiment, three-dimensional spatial information of the sub-region includes a mapping type of a sub-regional picture, shape information of the sub-region, angle information of the sub-region, and region range information of the sub-region.

Optionally, the description file further includes panoramic bitstream description information, and the panoramic bitstream description information includes mapping-type information and size information of the panoramic video picture.

Optionally, the first information is carried in a real-time transport control protocol RTCP source description report sent by the client to the server, and video data packets in a target video picture are streaming media real-time transmit protocol RTP video data packets.

Optionally, the first information and the second information are information in a user-defined TLV format.

Figure 2:
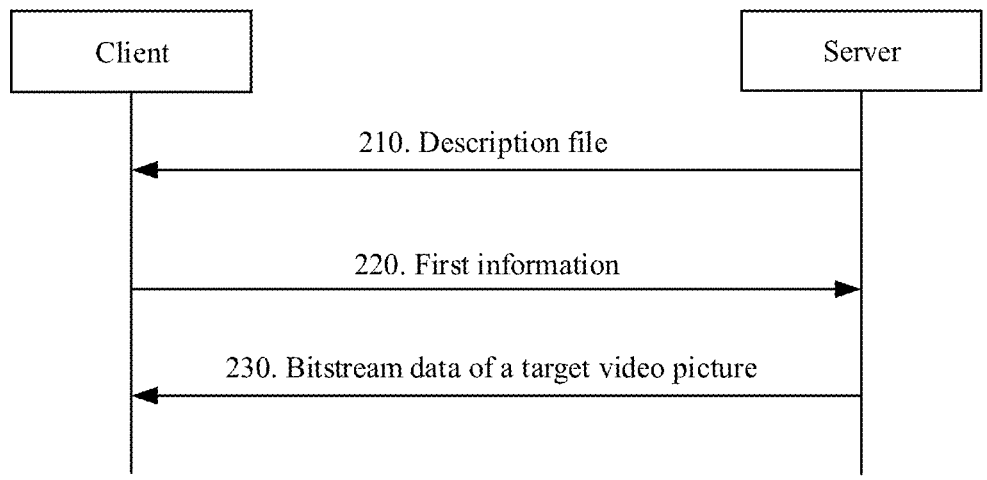
FIG. 2 is a schematic flowchart of a media data transmission method according to an embodiment of this application.

FIG. 2 is a schematic flowchart of a media data transmission method according to an embodiment of this application. Similar to FIG. 1, the method shown in FIG. 2 may also be performed by a client.

It should be understood that the foregoing limitations on and explanations for corresponding content in the method shown in FIG. 1 are also applicable to the method shown in FIG. 2. For brevity, repeated descriptions are properly omitted when the method shown in FIG. 2 is described in the following.

The method shown in FIG. 2 includes step 210 to step 230. The following describes in detail step 210 to step 230.

210. The client receives a description file sent by a server.

The description file carries session description information of at least two sessions, the at least two sessions are sessions between the client and the server, each of the at least two sessions is used to transmit bitstream data of a sub-regional picture corresponding to the session, the session description information includes spatial information of a sub-region corresponding to the bitstream data of the sub-regional picture that is transmitted by using each session, the sub-region is obtained by dividing a region in which a panoramic video picture is located, and the sub-regional picture is a video picture in a sub-region.

220. The client sends first information to the server.

The first information is used to indicate a session corresponding to a sub-region covered by a current viewport, and the first information is determined based on the current viewport and the session description information.

230. The client receives bitstream data of a target video picture, where the bitstream data of the target video picture is sent by the server.

The target video picture includes a picture in the sub-region to which the current viewport belongs.

The current viewport may be a viewport at which a user watches a video by using the client. When the user's viewport changes, the client may send new first information to the server, to request to obtain video content within a new viewport.

Optionally, the target video picture is a panoramic video picture.

In this application, before the target video picture transmitted by the server is received, a description file that carries session description information of each session is obtained, so that the client processes the received bitstream data of the target video picture based on the description information.

It should be understood that each of the at least two sessions may be used to transmit the bitstream data of the sub-regional picture corresponding to the session, or one session may be used to transmit video pictures in all sub-regions.

For example, the target video picture includes video pictures in a sub-region 1 (which corresponds to a session 1), a sub-region 2 (which corresponds to a session 2), and a sub-region 3 (which corresponds to a session 3). In this case, the session 1, the session 2, and the session 3 may be used to transmit the video pictures in the sub-region 1, the sub-region 2, and the sub-region 3, respectively. Alternatively, one session (any one of the session 1, the session 2, and the session 3) may be used to transmit the video pictures in the sub-region 1 to the sub-region 3.

Optionally, in an embodiment, that the client receives bitstream data of a target video picture, where the bitstream data of the target video picture is sent by the server includes: The client receives, by using the session corresponding to the sub-region covered by the current viewport, bitstream data of a sub-regional picture covered by the current viewport, to obtain the bitstream data of the target video picture.

Optionally, in an embodiment, regional spatial information of the sub-region is spatial information of the sub-region in a plane region, and the session description information further includes mapping-type information of the bitstream data of the sub-regional picture transmitted by using each session.

Optionally, in an embodiment, regional spatial information of the sub-region is spatial information of the sub-region in a sphere region, and the session description information further includes shape information of the sub-region corresponding to the bitstream data of the sub-regional picture transmitted by using each session.

Optionally, in an embodiment, the first information is carried in a real-time transport control protocol RTCP source description report sent by the client to the server.

Optionally, in an embodiment, the first information is information in a TLV format.

The foregoing describes the media data transmission method in the embodiments of this application from a perspective of the client with reference to FIG. 1 and FIG. 2. The following describes a media data transmission method in the embodiments of this application from a perspective of a server with reference to FIG. 3 and FIG. 4. It should be understood that a method shown in FIG. 3 corresponds to the method shown in FIG. 1, and a method shown in FIG. 4 corresponds to the method shown in FIG. 2. To avoid repetition, repeated descriptions are properly omitted when the methods shown in FIG. 3 and FIG. 4 are described in the following.

Figure 3:
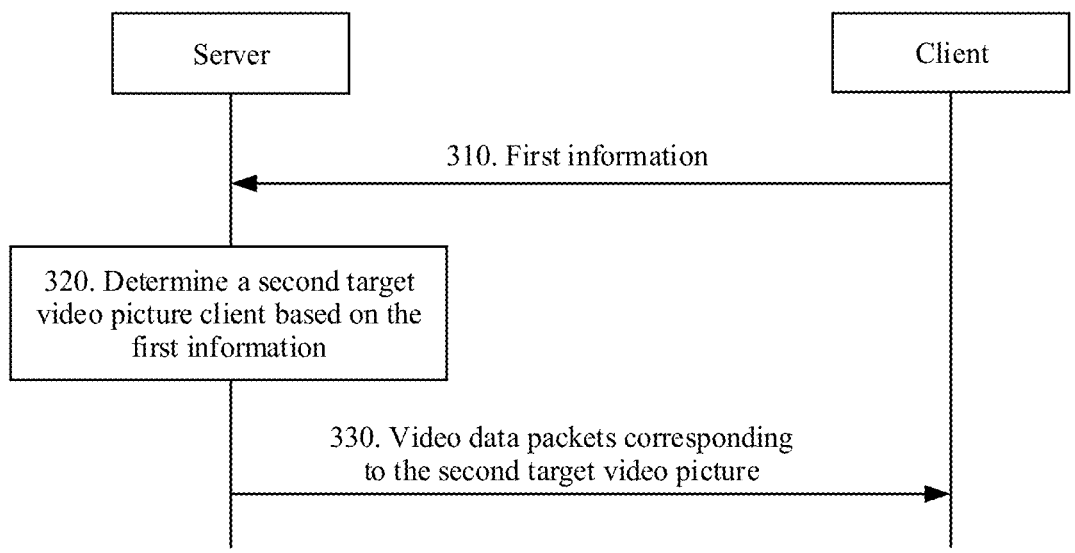
FIG. 3 is a schematic flowchart of a media data transmission method according to an embodiment of this application.
Figure 4:
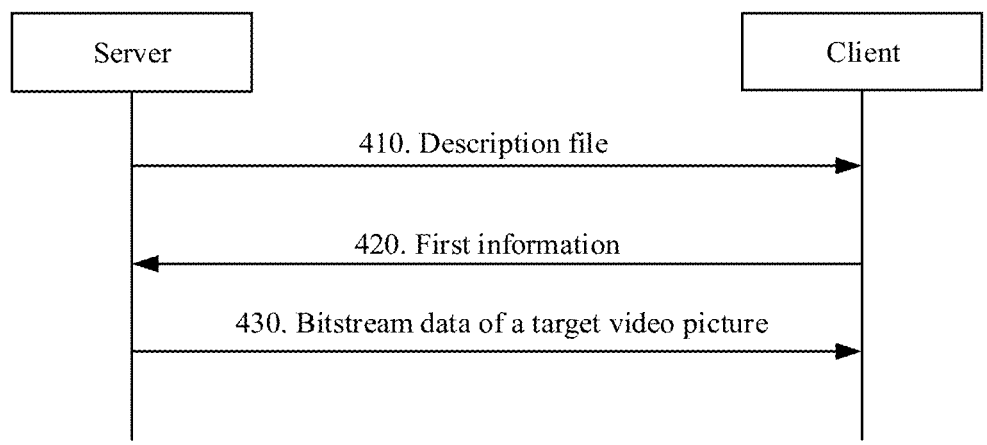
FIG. 4 is a schematic flowchart of a media data transmission method according to an embodiment of this application.

FIG. 3 is a schematic flowchart of a media data transmission method according to an embodiment of this application. The method shown in FIG. 3 may be performed by a server. The method shown in FIG. 3 includes step 310 to step 330. The following describes in detail step 310 to step 330.

310. The server receives first information sent by a client.

The first information is used to indicate a spatial position of a region in which a first target video picture is located, and the first target video picture includes a video picture within a current viewport.

320. The server determines a second target video picture based on the first information.

The second target video picture includes the first target video picture.

330. The server sends, to the client, video data packets corresponding to the second target video picture.

At least one of the video data packets corresponding to the second target video picture jointly carries second information, and the second information is used to indicate spatial information of a region in which the second target video picture is located.

In this application, after obtaining the first information that represents video content within the current viewport, the server can send, to the client in real time, position-related information of the second target video picture and the second target video picture that are required by a user, so that a delay for obtaining the position-related information of the second target video picture by the client can be reduced.

Optionally, in an embodiment, the first target video picture is the video picture within the current viewport, and the first information includes spatial information of the current viewport.

Optionally, in an embodiment, a panoramic video picture includes at least two sub-regions obtained by dividing the panoramic video picture, the current viewport covers at least one sub-region, the first information is used to indicate the sub-region covered by the current viewport, and the sub-region covered by the current viewport is merged to obtain the region in which the first target video picture is located.

Optionally, in an embodiment, the second information includes the spatial information of the region in which the second target video picture is located.

Optionally, in an embodiment, the panoramic video picture includes the at least two sub-regions obtained by dividing the panoramic video picture, the current viewport covers the at least one sub-region, the second information is used to indicate a sub-region covered by the second target video picture, and the sub-region covered by the second target video picture is merged to obtain the region in which the second target video picture is located.

Optionally, in an embodiment, the second information includes at least one piece of third information, each of the at least one video data packet carries third information, the at least one video data packet jointly carries the at least one piece of third information, and third information carried in any one of the at least one video data packet is used to indicate a sub-region to which a video picture corresponding to the any one video data packet belongs.

Optionally, in an embodiment, the at least one video data packet includes a video data packet that carries a viewport identifier.

Optionally, in an embodiment, the method further includes: The server sends a description file to the client. The description file carries first viewport information or second viewport information, the first viewport information is used to indicate a maximum region range that is of a viewport and that is supported by the server, and the second viewport information is used to indicate a region range of an initial viewport.

Optionally, in an embodiment, when the description file carries the second viewport information, the description file further carries third viewport information. The third viewport information is further used to indicate a spatial position of the initial viewport.

Optionally, in an embodiment, the method further includes: The server sends a description file to the client. The panoramic video picture includes the at least two sub-regions obtained by dividing the panoramic video picture, the description file carries sub-region description information of each sub-region, and the sub-region description information includes spatial information of a sub-region.

Optionally, in an embodiment, the sub-region description information includes spatial information of each sub-region on a plane, the sub-region description information further includes mapping-type information of a video picture in each sub-region, and spatial information of each sub-region on a sphere is determined based on the mapping-type information and the spatial information of the sub-region on the plane.

Optionally, in an embodiment, the sub-region description information includes spatial information of each sub-region on a sphere, and the sub-region description information further includes shape information of each sub-region.

FIG. 4 is a schematic flowchart of a media data transmission method according to an embodiment of this application.

The method shown in FIG. 4 may be performed by a server. The method shown in FIG. 4 includes step 410 to step 430. The following describes in detail step 410 to step 430.

410. The server sends a description file to a client.

The description file carries session description information of at least two sessions, the at least two sessions are sessions between the client and the server, each of the at least two sessions is used to transmit bitstream data of a sub-regional picture corresponding to the session, the session description information includes spatial information of a sub-region corresponding to the bitstream data of the sub-regional picture that is transmitted by using each session, the sub-region is obtained by dividing a region in which a panoramic video picture is located, and the sub-regional picture is a video picture in a sub-region.

420. The server receives first information sent by the client.

The first information is used to indicate a session corresponding to a sub-region covered by a current viewport, and the first information is determined based on the current viewport and the session description information.

430. The server sends bitstream data of a target video picture to the client.

The target video picture includes a video picture in the sub-region covered by the current viewport.

In this application, before transmitting the target video picture to the client, the server transmits, to the client, the description file that carries the session description information of each session, so that the client processes the received bitstream data of the target video picture based on the description information.

Optionally, in an embodiment, that the client receives bitstream data of a target video picture, where the bitstream data of the target video picture is sent by the server includes: The client receives, by using the session corresponding to the sub-region covered by the current viewport, bitstream data of a sub-regional picture covered by the current viewport, to obtain the bitstream data of the target video picture.

Optionally, in an embodiment, regional spatial information of the sub-region is spatial information of the sub-region in a plane region, and the session description information further includes mapping-type information of the bitstream data of the sub-regional picture transmitted by using each session.

Optionally, in an embodiment, regional spatial information of the sub-region is spatial information of the sub-region in a sphere region, and the session description information further includes shape information of the sub-region corresponding to the bitstream data of the sub-regional picture transmitted by using each session.

Optionally, in an embodiment, the first information is carried in a real-time transport control protocol RTCP source description report sent by the client to the server.

Optionally, in an embodiment, the first information is information in a TLV format.

The foregoing describes in detail the media data transmission method in the embodiments of this application with reference to FIG. 1 to FIG. 4. The following describes in detail a media data transmission method in the embodiments of this application with reference to specific embodiments.

Embodiment 1

Figure 5:
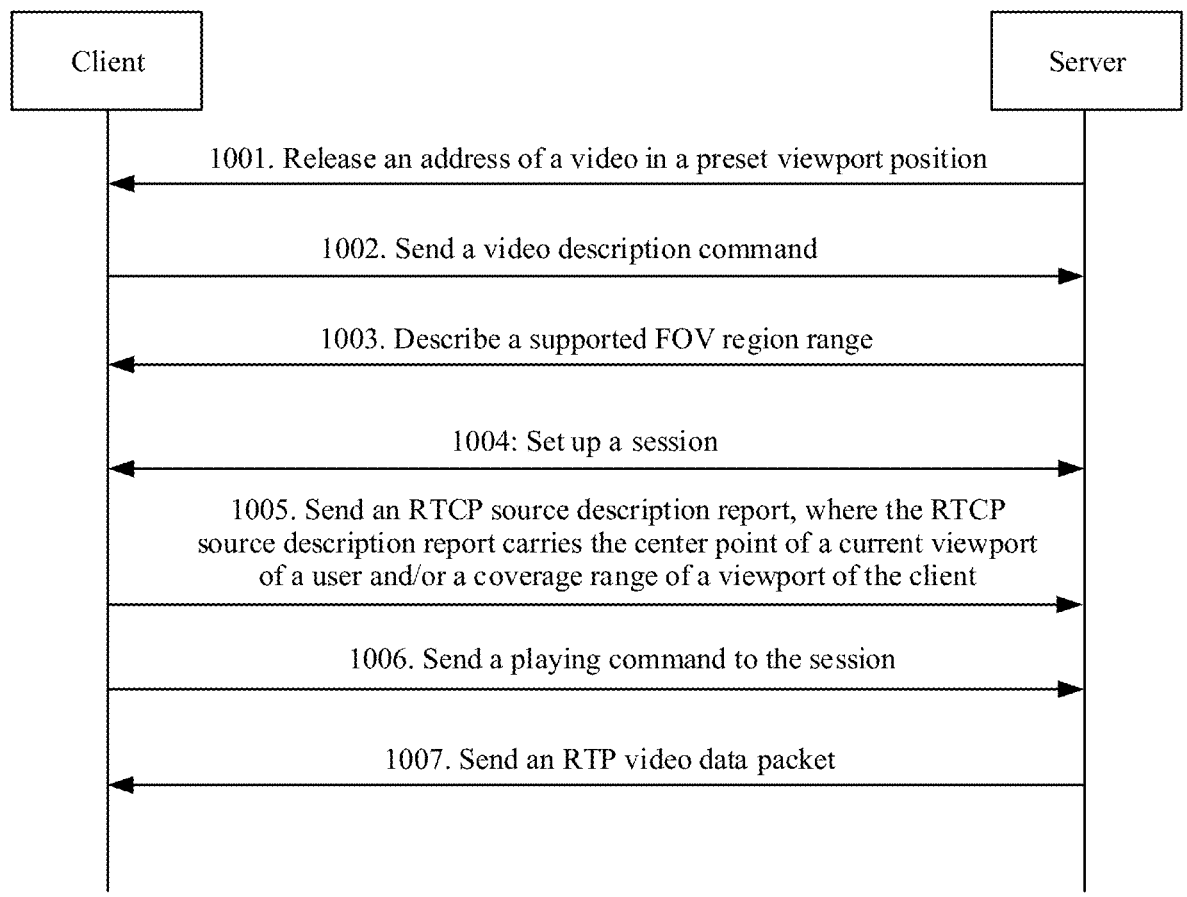
FIG. 5 is a schematic flowchart of a media data transmission method according to an embodiment of this application.

FIG. 5 shows a specific procedure of a media data transmission method described in Embodiment 1. The method shown in FIG. 5 includes step 1001 to step 1007. The following describes in detail step 1001 to step 1007.

1001. A server releases an address of a video in a preset viewport position.

The server may select video content in a specific viewport position from a panoramic video, and then release an address of the video content. Alternatively, the server may first obtain content in a specific viewport position through rendering, and then release an address of the video content.

A format of the address of the video content released by the server may be in a real-time streaming protocol (RTSP) protocol format. For example, the address of the video content released by the server may be rtsp://server.example-.com/video.

1002. A client sends a video description request command to the server.

1003. The server sends session description protocol (SDP) information to the client, where the session description protocol information describes a supported region range of a field of view (FOV) that covers a user's viewport in a panorama picture.

In step 1002, the client may send the video description request command to the address in step 1001; and after receiving the video description command request of the client, the server sends video description information to the client. The video description information describes, for example, an FOV region range that can be supported by the server.

For example, a request description command sent by the client to the server may be shown in Table 1.

TABLE 1

DESCRIBE rtsp://server.example.com/video RTSP/1.0
CSeq: 1
Accept: application/sdp In Table 1, the field DESCRIBE represents a video description command.

After the server receives the video description command shown in Table 1, response content for the video description command may be an SDP description file. Specific content of the SDP description file may be shown in Table 2.

TABLE 2

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000 FOV
a=control:track1
d=H:V A video session is described in the SDP description file shown in Table 2. A bit rate for transmitting a bitstream in an FOV by using the video session is 5000 kbps, and H and V are used to describe an FOV range. H and V may respectively represent an azimuth range azimuth range and a pitch or elevation range elevation_range of VR spherical coordinates, or H and V may respectively represent a value of a width pixel quantity of a two-dimensional picture and a value of a height pixel quantity of the two-dimensional picture.

The SDP description file shown in Table 2 may be transmitted by using the RTP protocol.

1004. Set up a session between the client and the server.

Before setting up the session between the client and the server, the client may first send a session connection setup command to the server. Then the server responds to the connection setup command sent by the client, so as to set up the session between the client and the server.

Content of the session connection setup command sent by the client to the server may be shown in Table 3.

TABLE 3

SETUP rtsp://server.example.com/video/track1 RTSP/1.0
CSeq: 2
User-Agent: VRPlayer
Transport: RTP/AVP;unicastclient_port=20000-20001

The field SETUP in Table 3 indicates the session connection setup command. In the session connection setup command, the first command indicates that the client is to set up a connection to track1 in the SDP description file; and the field Transport indicates that video content in the FOV is transmitted in a unicast manner by using the RTP protocol, that an RTP port number used by the client to receive a data stream is 20000, and that an RTCP port number used by the client to receive a control stream is 20001.

After receiving the session connection setup command shown in Table 3, the server responds to the session connection setup command. Response content may be shown in Table 4.

TABLE 4

RTSP/1.0 200 OK
CSeq: 2
Session: 12345678; timeout=60
Transport: RTP/AVP;unicastdestination=10.70.144.123;client_port=20000-20001;server_port=50000-50001;
Date: Wed, 16 Jul 2008 12:48:48 GMT The response content shown in Table 4 is a response of the server to the first connection setup request of the client, and indicates that the connection setup request from the client is accepted. The field Transport indicates that a unicast address is 10.70.144.123, an RTP receiving port of the client is 20000, an RTCP receiving port of the client is 20001, an RTP receiving port of the server is 50000, an RTCP receiving port of the server is 50001, and a session ID of the connection is 12345678.

1005. The client sends an RTCP source description report to the server, where the RTCP source description report carries the center point of a current viewport of the user and/or a coverage range of a viewport of the client.

In step 1005, the client may send, by using the RTSP session, the RTCP source description report to the server based on RTCP port information with which the server responds after the connection setup command is received.

A specific format for describing the coverage range of the viewport of the client in the RTCP source description report may be shown in Table 5.

TABLE 5

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|    SC     |    PT = SDES = 202    |         length          |
+=+=+=+=+=+=+=+=+=+=+=+=+=+=+=+=+=+=+=+=+=+=+=+=+=+=+=+=+=+=+=+=
|                            SSRC/CSRC_1                          |
+-+-+-+-+-+-+-+-+-+-+-+-+-+-+-+-+-+-+-+-+-+-+-+-+-+-+-+-+-+-+-+-+
|     COVERAGE = 9    |     length    |         H                |
+=+=+=+=+=+=+=+=+=+=+=+=+=+=+=+=+=+=+=+=+=+=+=+=+=+=+=+=+=+=+=+=
|              V              |                                  |
+-+-+-+-+-+-+-+-+-+-+-+-+-+-+-+-+-+-+-+-+-+-+-+-+-+-+-+-+-+-+-+-+
```

In Table 5, a type of the SDES item is identified by using the field COVERAGE (for example, may be identified by using COVERAGE=9), and the field COVERAGE indicates that the RTCP source description report carries the coverage range of the viewport of the client. H and V jointly describe the coverage range of the viewport. H and V may respectively represent an azimuth range azimuth range and a pitch or elevation range elevation_range of VR spherical coordinates, or H and V may respectively represent the width and the height of a two-dimensional picture.

A specific format of an RTCP source description report used to describe that a coverage range of the viewport of the client includes an azimuth range of 110 degrees and a pitch or elevation range of 90 degrees is shown in Table 6.

TABLE 6

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 2|0|    1      |          202          |            3            |
+=+=+=+=+=+=+=+=+=+=+=+=+=+=+=+=+=+=+=+=+=+=+=+=+=+=+=+=+=+=+=+=
|                              0                                  |
+-+-+-+-+-+-+-+-+-+-+-+-+-+-+-+-+-+-+-+-+-+-+-+-+-+-+-+-+-+-+-+-+
|     9     |      1      |          110                          |
+=+=+=+=+=+=+=+=+=+=+=+=+=+=+=+=+=+=+=+=+=+=+=+=+=+=+=+=+=+=+=+=
|                90            |                                  |
+-+-+-+-+-+-+-+-+-+-+-+-+-+-+-+-+-+-+-+-+-+-+-+-+-+-+-+-+-+-+-+-+
```

It should be understood that, when the coverage range of the FOV viewport of the client changes dynamically, the client needs to send the RTCP source description report with COVERAGE=9 to the server, to request to play video content in a dynamically changed FOV field of viewport.

In addition to describing the coverage range of the viewport of the client, the RTCP source description report may further describe the center point of the current viewport of the user. A specific format for describing the center point of the user's viewport in the RTCP source description report may be shown in Table 7.

TABLE 7

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|    SC     |    PT = SDES = 202    |         length          |
+=+=+=+=+=+=+=+=+=+=+=+=+=+=+=+=+=+=+=+=+=+=+=+=+=+=+=+=+=+=+=+=
|                            SSRC/CSRC_1                          |
+-+-+-+-+-+-+-+-+-+-+-+-+-+-+-+-+-+-+-+-+-+-+-+-+-+-+-+-+-+-+-+-+
|   COVERAGE_FOV = 10    |     length    |           X              |
+=+=+=+=+=+=+=+=+=+=+=+=+=+=+=+=+=+=+=+=+=+=+=+=+=+=+=+=+=+=+=+=
|             Y                |              Z                  |
+-+-+-+-+-+-+-+-+-+-+-+-+-+-+-+-+-+-+-+-+-+-+-+-+-+-+-+-+-+-+-+-+
```

In Table 7, a type of the SDES item is identified by using the field CENTER_FOV (CENTER_FOV=10 is used as an example herein), and the field CENTER_FOV indicates that the RTCP source description report carries information about the center point of the viewport of the client. X, Y, and Z jointly identify the information about the center point of the viewport. X, Y, and Z may respectively represent azimuth, elevation, and tilt values of VR spherical coordinates. Alternatively, only X and Y may be reserved to represent two-dimensional coordinate values of the center point of a corresponding viewport region or coordinate values of the top-left corner of a viewport region.

A format of the RTCP source description report used to describe that the center point of the user's viewport is located at −45, −45, 0 may be shown in Table 8.

TABLE 8

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| 2|0|    1      |          202          |            3            |
+=+=+=+=+=+=+=+=+=+=+=+=+=+=+=+=+=+=+=+=+=+=+=+=+=+=+=+=+=+=+=+=
|                              0                                  |
+-+-+-+-+-+-+-+-+-+-+-+-+-+-+-+-+-+-+-+-+-+-+-+-+-+-+-+-+-+-+-+-+
|    10     |      1      |                -45                    |
+=+=+=+=+=+=+=+=+=+=+=+=+=+=+=+=+=+=+=+=+=+=+=+=+=+=+=+=+=+=+=+=
|               -45            |              0                  |
+-+-+-+-+-+-+-+-+-+-+-+-+-+-+-+-+-+-+-+-+-+-+-+-+-+-+-+-+-+-+-+-+
```

It should be understood that viewport information such as the coverage range of the viewport and the information about the center point of the viewport may alternatively be sent in the same SDES item.

In addition, the fields COVERAGE and CENTER_FOV may alternatively not exist in the RTCP source description report. In this case, the RTCP source description report carries only the viewport information such as the coverage range of the viewport and the information about the center point of the viewport.

1006. The client sends a playing command to the server.

In step 1006, the client sends the playing command to the session set up between the client and the server. A specific format of the playing command may be shown in Table 9.

TABLE 9

PLAY rtsp://server.example.com/video RTSP/1.0
CSeq: 4
User-Agent: VRPlayer
Session: 12345678

After receiving the playing command sent by the client, the client responds to the playing command from the client. Specific response content may be shown in Table 11.

TABLE 10

RTSP/1.0 200 OK
CSeq: 4
Session: 12345678
Range: npt=0.645272-
RTP-Info:
url=rtsp://server.example.com/video/track1;seq=1000;rtptime=102788
Date: Wed, 16 Jul 2008 12:48:48 GMT 1007. The server sends, to the client, video data that is carried in a form of an RTP data packet and that corresponds to the user's viewport, and corresponding video data.

The video data packet may be a data packet of a video in a range of a first window, and the video data may include coordinates of the center point and a content coverage range of the video that are sent by the server to the client.

Content of the video within the first window includes content, in the FOV, requested by the client. The content of the video within the first window may be the same as the content, in the FOV, requested by the user, or the content of the video within the first window is more than the content, in the FOV, requested by the user.

In other words, to improve user experience, in actual application, window content whose FOV is larger than an FOV field of viewport requested by the client may be rendered by using prediction information or clipped from a panoramic video. When the client cannot obtain content within a new FOV in time, the client may obtain, from content within a previous window, the content corresponding to the new FOV. Therefore, coordinates of the center point of the window content, and azimuth and pitch and elevation angle elevation range information of the window content that can be sent by the server are carried, to support an application scenario in which a size of a window for performing encoding and transmission by the server changes adaptively.

A format of an RTP packet header of the RTP data packet used to carry the video data may be shown in Table 11.

TABLE 11

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|X|  CC   |M|     PT      |       sequence number         |
+=+=+=+=+=+=+=+=+=+=+=+=+=+=+=+=+=+=+=+=+=+=+=+=+=+=+=+=+=+=+=+=+
|                           timestamp                           |
+-+-+-+-+-+-+-+-+-+-+-+-+-+-+-+-+-+-+-+-+-+-+-+-+-+-+-+-+-+-+-+-+
|           synchronization source (SSRC) identifier            |
+=+=+=+=+=+=+=+=+=+=+=+=+=+=+=+=+=+=+=+=+=+=+=+=+=+=+=+=+=+=+=+=+
|            contributing source (CSRC) identifiers             |
+-+-+-+-+-+-+-+-+-+-+-+-+-+-+-+-+-+-+-+-+-+-+-+-+-+-+-+-+-+-+-+-+
```

The RTP data packet may be extended to carry the video data. An extension format is shown in Table 12.

TABLE 12

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      defined by profile       |            length             |
+=+=+=+=+=+=+=+=+=+=+=+=+=+=+=+=+=+=+=+=+=+=+=+=+=+=+=+=+=+=+=+=+
|               X               |              Y                |
+-+-+-+-+-+-+-+-+-+-+-+-+-+-+-+-+-+-+-+-+-+-+-+-+-+-+-+-+-+-+-+-+
|               Z               |              H                |
+-+-+-+-+-+-+-+-+-+-+-+-+-+-+-+-+-+-+-+-+-+-+-+-+-+-+-+-+-+-+-+-+
|               V               |                               |
+-+-+-+-+-+-+-+-+-+-+-+-+-+-+-+-+-+-+-+-+-+-+-+-+-+-+-+-+-+-+-+-+
```

In Table 12, X, Y, and Z jointly represent center point position information, sent by the server to the client, of the video.

X, Y, and Z may correspond to azimuth, elevation, and tilt values of VR spherical coordinates, respectively. Alternatively, only two items (X and Y) may be reserved when a sent center point position of the video is represented, to represent two-dimensional coordinate values of the center point of a corresponding viewport region or coordinate values of the top-left corner of a viewport region.

In addition, in Table 12, H and V may jointly represent a range of the sent video content. H and V may respectively represent an azimuth range and a pitch or elevation range of VR spherical coordinates, or H and V may respectively represent a value of a width pixel quantity of a two-dimensional picture and a value of a height pixel quantity of the two-dimensional picture.

Video data within a window whose center point is located in (−45, −45, 0), azimuth range is 110 degrees, and pitch or elevation range is 90 degrees is used as an example. A specific representation form of an RTP packet header corresponding to the video data within the window is shown in Table 13.

TABLE 13

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  2                                                            |
|0|1|   0   |0|     24      |              1000                 |
+=+=+=+=+=+=+=+=+=+=+=+=+=+=+=+=+=+=+=+=+=+=+=+=+=+=+=+=+=+=+=+=+
|                            102788                             |
+-+-+-+-+-+-+-+-+-+-+-+-+-+-+-+-+-+-+-+-+-+-+-+-+-+-+-+-+-+-+-+-+
|                              1                                |
+=+=+=+=+=+=+=+=+=+=+=+=+=+=+=+=+=+=+=+=+=+=+=+=+=+=+=+=+=+=+=+=+
|              11               |             3                 |
+-+-+-+-+-+-+-+-+-+-+-+-+-+-+-+-+-+-+-+-+-+-+-+-+-+-+-+-+-+-+-+-+
|             −45               |             −                 |
45
+=+=+=+=+=+=+=+=+=+=+=+=+=+=+=+=+=+=+=+=+=+=+=+=+=+=+=+=+=+=+=+=+
|              0                |            110                |
+-+-+-+-+-+-+-+-+-+-+-+-+-+-+-+-+-+-+-+-+-+-+-+-+-+-+-+-+-+-+-+-+
|             90                |                               |
+=+=+=+=+=+=+=+=+=+=+=+=+=+=+=+=+=+=+=+=+=+=+=+=+=+=+=+=+=+=+=+=+
```

When the user's viewport changes, to accurately present a video within a field of the user's viewport, the client may send an RTCP source description report to the server again (step 1005 is performed again), to update viewport center point information of the user or viewport region range information of the user. The server extracts the content in the FOV region from the panoramic video or renders the content in the FOV in real time, based on latest viewport information of the user, and then encodes and sends video data in the FOV.

The foregoing describes in detail the media data transmission method in the embodiments of this application with reference to Embodiment 1. It should be understood that division of a spatial region of the panoramic video into sub-regions is not performed in Embodiment 1. After receiving the playing command, the server needs to send, to the client, only the video data packet corresponding to the user's viewport.

In a media data transmission process, to better transmit videos in different regions, the spatial region of the panoramic video may be divided into a plurality of sub-regions. The following describes in detail, with reference to Embodiment 2 to Embodiment 4, how to transmit media data when there are a plurality of sub-regions.

Embodiment 2

It should be understood that a client may display only video content in an FOV region; or in addition to displaying video content in an FOV region, a client may further display video content in another region adjacent to the FOV region. When both the video content in the FOV region and the video content in the another region need to be transmitted at the same time, video data is usually transmitted in a manner of transmitting high-quality video data in the FOV region and low-quality video data in the another region, to ensure watching quality of the FOV region and reduce an amount of data transmitted over a network.

For example, panoramic video content is divided into eight sub-regions, and sub-regions 2, 3, 6, and 7 cover an FOV of a user's viewport. High-quality encoding may be performed in the sub-regions 2, 3, 6, and 7, to obtain high-quality video data. Low-quality encoding is performed in all the sub-regions, to obtain a low-quality panoramic video. The high-quality video data and the low-quality panoramic video are transmitted to the client together, the client performs decoding and rendering, and the client presents a part of region to the user based on the user's viewport.

Figure 6:
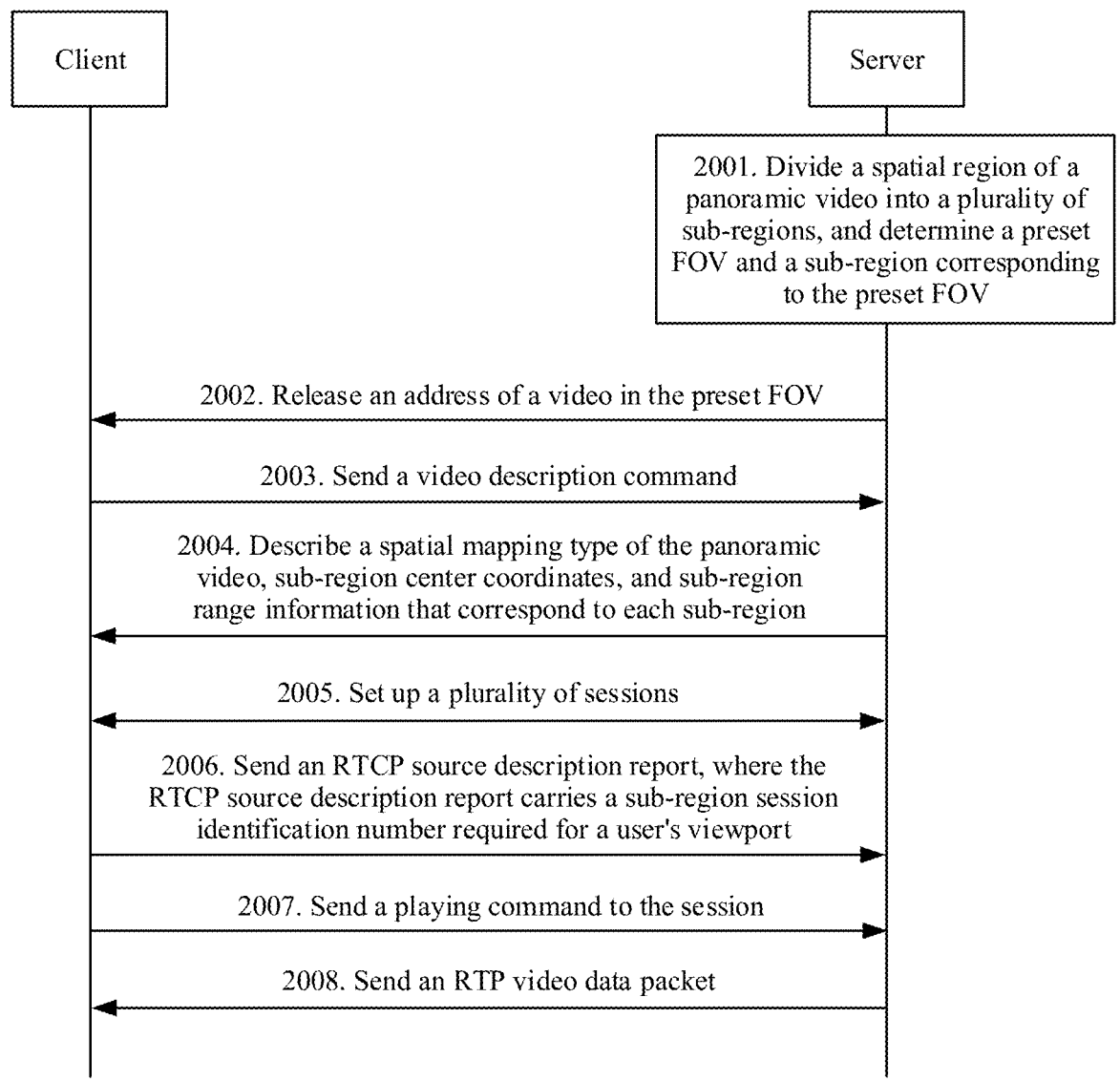
FIG. 6 is a schematic flowchart of a media data transmission method according to an embodiment of this application.

FIG. 6 shows a specific procedure of a media data transmission method described in Embodiment 2. The method shown in FIG. 6 includes step 2001 to step 2008. The following describes in detail step 2001 to step 2008.

2001. A server divides a spatial region of a panoramic video into a plurality of sub-regions, and determines a preset FOV and a sub-region corresponding to the preset FOV.

The sub-region corresponding to the preset FOV may be obtained from the panoramic video or may be obtained through rendering (may be generated by performing rendering in a corresponding agreed-on sub-region range based on a sub-region related to a requested viewport).

2002. Release an address of a video in the preset FOV.

The address of the video content released by the server may be an address in an RTSP protocol format. For example, the address of the video content released by the server may be rtsp://server.example.com/video.

2003. The client sends a video description command to the server.

2004. The server describes a spatial mapping type of the panoramic video, sub-region center coordinates, and sub-region range information that correspond to each sub-region.

In step 2002, the client may send the video description command to the address in step 2001. After receiving the video description command from the client, the server responds to the video description command, and an FOV region range that can be supported by the server is described.

For example, the description command sent by the client to the server may be shown in Table 14.

TABLE 14

DESCRIBE rtsp://server.example.com/video RTSP/1.0
CSeq: 1
Accept: application/sdp In Table 14, the field DESCRIBE indicates a video description command.

After receiving the video description command shown in Table 14, the server sends a session description file SDP to the client. A specific format of the SDP description file is shown in Table 15.

TABLE 15

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000
d=ERP 0:45 45 0 90 90
a=control:track1
//session for tile1 content
...
c=IN IP4 0.0.0.0
b=AS:5000
m=video 0 RTP/AVP 96
a=rtpmap:96 H264/90000
d=ERP 0:−45 −45 0 90 90
a=control:track8
//session for tile8 content
c=IN IP4 0.0.0.0
b=AS:1000
m=video 0 RTP/AVP 96
a=rtpmap:96 H264/90000
d=ERP 0:0 0 0 360 180
a=control:track9
//session for panoramic content The SDP description file shown in Table 15 describes a total of nine video sessions. Sub-region (tiles) bitstreams corresponding to eight of the video sessions are track1 to track8, and a bit rate of a bitstream corresponding to each sub-region is 5000 kbps. The other video session corresponds to a panoramic bitstream (track9) with a bit rate of 1000 kbit/s. Optionally, the SDP description file shown in Table 15 may include only sub-region description information, but does not include panoramic bitstream description information.

Both the sub-region description information and the panoramic bitstream description information may be transmitted by using the RTP protocol.

d=<projection_type><shape_type>: <azimuth><elevation><tilt><azimuth_range><elevation_range>. Semantics of the statements in d is as follows:

projection_type: represents an expression type of a two-dimensional spatial range of a panoramic video, and may be a longitude and latitude map, a hexahedron, an octahedron, or the like;

shape_type: represents a region shape identifier that identifies a shape type of an enclosed region, and may be obtained by enclosing four great circles or by enclosing two great circles and one small circle;

azimuth: represents an azimuth of the center point of a sub-region;

elevation: represents a pitch or elevation angle of the center point of the sub-region;

tilt: represents a tilt angle of the center point of the sub-region;

azimuth_range: represents an azimuth range of the sub-region; and elevation_range: represents a pitch or elevation range of the sub-region.

The SDP description file may carry two-dimensional coordinate information describing the center point and a range of the content in the region. There may be a plurality of specific forms, and a possible form is shown in Table 16.

d=<projection_type>: <h_center><v_center><h><v>. Semantics of the statements in d is as follows:

projection_type: represents an expression type of a two-dimensional spatial range of a panoramic video, and for example, may be a longitude and latitude map, a hexahedron, or an octahedron;

h_center: represents a horizontal coordinate value of the center point of a region;

v_center: represents a vertical coordinate value of the center point of the region;

h: represents a horizontal width of the region; and v: represents a vertical height of the region.

When a position of content in the region is described, not only coordinate values of the center point of the region but also two-dimensional coordinates of the top-left corner of the content in the region and a size range of the content in the region may be used for representation.

Optionally, the SDP description file may carry two-dimensional coordinate information describing the two-dimensional coordinates of the top-left corner of the content in the region and the size range of the content in the region. An optional form is shown in Table 17.

TABLE 16

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000
d=ERP:320 320 640 640
a=control:track1
//session for tile1 content
. . .
c=IN IP4 0.0.0.0
b=AS:5000
m=video 0 RTP/AVP 96
a=rtpmap:96 H264/90000
d=ERP:4000 4000 640 640
a=control:track8
//session for tile8 content
c=IN IP4 0.0.0.0
b=AS:1000
m=video 0 RTP/AVP 96
a=rtpmap:96 H264/90000
d=ERP:3840 1920 7680 3840
a=control:track9
//session for panoramic content

TABLE 17

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000
d=ERP:0 0 640 640
a=control:track1
//session for tile1 content
. . .
c=IN IP4 0.0.0.0
b=AS:5000
m=video 0 RTP/AVP 96
a=rtpmap:96 H264/90000
d=ERP:5400 3200 640 640
a=control:track8
//session for tile8 content
c=IN IP4 0.0.0.0
b=AS:1000
m=video 0 RTP/AVP 96
a=rtpmap:96 H264/90000
d=ERP:3840 1920 7680 3840
a=control:track9
//session for panoramic content d=<projection_type>: <h_left_top><v_left_top><h><v>. Semantics of the syntaxes in d is as follows:

projection_type: represents an expression type of a two-dimensional spatial range of a panoramic video, and may be a longitude and latitude map, a hexahedron, an octahedron, or the like;

h_left_top: represents a coordinate value of the top-left corner center point of a region;

v_left_top: represents a coordinate value of the top-left corner center point of the region;

h: represents a horizontal width of the region; and v: represents a vertical height of the region.

Optionally, another manner in which the SDP description file carries the two-dimensional coordinate information describing the two-dimensional coordinates of the top-left corner of the content in the region and the size range of the content in the region is shown in Table 18.

TABLE 18

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000
d=ERP:0 0 640 640
a=control:track1
//session for tile1 content
. . .
c=IN IP4 0.0.0.0
b=AS:5000
m=video 0 RTP/AVP 96
a=rtpmap:96 H264/90000
d=ERP:5400 3200 640 640
a=control:track8
//session for tile8 content
c=IN IP4 0.0.0.0
b=AS:1000
m=video 0 RTP/AVP 96
a=rtpmap:96 H264/90000

TABLE 18-continued

```
d=ERP:3840 1920 7680 3840
a=control:track9
//session for panoramic content
``` d=<projection_type>: <h_left_top><v_left_top><h><v>. Semantics of the syntaxes in d is as follows:

projection_type: represents an expression type of a two-dimensional spatial range of a panoramic video, and may be a longitude and latitude map, a hexahedron, an octahedron, or the like;

h_left_top: represents a coordinate value of the top-left corner center point of a region;

v_left_top: represents a coordinate value of the top-left corner center point of the region;

h: represents a horizontal width of the region; and v: represents a vertical height of the region.

2005. Set up a plurality of sessions between the client and the server.

For example, when the SDP description file describes video content of nine sub-regions, nine sessions may be set up between the client and the server.

When each of the nine sessions is set up, the client may send a session connection setup command to the server. The session connection setup command is shown in Table 3. After receiving the session connection setup command, the server responds to the session connection setup command. Specific response content may be shown in Table 4. Sessions corresponding to sub-regions are gradually set up in the foregoing process, until the nine sessions are set up between the client and the server.

2006. The client sends an RTCP source description report to the server, where the RTCP source description report carries a session identification number of a sub-region required for the user's viewport.

The client may transmit the RTCP source description report to the server by using a session. A specific format of the sent RTCP source description report may be shown in Table 19.

be any number or character, and can uniquely distinguish between the plurality of sessions between the client and the server.

2007. The client sends a playing command to the server.

It should be understood that the playing command sent by the client to the server is valid for each of the foregoing sessions.

2008. The server sends an RTP video data packet to the client.

The server may send sub-regional video data to the client through a plurality of session connections provided by SDES information.

Optionally, when the user's viewport changes, the client sends an RTCP source description report to the server, to make an update with specific session connections that need to be used by the server to send corresponding video content.

When receiving the RTCP source description report re-sent by the client, the server extracts the content in the FOV region from the panoramic video or renders the content in the FOV in real time, based on latest viewport information of the user, and then encodes and sends video data in the FOV.

In Embodiment 2, the plurality of sessions are set up between the client and the server, and each session corresponds to one sub-region. In addition, when the client reports the RTCP description report, descriptions are provided by carrying the session identification number corresponding to the sub-region required for the user's viewport. Actually, one session may alternatively be set up between the client and the server. An RTCP source description report is sent to the server by using the session. The RTCP description report carries the identification number of the sub-region required for the client user's viewport.

TABLE 19

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   SC    |  PT=SDES=202  |           length              |
+=+=+=+=+=+=+=+=+=+=+=+=+=+=+=+=+=+=+=+=+=+=+=+=+=+=+=+=+=+=+=+=+
|                         SSRC/CSRC_1                           |
+-+-+-+-+-+-+-+-+-+-+-+-+-+-+-+-+-+-+-+-+-+-+-+-+-+-+-+-+-+-+-+-+
| SESSION_FOV=11|  SESSION_NUM   |         sessionID1           |
+=+=+=+=+=+=+=+=+=+=+=+=+=+=+=+=+=+=+=+=+=+=+=+=+=+=+=+=+=+=+=+=+
|           sessionID2           |        ...                   |
+-+-+-+-+-+-+-+-+-+-+-+-+-+-+-+-+-+-+-+-+-+-+-+-+-+-+-+-+-+-+-+-+
```

In Table 19, a type of the SDES item is identified by using the field SESSION_FOV (SESSION_FOV=11 is used as an example herein). The RTCP source description report shown in Table 19 carries session identification number information corresponding to a sub-region (which optionally includes a panoramic video) required for a viewport of the client. Optionally, in Table 19, the field SESSION_FOV may alternatively not exist.

In addition, in Table 19, SESSION_NUM represents a quantity of required sessions. sessionID1 identifies that the first session connection identifier is required, sessionID2 represents that the second session connection identifier is required, and so on. The session connection identifier may Embodiment 3

Figure 7:
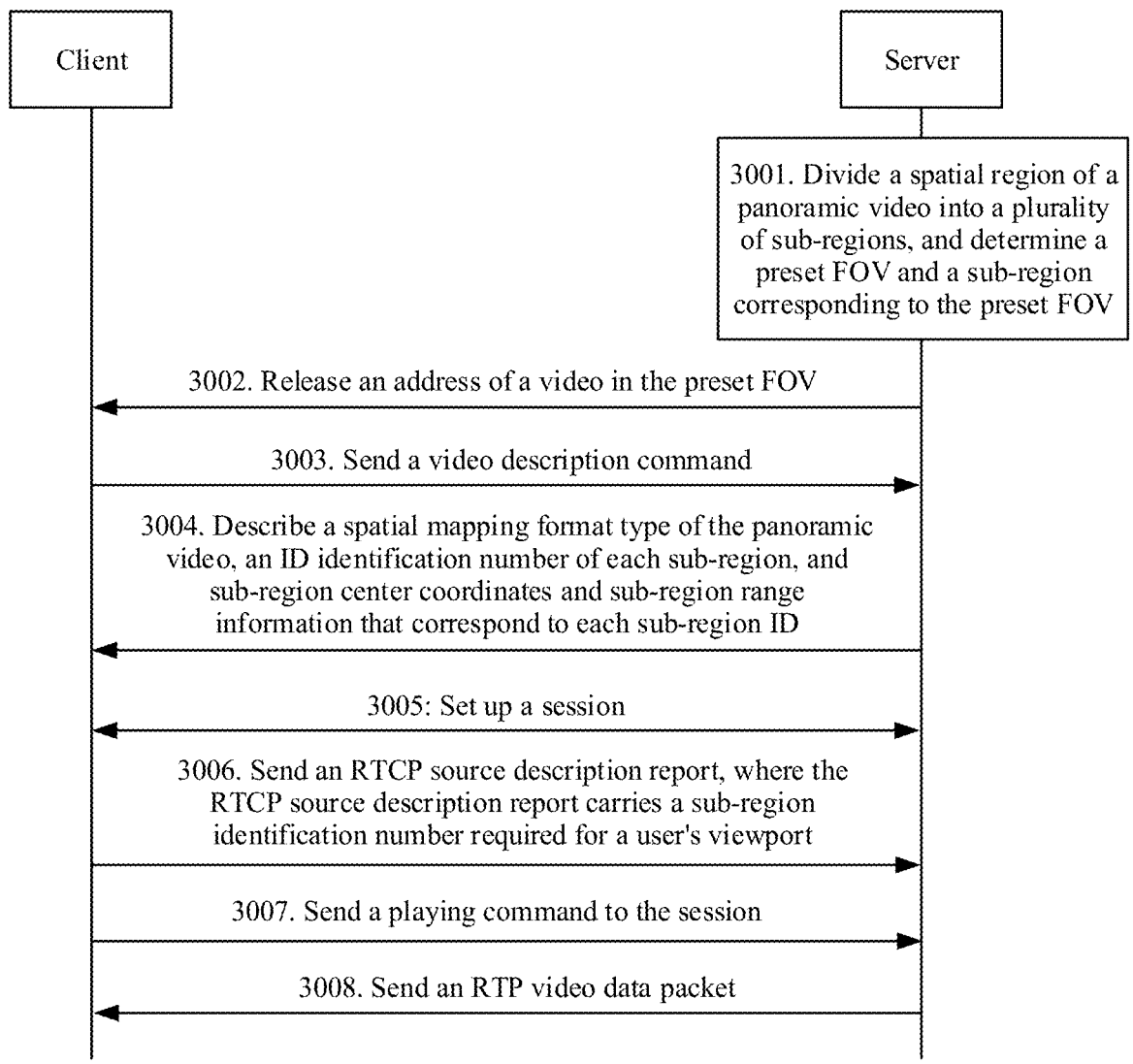
FIG. 7 is a schematic flowchart of a media data transmission method according to an embodiment of this application.

FIG. 7 shows a specific procedure of a media data transmission method described in Embodiment 3. The method shown in FIG. 7 includes step 3001 to step 3008. The following describes in detail step 3001 to step 3008.

3001. A server divides a spatial region of a panoramic video into a plurality of sub-regions, and determines a preset FOV and a sub-region corresponding to the preset FOV.

The sub-region corresponding to the preset FOV may be obtained from the panoramic video or obtained through rendering.

3002. Release an address of a video in the preset FOV.

The address of the video content released by the server may be an address in an RTSP protocol format. For example, the address of the video content released by the server may be rtsp://server.example.com/video.

3003. A client sends a video description command to the server.

3004. The server describes a spatial mapping format type of the panoramic video, an ID identification number of each sub-region, and sub-region center coordinates and sub-region range information that correspond to each sub-region ID.

In step 3003, the client may send the video description command to the address in step 3003. After receiving the video description command from the client, the server responds to the video description command, and an FOV region range that can be supported by the server is described.

For example, the description command sent by the client to the server may be shown in Table 20.

TABLE 20

DESCRIBE rtsp://server.example.com/video RTSP/1.0
CSeq: 1
Accept: application/sdp In Table 20, the field DESCRIBE indicates a video description command.

After receiving the video description command shown in Table 20, the server sends a session description file SDP to the client. A specific format of the SDP description file is shown in Table 21.

TABLE 21

RTSP/1.0 200 OK

CSeq: 1

Date: Wed, 16 Jul 2008 12:48:40 GMT

Content-Type: application/sdp //represents that a response is SDP information

Content-Length: 370

//SDP is described as follows v=0 a=StreamCount:integer;2

//session for tiles content c=IN IP4 0.0.0.0 b=AS:5000 m=video 0 RTP/AVP 96 a=rtpmap:96 H264/90000 d=ERP 0:8 1 0 0 0 90 90 2 45 45 0 90 90 . . . 8 180 45 0 90 90 a=control:track1

//session for tile content c=IN IP4 0.0.0.0 b=AS:1000 m=video 0 RTP/AVP 96 a=rtpmap:96 H264/90000 a=control:track2

//session for panoramic content

The SDP description file shown in Table 21 describes a total of two video sessions. One video session is for a sub-region (tiles) bitstream, and each bit rate is 5000 kbps. The other video session is for a panoramic (panoramic) bitstream with a bit rate of 1000 kbps. Each of the two sessions may be used to perform transmission by using the RTP protocol.

d=<projection_type>:
<subPic_Num><subPicID><azimuth><elevation><tilt><azimuth_range><elevation_range>      .      .      .
<subPicID><azimuth><elevation><tilt><azimuth_range><elevation_range>.

Semantics of the statements in d is as follows:

projection_type: represents an expression type of a two-dimensional spatial range of a panoramic video, and may be a longitude and latitude map, a hexahedron, an octahedron, or the like;

shape_type: represents a region shape identifier that identifies a shape_type of an enclosed region, and may be obtained by enclosing four great circles or by enclosing two great circles and one small circle;

subPic_Num: represents a quantity of regions obtained through division, facilitating parsing of a total quantity of groups of region parameters;

subPicID: represents an identification number of each region;

azimuth: represents an azimuth of the center point of a region;

elevation: represents a pitch or elevation angle of the center point of the region;

tilt: represents a tilt angle of the center point of the region;

azimuth_range: represents an azimuth range of the region; and elevation_range: represents a pitch or elevation range of the region.

Optionally, the form shown in Table 21 may alternatively be used to describe only one video session, for example, only the sub-region bitstream.

Alternatively, the panoramic bitstream and the sub-region bitstream may be placed in a same description field. A possible form is shown in Table 22.

TABLE 22

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000
d=ERP:9 1 0 0 0 90 90 2 45 45 0 90 90 . . . 8 180 45 0 90 90 9 0 0 0 360 180
// The last item 9 0 0 0 360 180 represents a panoramic video. A sequence of describing the panoramic bitstream and the sub-region bitstream can be adjusted. Each regional information can serve as an independent description field.
a=control:track1

In Table 21, d=<projection_type>:<subPic_Num><subPicID><x><y><h><v> . . . <subPicID><x><y><h><v>.

Semantics of the statements in d is as follows:

projection_type: represents an expression type of a two-dimensional spatial range of a panoramic video, and may be a longitude and latitude map, a hexahedron, an octahedron, or the like;

subPic_Num: represents a quantity of regions, facilitating parsing of a total quantity of groups of region parameters;

subPicID: represents an identification number of each region;

x: represents a horizontal coordinate value of the center of a region, or may optionally be a horizontal coordinate value of the top-left corner of the region;

y: represents a vertical coordinate value of the center of the region, or may optionally be a vertical coordinate value of the top-left corner of the region;

h: represents a horizontal width of the region; and v: represents a vertical height of the region.

3005. Set up a session between the client and the server.

A process of setting up the session between the client and the server in step 3005 is as described in step 1004.

3006. The client sends an RTCP source description report to the server, where the RTCP source description report carries a sub-region identification number required for a user's viewport.

The client may send the RTCP source description report to the server by using the session set up between the client and the server.

A possible form of the RTCP source description report sent in step 3006 is shown in Table 23.

TABLE 23

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P|   SC    |  PT=SDES=202  |             length            |
+=+=+=+=+=+=+=+=+=+=+=+=+=+=+=+=+=+=+=+=+=+=+=+=+=+=+=+=+=+=+=+=+
|                          SSRC/CSRC_1                          |
+-+-+-+-+-+-+-+-+-+-+-+-+-+-+-+-+-+-+-+-+-+-+-+-+-+-+-+-+-+-+-+-+
|  SUBPIC_FOV=12  |    subPicNum    |          subPicID1        |
+=+=+=+=+=+=+=+=+=+=+=+=+=+=+=+=+=+=+=+=+=+=+=+=+=+=+=+=+=+=+=+=+
|              subPicID2            |                           |
+-+-+-+-+-+-+-+-+-+-+-+-+-+-+-+-+-+-+-+-+-+-+-+-+-+-+-+-+-+-+-+-+
```

In Table 22, a type of the SDES item is identified by using the field SUBPIC_FOV (for example, SUBPIC_FOV=12), and the field SUBPIC_FOV indicates specific sub-regions (which may optionally include a panoramic video) required for a viewport of the client. Optionally, the field SUB-PIC_FOV may alternatively not exist. subPicNum represents content of a specific quantity of required sub-regions. subPicID1 represents an identification number of the required first sub-region, subPicID2 represents an identification number of the required second sub-region, and so on.

3007. The client sends a playing command to the server.

Specific content of the playing command sent by the client to the server in step 3007 is the same as that in step 1006, and details are not described herein again.

3008. The server sends, to the client, an RTP video data packet corresponding to the user's viewport, where each RTP packet header includes a currently carried ID identification number of a region to which the video content belongs, and optionally includes an identification number of a frame in which an FOV to which a current region belongs is located, or other information that identifies that content in different regions belongs to a same FOV.

In step 3008, an optional format of the sent RTP video data packet is shown in Table 24.

TABLE 24

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|X|   CC  |M|     PT      |        sequence number        |
+=+=+=+=+=+=+=+=+=+=+=+=+=+=+=+=+=+=+=+=+=+=+=+=+=+=+=+=+=+=+=+=+
|                           timestamp                            |
+-+-+-+-+-+-+-+-+-+-+-+-+-+-+-+-+-+-+-+-+-+-+-+-+-+-+-+-+-+-+-+-+
|            synchronization source (SSRC) indentifier           |
+=+=+=+=+=+=+=+=+=+=+=+=+=+=+=+=+=+=+=+=+=+=+=+=+=+=+=+=+=+=+=+=+
|              contributing source (CSRC) identifiers            |
+-+-+-+-+-+-+-+-+-+-+-+-+-+-+-+-+-+-+-+-+-+-+-+-+-+-+-+-+-+-+-+-+
```

The RTP data packet may be extended to carry video data in the RTP data packet. An extension format is shown in Table 25.

TABLE 25

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|       defined by profile       |            length             |
+=+=+=+=+=+=+=+=+=+=+=+=+=+=+=+=+=+=+=+=+=+=+=+=+=+=+=+=+=+=+=+=+
|           subPicID             |           FOV_SN              |
+-+-+-+-+-+-+-+-+-+-+-+-+-+-+-+-+-+-+-+-+-+-+-+-+-+-+-+-+-+-+-+-+
```

In Table 24, subPicID identifies the currently carried ID identification number of the region to which the video content belongs, and FOV_SN identifies a sequence number of a viewport to which the content belongs, so that the client combines videos with different subPicIDs and a same FOV_SN to form content within an FOV, and sends and displays the content within the FOV.

In Embodiment 3, when the user's viewport changes, to accurately present a video within a field of the user's viewport, the client may send an RTCP source description report to the server again (step 3006 is performed again), to update viewport center point information of the user or viewport region range information of the user. The server extracts the content in the FOV region from the panoramic video or renders the content in the FOV in real time, based on latest viewport information of the user, and then encodes and sends video data in the FOV.

In Embodiment 3, the client determines a sub-region corresponding to the user's viewport, and carries, in the RTCP description report sent to the server, an identification number of the sub-region required for the user's viewport. Actually, when the spatial region of the panoramic video is divided into the plurality of sub-regions, the client may carry only viewport information of the user in the RTCP source description report, and the server determines the sub-region corresponding to the user's viewport, and sends, to the client, a video data packet of the sub-region corresponding to the user.

Embodiment 4

Figure 8:
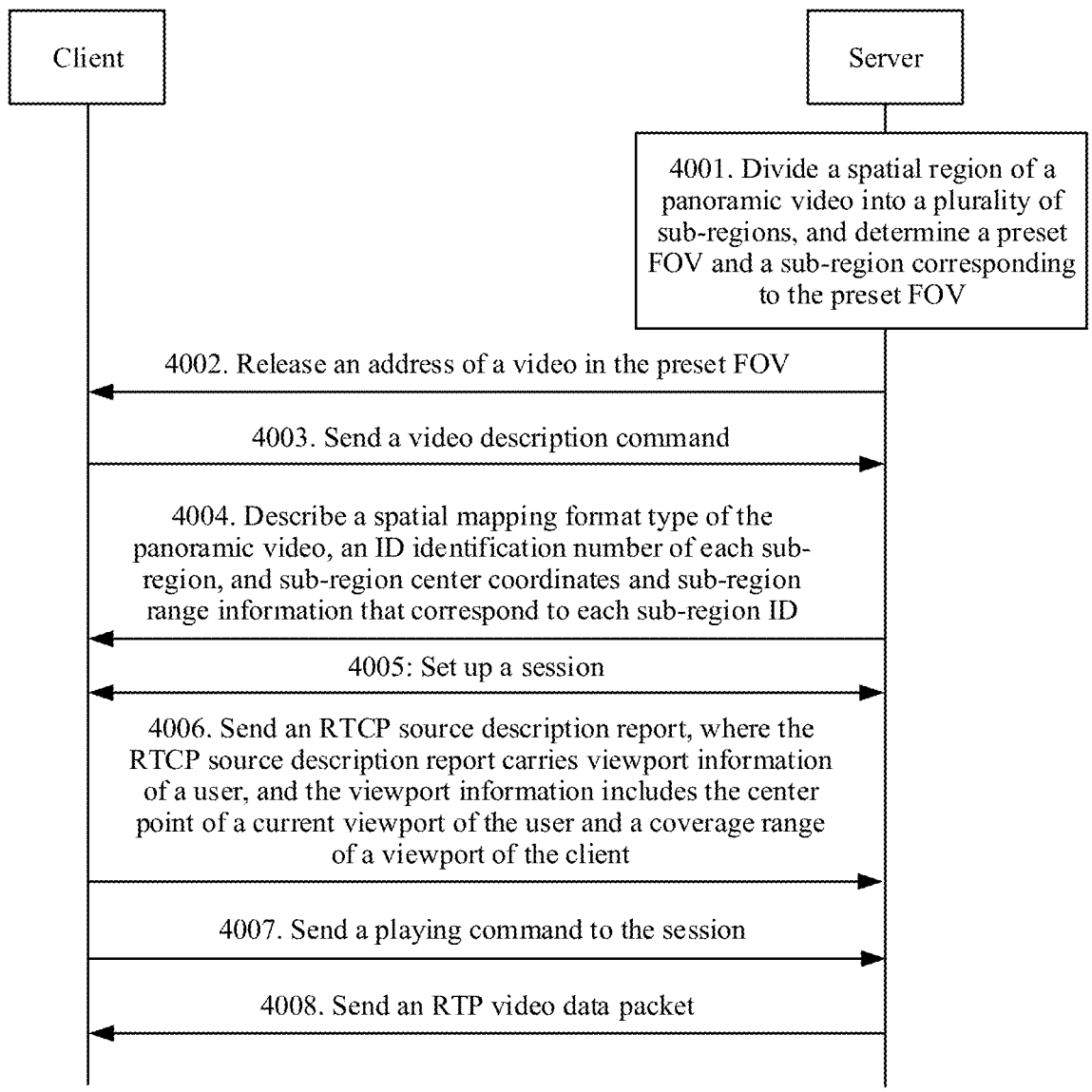
FIG. 8 is a schematic flowchart of a media data transmission method according to an embodiment of this application.

FIG. 8 shows a specific procedure of a media data transmission method described in Embodiment 4. The method shown in FIG. 8 includes step 4001 to step 4008. The following describes in detail step 4001 to step 4008.

4001. A server divides a spatial region of a panoramic video into a plurality of sub-regions, and determines a preset FOV and a sub-region corresponding to the preset FOV.

4002. Release an address of a video in the preset FOV.

4003. A client sends a video description command to the server.

4004. The server describes a spatial mapping format type of the panoramic video, an ID identification number of each sub-region, and sub-region center coordinates and sub-region range information that correspond to each sub-region ID.

4005. Set up a session between the client and the server.

Specific content of step 4001 to step 4005 in Embodiment 4 is the same as that of step 3001 to step 3005 in Embodiment 3, and details are not described herein again.

4006. The client sends an RTCP source description report to the server, where the RTCP source description report carries viewport information of a user, and the viewport information includes the center point of a current viewport of the user and a coverage range of a viewport of the client.

In step 4006, the client may send, by using an FOV video bitstream transmission session, the RTCP source description report to the server based on RTCP port information with which the server responds after a connection command is received. A specific format of the RTCP source description report may be shown in Table 26.

TABLE 26

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|   SC    |   PT = SDES = 202  |          length         |
+=+=+=+=+=+=+=+=+=+=+=+=+=+=+=+=+=+=+=+=+=+=+=+=+=+=+=+=+=+=+=+=+
|                           SSRC/CSRC_1                           |
+-+-+-+-+-+-+-+-+-+-+-+-+-+-+-+-+-+-+-+-+-+-+-+-+-+-+-+-+-+-+-+-+
|   COVERAGE = 9   |     length     |         H                  |
                                    |
+=+=+=+=+=+=+=+=+=+=+=+=+=+=+=+=+=+=+=+=+=+=+=+=+=+=+=+=+=+=+=+=+
|                              V                                 |
+-+-+-+-+-+-+-+-+-+-+-+-+-+-+-+-+-+-+-+-+-+-+-+-+-+-+-+-+-+-+-+-+
```

In Table 26, a type of the SDES item is identified by using the field COVERAGE (for example, COVERAGE=9), and the field COVERAGE indicates that the RTCP source description report carries the coverage range of the viewport of the client. H and V jointly describe the coverage range of the viewport. Optionally, H and V may respectively represent an azimuth range and a pitch or elevation range of VR spherical coordinates, or may respectively represent the width and the height of a two-dimensional picture.

The RTCP description report in Table 26 is used as an example. An example of an RTCP source description report describing that the center point of the user's viewport is located at −45, −45, 0 is shown in Table 7.

Optionally, viewport information such as the coverage range of the viewport and center point information of the viewport may be sent in a same SDES item.

Optionally, neither the field COVERAGE nor the field CENTER_FOV may exist, and the RTCP carries only the viewport information such as the coverage range of the viewport and the center point information of the viewport.

4007. The client sends a playing command to the server.

4008. The server sends, to the client, an RTP video data packet corresponding to the user's viewport, where each RTP packet header includes a currently carried ID identification number of a region to which video content belongs, and optionally includes an identification number of a frame in which an FOV to which a current region belongs is located, or other information that identifies that content in different regions belongs to a same FOV.

Specific processes of step 4007 and step 4008 are the same as those of step 3007 and step 3008 in Embodiment 3, and details are not described herein again.

In Embodiment 4, the viewport information of the user that is carried in the RTCP source description report sent by the client to the server not only includes the center point of the current viewport, but also carries the coverage range of the viewport of the client.

Optionally, the viewport information of the user that is carried in the RTCP source description report may alternatively carry only the center point of the current viewport. In this case, the coverage range of the viewport of the client may be preset.

In Embodiment 1 to Embodiment 4, when the server responds to the client and the video content is described, not only the video content in the FOV region range supported by the server can be described, several pieces of initial FOV information for the client to select may be further described.

Embodiment 5

In Embodiment 5, an SDP description file carries initial FOV information sent by a server. The SDP description file sent by the server to a client may carry the initial FOV information sent by the server. A format of the initial FOV information is shown in Table 27.

TABLE 27

RTSP/1.0 200 OK
CSeq: 1
Date: Wed, 16 Jul 2008 12:48:40 GMT
Content-Type: application/sdp //represents that a response is SDP information
Content-Length: 370
//SDP is described as follows
v=0
a=StreamCount:integer;2
//session for tiles content
c=IN IP4 0.0.0.0
b=AS:5000
m=video 0 RTP/AVP 96
a=rtpmap:96 H264/90000
a=control:track1
d=H:V:X:Y:Z In the SDP description file shown in Table 27, H and V jointly describe an FOV range. H and V may represent an azimuth range and a pitch or elevation range of VR spherical coordinates, respectively, or may respectively represent the width and the height of a two-dimensional picture. X, Y, and Z jointly identify information about the center point of an initial viewport. Optionally, X, Y, and Z may correspond to (azimuth, elevation, tilt) values of VR spherical coordinates, respectively; or only two items (X and Y) may be reserved to correspond to two-dimensional coordinate values of the center point of a viewport region or coordinate values of the top-left corner of a viewport region.

It should be understood that, in Embodiment 6, except that the server sends the SDP description file, other steps may be the same as those in Embodiment 1 to Embodiment 5.

It should be understood that, in Embodiment 1 to Embodiment 6, information about FOV information is transmitted in real time based on a streaming media transmission technology, and a specific implementation is to carry viewport information of a user and corresponding FOV information in original data. Actually, some transmission protocols may alternatively be self-defined to implement real-time transmission of the FOV information.

For example, viewport information fed back by the client may be sent by using a message defined in a user-defined TLV message mode. An optional TLV format is shown in Table 28.

TABLE 28

++++++++++++++++++++++++++++++++++++++++++++++++++++++++
|      |      |      |      |      |      |      |
|
Type  |  length                                 |  payload
Type (8 bits): represents a data type
length (32 bits): represents a payload length Different types (type) have different payloads, and a possible form is shown in Table 29.

TABLE 29

| Type | Semantics | Payload |
|---|---|---|
| 0x00 | FOV range information | H, V |
| 0x01 | FOV position information | X, Y, Z |
| 0x02 | FOV range and position information | V, H, X, Y, Z |
| Other | Reserved | |

In Table 28, H and V jointly describe a range of an FOV. H and V may represent an azimuth range and a pitch or elevation range of VR spherical coordinates, respectively, or may respectively represent the width and the height of a two-dimensional picture. X, Y, and Z jointly identify information about the center point of a viewport. Optionally, X, Y, and Z may correspond to (azimuth, elevation, tilt) values of VR spherical coordinates, respectively; or only two items (X and Y) may be reserved to correspond to two-dimensional coordinate values of the center point of a viewport region or coordinate values of the top-left corner of a viewport region.

It should be understood that data is also sent by the server in a TLV mode. An optional TLV format is shown in Table 29.

Different types (type) have different payloads, and a possible form is shown in Table 30.

TABLE 30

| Type | Semantics | Payload |
|---|---|---|
| 0x00 | Sent region range information | H, V |
| 0x01 | Sent region position information | X, Y, Z |
| 0x02 | Sent region range and position information | V, H, X, Y, Z |
| 0x03 | Region content data | video content |
| 0x04 | Region content data and region position data | video content, X, Y, Z |
| 0x05 | Region content data, region position data, and region range data | video content, X, Y, Z, H, V |
| Other | Reserved | |

In Table 30, H and V jointly describe a range, sent by the server to the client, of a video within a window. H and V may respectively represent an azimuth range azimuth range and a pitch or elevation range elevation range of VR spherical coordinates, or may represent the width and the height of a two-dimensional picture. X, Y, and Z jointly identify information about a window center point. Optionally, X, Y, and Z may correspond to azimuth, elevation, and tilt values of VR spherical coordinates, respectively; or only two items (X and Y) may be reserved to correspond to two-dimensional coordinate values of the center point of a viewport region or coordinate values of the top-left corner of a viewport region. video content represents video content, to be specific, compressed video data.

Further, when data is also sent by the server in a TLV mode, to ensure that an FOV is formed by correctly merging content of sub-regions at a same moment, the TLV data sent by the server to the client needs to include an identification number of the FOV. An optional TLV format is shown in Table 31.

TABLE 31

| Type | Semantics | Payload |
|---|---|---|
| 0x00 | Sent region range information | H, V |
| 0x01 | Sent region position information | X, Y, Z |
| 0x02 | Sent region range and position information | V, H, X, Y, Z |
| 0x03 | Region content data | video content |
| 0x04 | Region content data and region position data | video content, X, Y, Z |
| 0x05 | Region content data, region position data, and region range data | video content, X, Y, Z, H, V |
| 0x06 | Region content data, region position data, and an FOV identification number of a region | video content, X, Y, Z, FOV_SN |
| 0x07 | Region content data, region position data, region range data, and an FOV identification number of a region | video content, X, Y, Z, H, V, FOV_SN |
| Other | Reserved | |

In Table 31, H and V jointly describe a range, sent by the server to the client, a video within a window. H and V may respectively represent an azimuth range and a pitch or elevation range of VR spherical coordinates, or may represent the width and the height of a two-dimensional picture. X, Y, and Z jointly identify information about a window center point. Optionally, X, Y, and Z may correspond to azimuth, elevation, and tilt values of VR spherical coordinates, respectively; or only two items (X and Y) may be reserved to correspond to two-dimensional coordinate values of the center point of a viewport region or coordinate values of the top-left corner of a viewport region. video content represents compressed video data. FOV_SN represents an FOV identification number of a video in a current region.

The foregoing describes in detail the media data transmission method in the embodiments of this application with reference to Embodiment 1 to Embodiment 6. Actually, when reporting spatial information of the current viewport to the server, the client may further report, to the server, viewpoint information of the current viewport, so that the server can comprehensively determine a second target video picture with reference to the spatial information of the current viewport and the viewpoint information of the current viewport. In addition, the client may further indicate specific composition of the spatial information of the current viewport by sending indication information to the server. The following describes in detail the two cases with reference to Embodiment 7 and Embodiment 8.

Embodiment 7

Figure 9:
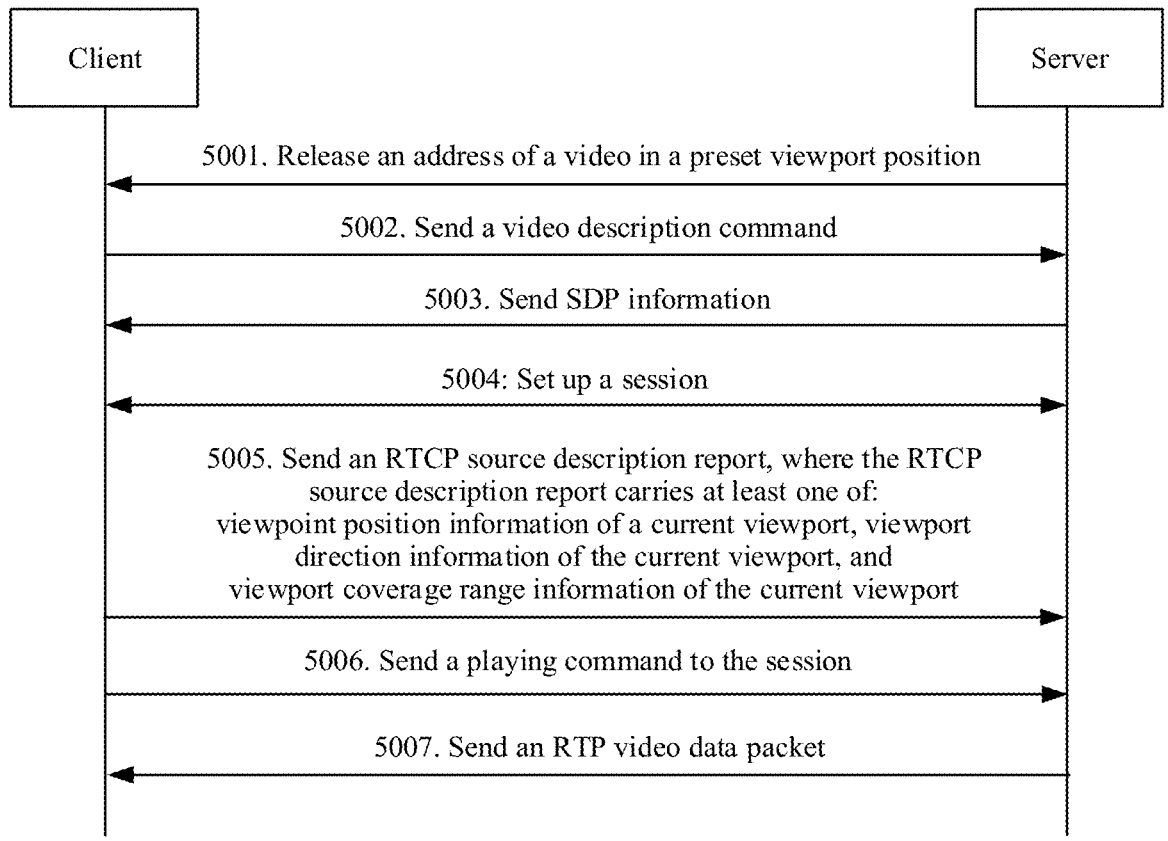
FIG. 9 is a schematic flowchart of a media data transmission method according to an embodiment of this application.

FIG. 9 shows a specific process of a media data transmission method described in Embodiment 7. The specific process shown in FIG. 9 includes step 5001 to step 5007. The following describes in detail step 5001 to step 5007.

5001. A server releases an address of a video in a preset viewport position.

A specific process of step 5001 is the same as that of step 1001 in Embodiment 1, and details are not described herein again.

5002. A client sends a description command to the address in step 5001.

A specific process of sending the description command in step 5002 is the same as that in step 1002. Related explanations, limitations, and examples of step 1002 are also applicable to step 5002, and details are not described herein again.

5003. The server sends SDP information to the client.

The SDP information includes preset viewpoint position information, preset FOV direction information, and preset FOV range information.

The SDP information may be an SDP description file, and specific content of the SDP description file may be shown in Table 32.

TABLE 32

RTSP/1.0 200 OK
CSeq: 1
Date: Wed, 16 Jul 2008 12:48:40 GMT
Content-Type: application/sdp //represents that a response is SDP information
. . .
//session for tiles content
c=IN IP4 0.0.0.0
b=AS:5000
m=video 0 RTP/AVP 96
a=rtpmap:96 H264/90000 FOV
a=control:track1
d=location_x:location_y:location_z:X:Y:Z:H:V The SDP description file in Table 32 describes a video session. Compared with Table 2 in Embodiment 1, in Table 32, spatial position information of a preset viewpoint and the preset FOV direction information are added to information included in the SDP description file. (location_x, location_y, location_z) represent spatial position information of the preset viewpoint, and (X, Y, Z) represent the preset FOV direction information. It is assumed that the preset viewpoint point is a viewpoint A. In this case, (location_x, location_y, location_z) may jointly describe a spatial coordinate position of the viewpoint A, and (X, Y, Z) may identify direction information of the center of an FOV on a unit sphere with the viewpoint A as a sphere center.

Optionally, in (X, Y, Z), X may correspond to an azimuth or a yaw in a three-dimensional coordinate system (for example, a three-dimensional rectangular coordinate system), Y may correspond to a pitch or elevation angle (pitch or elevation) in the three-dimensional coordinate system, and Z may correspond to a tilt angle (tilt) or a roll angle (roll) in the three-dimensional coordinate system.

The three-dimensional coordinate system may be a three-dimensional coordinate system with a position of the viewpoint A as the origin.

Optionally, only (X, Y) may be used to identify direction information of the center point of an FOV on a unit sphere with the viewpoint A as a sphere center. For example, (X, Y) may correspond to two-dimensional coordinate values of the center point of a viewport region, or (X, Y) may correspond to coordinate values of the top-left corner of a viewport region.

The SDP description file shown in Table 32 may be transmitted based on the RTP protocol.

5004. Set up a session between the client and the server.

A specific process of step 5004 is the same as a specific process of step 1004, and details are not described herein again.

5005. The client sends an RTCP source description report to the server, where the RTCP source description report carries at least one of: viewpoint position information of a current viewport, viewport direction information of the current viewport, and viewport coverage range information of the current viewport.

Information, such as the viewpoint position information of the current viewport, the viewport direction information of the current viewport, and the viewport coverage range information of the current viewport, carried in the RTCP source description report may be referred to as viewport information of the current viewport. The viewport information of the current viewport includes at least one of: the viewpoint position information of the current viewport, the viewport direction information of the current viewport, and the viewport coverage range information of the current viewport.

Further, the RTCP source description report may carry viewport information of a current viewport of a user. The viewport information may include any one of or a combination of more of: viewpoint position information, viewpoint displacement speed information, acceleration information of a viewpoint displacement speed, viewport direction information, viewport direction change speed information, and coverage range information of the current viewport.

It should be understood that the viewport information of the current viewport may alternatively be divided into spatial information of the current viewport and viewpoint information of the current viewport (which is equivalent to the foregoing first viewpoint information). The viewpoint information of the current viewport includes the viewpoint position information of the current viewport, the viewpoint displacement speed information of the current viewport, and the acceleration information of the viewpoint displacement speed of the current viewport. The spatial information of the current viewport includes the viewport direction information of the current viewport, the viewport direction change speed information of the current viewport, and the viewport coverage range information of the current viewport.

Optionally, the client may further send first indication information to the server. The first indication information includes a first identifier, and a value of the first identifier is used to indicate whether the spatial position information of the current viewpoint is relative spatial position information or absolute spatial position information. When (the value of) the first identifier is a first value, the spatial position information of the current viewpoint is relative spatial position information; or when the first identifier is a second value, the spatial position information of the current viewpoint is absolute spatial position information.

The first indication information may be carried in the RTCP source description report sent by the client to the server.

The first identifier may correspond to at least one bit, and different values of the at least one bit may be used to indicate whether the spatial position information of the current viewpoint is relative spatial position information or absolute spatial position information. In this application, a specific value that is of the first identifier and that indicates whether the spatial position information of the current viewpoint is relative spatial position information or absolute spatial position information is not limited. Any manner in which different values of the first identifier can indicate whether the spatial position information of the current viewpoint is relative spatial position information or absolute spatial position information falls within the protection scope of this application.

In this application, when the spatial position information of the current viewpoint is the relative spatial position information, an amount of data included in the reported spatial information of the current viewpoint can be reduced, thereby reducing resource overheads.

It should be understood that, when the spatial position information of the current viewpoint is the relative spatial position information, the spatial position information of the current viewpoint may be relative position information of the current viewpoint relative to a start viewpoint, a specified viewpoint, or a previous viewpoint. When the spatial position information of the current viewpoint is the absolute position information, the spatial position information of the current viewpoint may be relative position information of the current viewpoint relative to a specific fixed coordinate system (where the fixed coordinate system may be a preset fixed coordinate system).

Because the viewport information that is of the current viewpoint and that is carried in the RCTP source description report may include different types of information, the client may further send second indication information to the server. The second indication information is used to indicate the information carried in the RTCP source description report.

Optionally, the client may further send second indication information to the server. The second indication information includes a second identifier, and a value of the second identifier is used to indicate composition information of the spatial information of the current viewpoint.

The value of the second identifier is used to indicate at least one of the following cases:

when the second identifier is a third value, the spatial information of the current viewpoint includes viewport direction information of the current viewpoint;

when the second identifier is a fourth value, the spatial information of the current viewpoint includes the viewport direction information of the current viewpoint and position information of a viewpoint at which the current viewport is located; and when the second identifier is a fifth value, the spatial information of the current viewpoint includes the viewport direction information of the current viewpoint, the position information of the viewpoint at which the current viewport is located, and viewport size information of the current viewport.

The second indication information may be carried in the RTCP source description report sent by the client to the server.

Optionally, the viewport direction information of the current viewport may be absolute viewport direction information, or may be relative viewport direction information.

In this application, when a viewport direction of the current viewport is the relative viewport direction information, an amount of data included in the viewport direction information of the current viewport can be reduced, thereby reducing resource overheads.

When the viewport direction information of the current viewport is absolute viewport direction information, the viewport direction information of the current viewport may be viewport direction information relative to a specific fixed coordinate system; or when the viewport direction information of the current viewport is relative viewport direction information, the viewport direction information of the current viewport may be viewport direction information relative to a specific previous viewport direction (for example, a deflection angle relative to a previous viewport direction, or a deflection angle relative to an initial viewport direction).

Optionally, the client may further send third indication information to the server. The third indication information includes a third identifier, and a value of the third identifier is used to indicate whether the viewport direction information of the current viewport is relative or absolute viewport direction information or relative direction information. When (the value of) the third identifier is a sixth value, the viewport direction information of the current viewport is absolute viewport direction information; or when (the value of) the third identifier is a seventh value, the viewport direction information of the current viewport is relative viewport direction information.

The third indication information may be carried in the RTCP source description report sent by the client to the server.

It should be understood that the RTCP source description report in step 5005 may include only some main information in all the information that may be included in the viewpoint information. For example, a possible specific format of the RTCP source description report is shown in Table 33.

TABLE 33

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|    SC    |  PT = SDES = 202  |          length         |
+=+=+=+=+=+=+=+=+=+=+=+=+=+=+=+=+=+=+=+=+=+=+=+=+=+=+=+=+=+=+=+=+
|                          SSRC/CSRC_1                           |
+-+-+-+-+-+-+-+-+-+-+-+-+-+-+-+-+-+-+-+-+-+-+-+-+-+-+-+-+-+-+-+-+
| FOV_MESSAGE = 11 |   length   |        position_x              |
+=+=+=+=+=+=+=+=+=+=+=+=+=+=+=+=+=+=+=+=+=+=+=+=+=+=+=+=+=+=+=+=+
|         position_y           |         position_z              |
+=+=+=+=+=+=+=+=+=+=+=+=+=+=+=+=+=+=+=+=+=+=+=+=+=+=+=+=+=+=+=+=+
|           FOV_X              |           FOV_Y                 |
+=+=+=+=+=+=+=+=+=+=+=+=+=+=+=+=+=+=+=+=+=+=+=+=+=+=+=+=+=+=+=+=+
|           FOV_Z              |             H                   |
+=+=+=+=+=+=+=+=+=+=+=+=+=+=+=+=+=+=+=+=+=+=+=+=+=+=+=+=+=+=+=+=+
|                              V                                 |
-+-+-+-+-+-+-+-+-+-+-+-+-+-+-+-+-+-+-+-+-+-+-+-+-+-+-+-+-+-+-+-+
```

In Table 33, a type of the SDES item is identified by using the field FOV_POS_MESSAGE (for example, FOV_POS_MESSAGE=11), and field FOV_POS_MESSAGE indicates that the RTCP source description report carries viewport information fed back by the client.

H and V jointly describe an FOV range. H and V may respectively represent a horizontal coverage angle and a vertical coverage angle of VR spherical coordinates, or may respectively represent the width and the height of a two-dimensional picture.

FOV_X, FOV_Y, and FOV_Z jointly identify FOV rotation information.

Optionally, FOV_X corresponds to an azimuth or a yaw of a three-dimensional coordinate system, FOV_Y corresponds to an azimuth or a yaw of the three-dimensional coordinate system, and FOV_Z corresponds to a tilt angle (tilt) or roll angle (roll) of the three-dimensional coordinate system.

The three-dimensional coordinate system may be a three-dimensional coordinate system with a position of the current viewpoint as the origin.

It should be understood that only two items (FOV_X and FOV_Y) may alternatively be reserved to identify two-dimensional coordinate values of the center point of a corresponding FOV region in a panoramic two-dimensional video picture of the current viewpoint or coordinate values of the top-left corner of a corresponding FOV region in a panoramic two-dimensional video picture of the current viewpoint.

In addition, in the RTCP source description report, position_x, position_y, and position_z represent coordinate values of the spatial position information of the viewpoint.

It should be understood that, when the viewport direction does not change but the user moves only a viewpoint position, the client may feed back only viewpoint information to the server. Feeding back only the viewpoint information to the server by the client can reduce signaling overheads.

When the client feeds back only the viewpoint information to the server, a specific format of the RTCP source description report reported by the client to the server may be shown in Table 34.

TABLE 34

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|   SC   |   PT = SDES = 202  |           length          |
+=+=+=+=+=+=+=+=+=+=+=+=+=+=+=+=+=+=+=+=+=+=+=+=+=+=+=+=+=+=+=+=
|                        SSRC/CSRC_1                            |
+-+-+-+-+-+-+-+-+-+-+-+-+-+-+-+-+-+-+-+-+-+-+-+-+-+-+-+-+-+-+-+-+
| VP_POS_MESSAGE = 12 |     length    |        position_x        |
+=+=+=+=+=+=+=+=+=+=+=+=+=+=+=+=+=+=+=+=+=+=+=+=+=+=+=+=+=+=+=+=
|           position_y          |           position_z          |
+=+=+=+=+=+=+=+=+=+=+=+=+=+=+=+=+=+=+=+=+=+=+=+=+=+=+=+=+=+=+=+=+
```

In Table 34, a type of the SDES item is identified by using the field VP_POS_MESSAGE (for example, VP_POS_MESSAGE=12). position_x, position_y, and position_z represent coordinate values of a spatial position of a viewpoint in a three-dimensional Cartesian coordinate system or change values relative to a previous viewpoint position.

In some cases, the viewpoint is not fixed, but is always moving. In this case, information indicating a moving speed of the viewpoint may be reported to the server, so that the server can perform predictive rendering, pre-fetching, and delivery. In this way, a delay for transmitting a video picture to the client can be reduced, thereby improving user experience.

In this case, a possible implementation form of the RTCP source description report reported by the client to the server is shown in Table 35.

TABLE 35

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|   SC   |   PT = SDES = 202  |           length          |
+=+=+=+=+=+=+=+=+=+=+=+=+=+=+=+=+=+=+=+=+=+=+=+=+=+=+=+=+=+=+=+=
|                        SSRC/CSRC_1                            |
+-+-+-+-+-+-+-+-+-+-+-+-+-+-+-+-+-+-+-+-+-+-+-+-+-+-+-+-+-+-+-+-+
|   FOV_MESSAGE = 11   |    length   |       message_type        |
+=+=+=+=+=+=+=+=+=+=+=+=+=+=+=+=+=+=+=+=+=+=+=+=+=+=+=+=+=+=+=+=+
|            FOV_X              |            FOV_Y              |
+=+=+=+=+=+=+=+=+=+=+=+=+=+=+=+=+=+=+=+=+=+=+=+=+=+=+=+=+=+=+=+=+
|            FOV_Z              |              H                |
+=+=+=+=+=+=+=+=+=+=+=+=+=+=+=+=+=+=+=+=+=+=+=+=+=+=+=+=+=+=+=+=+
|              V                |           position_x          |
+=+=+=+=+=+=+=+=+=+=+=+=+=+=+=+=+=+=+=+=+=+=+=+=+=+=+=+=+=+=+=+=+
|           position_y          |           position_z          |
+=+=+=+=+=+=+=+=+=+=+=+=+=+=+=+=+=+=+=+=+=+=+=+=+=+=+=+=+=+=+=+=+
|          speed_pos_x          |          speed_pos_y          |
+=+=+=+=+=+=+=+=+=+=+=+=+=+=+=+=+=+=+=+=+=+=+=+=+=+=+=+=+=+=+=+=+
|          speed_pos_z          |          speed_fov_x          |
+=+=+=+=+=+=+=+=+=+=+=+=+=+=+=+=+=+=+=+=+=+=+=+=+=+=+=+=+=+=+=+=+
|          speed_fov_y          |          speed_fov_z          |
+-+-+-+-+-+-+-+-+-+-+-+-+-+-+-+-+-+-+-+-+-+-+-+-+-+-+-+-+-+-+-+-+
```

In Table 35, a type of the SDES item is identified by using the field FOV_MESSAGE (for example, FOV_MESSAGE=13, where FOV_MESSAGE may alternatively be another value, and is not limited herein), to indicate that the RTCP source description report carries viewport information of the client.

H and V jointly describe an FOV range. H and V may respectively represent a horizontal coverage angle and a vertical coverage angle of VR spherical coordinates, or may respectively represent the width and the height of a two-dimensional picture.

FOV_X, FOV_Y, and FOV_Z jointly identify FOV rotation information.

Optionally, FOV_X corresponds to an azimuth (azimuth) or a yaw (yaw) of a three-dimensional coordinate system, FOV_Y corresponds to an azimuth (azimuth) or a yaw (yaw) of the three-dimensional coordinate system, and FOV_Z corresponds to a tilt angle (tilt) or roll angle (roll) of the three-dimensional coordinate system.

The three-dimensional coordinate system may be a three-dimensional coordinate system with a position of the current viewpoint as the origin.

It should be understood that only two items (FOV_X and FOV_Y) may alternatively be reserved to identify two-dimensional coordinate values of the center point of a corresponding FOV region in a panoramic two-dimensional video picture of the current viewpoint or coordinate values of the top-left corner of a corresponding FOV region in a panoramic two-dimensional video picture of the current viewpoint.

In addition, in the RTCP source description report, position_x, position_y, and position_z represent coordinate values of the spatial position information of the viewpoint, and speed_pos_x, speed_pos_y, and speed_pos_z represent viewpoint position change speed values.

Further, the RTCP source description report carries speed_fov_x, speed_fov_y, and speed_fov_z.

speed_fov_x represents a change speed value of an azimuth (azimuth) or a yaw (yaw) of an FOV in a three-dimensional coordinate system, speed_fov_y represents a change speed value of a pitch or elevation angle (pitch or elevation) of the FOV in the three-dimensional coordinate system, and speed_fov_z represents a change speed value of a tilt angle (tilt) or a roll angle (roll) of the FOV in the three-dimensional coordinate system.

In the RTCP source description report, message_type identifies a type of the carried viewport information, and represents whether current SDES includes one type of or a combination of a plurality of types of information. Specific content of message_type is shown in Table 36.

TABLE 36

| Value | Message_type | Semantics |
| --- | --- | --- |
| 0x01 | FOV_X, FOV_Y, FOV_Z | Carry viewport rotation direction information |
| 0x02 | FOV_X, FOV_Y, FOV_Z, H, V | Carry viewport direction and size range information |
| 0x03 | position_x, position_y, position_z | Carry spatial position information of a viewpoint |
| 0x04 | FOV_X, FOV_Y, FOV_Z, position_x, position_y, position_z | Carry a viewpoint position and information such as a viewport direction of a current viewpoint |
| 0x05 | FOV_X, FOV_Y, FOV_Z, position_x, position_y, position_z, H, V | Carry a viewpoint position and information such as a viewport direction and a viewport size range of the current viewpoint |
| 0x06 | FOV_X, FOV_Y, FOV_Z, speed_fov_x, speed_fov_y, speed_fov_z | Carry viewport rotation information and viewport rotation speed information |

TABLE 36-continued

| Value | Message_type | Semantics |
|---|---|---|
| 0x07 | position_x, position_y, position_z, speed_pos_x, speed_pos_y, speed_pos_z | Carry a viewpoint position, and viewpoint position change speed information |
| ... | | Carry viewport rotation direction information |

It should be understood that only some possible combinations of the viewport information are listed in Table 36. Actually, any possible combination falls within the protection scope of this application. For brevity, combinations are not enumerated herein.

Optionally, whether current SDES includes one type of or a combination of a plurality of types of information may be represented in a form of a mask. That is, when each bit of message_type is 1, it identifies that an information type (which may be one type of or a combination of a plurality of types of information) corresponding to a current bit identifier is carried; otherwise, an information type is not carried.

It should be understood that different types of information in the viewport information of the current viewport may be sent in different SDES items.

The viewpoint position information, the viewpoint displacement speed information, the acceleration information of the viewpoint displacement speed, the viewport direction information, the viewport direction change speed information, and the viewport coverage range information of the current viewport may be sent in different SDES items (where each type of information may correspond to one SDES item, or a combination of a plurality of types of information may correspond to one SDES item).

Optionally, the spatial position information of the viewport may be relative position information of the viewpoint relative to a start viewpoint, a specified viewpoint, or a previous viewpoint.

The viewport direction information may be relative change amount information of a viewport direction relative to a start viewport direction, a specified viewport direction, or a previous viewport direction.

5006. The client sends a playing command to the server.

A specific process of step 5006 is the same as that of step 1006, and details are not described herein again.

5007. The server sends an RTP video data packet to the client.

In step 5007, the server sends, to the client in a form of an RTP data packet, video data corresponding to a viewport of the user.

The RTP data packet may carry spatial position information of a viewpoint at which a current window is located, direction information of a window center point, and coverage range information of the window.

The server may send, to the client by using a session, video content within a window (where the content includes content, in the FOV, requested by the client), where the video content is obtained through rendering or obtained by dividing a panoramic video. Encoded data may be carried in the RTP data packet, and the RTP data packet needs to carry the spatial position information of the viewpoint at which the window region is located, direction coordinates of the window center point, and horizontal and vertical coverage ranges.

A format of an RTP packet header of the RTP data packet is shown in Table 37.

TABLE 37

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V = 2|P|X|   CC  |M|   PT    |         sequence number         |
+=+=+=+=+=+=+=+=+=+=+=+=+=+=+=+=+=+=+=+=+=+=+=+=+=+=+=+=+=+=+=+=+
|                           timestamp                           |
+-+-+-+-+-+-+-+-+-+-+-+-+-+-+-+-+-+-+-+-+-+-+-+-+-+-+-+-+-+-+-+-+
|            synchronization source (SSRC) identifier           |
+=+=+=+=+=+=+=+=+=+=+=+=+=+=+=+=+=+=+=+=+=+=+=+=+=+=+=+=+=+=+=+=+
|              contributing source (CSRC) identifiers           |
+-+-+-+-+-+-+-+-+-+-+-+-+-+-+-+-+-+-+-+-+-+-+-+-+-+-+-+-+-+-+-+-+
```

To carry more information, the RTP data packet may be extended. A format of a packet header of an extended RTP data packet is shown in Table 38.

TABLE 38

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     defined by profile        |            length             |
+=+=+=+=+=+=+=+=+=+=+=+=+=+=+=+=+=+=+=+=+=+=+=+=+=+=+=+=+=+=+=+=+
|              X                |              Y                |
+-+-+-+-+-+-+-+-+-+-+-+-+-+-+-+-+-+-+-+-+-+-+-+-+-+-+-+-+-+-+-+-+
|              Z                |              H                |
+-+-+-+-+-+-+-+-+-+-+-+-+-+-+-+-+-+-+-+-+-+-+-+-+-+-+-+-+-+-+-+-+
|              V                |                               |
+-+-+-+-+-+-+-+-+-+-+-+-+-+-+-+-+-+-+-+-+-+-+-+-+-+-+-+-+-+-+-+-+
```

In Table 36, position_x, position_y, and position_z jointly identify position coordinates of the viewpoint at which the current window is located, and X, Y, and Z jointly represent a position, sent by the server to the client, of the center point of a video.

Optionally, in (X, Y, Z), X may correspond to an azimuth or a yaw of a three-dimensional coordinate system, Y may correspond to a pitch or elevation angle (pitch or elevation) in the three-dimensional coordinate system, and Z may correspond to a tilt angle (tilt) or a roll angle (roll) in the three-dimensional coordinate system.

The three-dimensional coordinate system may be a three-dimensional coordinate system with a position of the current viewpoint as the origin.

In addition, H and V jointly represent a range of the sent video content. H and V may respectively represent a horizontal coverage angle and a vertical coverage angle of VR spherical coordinates, or H and V may respectively represent values of a width pixel quantity and a height pixel quantity of a two-dimensional picture.

In Embodiment 7, to improve user experience, in actual application, window content whose FOV is larger than an FOV field of viewport requested by the client may be rendered by using prediction information or clipped from a panoramic video. When the client cannot obtain content within a new FOV in time, the client may obtain, from content within a previous window, the content corresponding to the new FOV. Therefore, coordinates of the center point of the window content, and azimuth and pitch and elevation angle elevation range information of the window content that can be sent by the server are carried, to support an application scenario in which a size of a window for performing encoding and transmission by the server changes adaptively.

When the user's viewport changes, to accurately present a video within a field of the user's viewport, the client may send an RTCP source description report to the server again (step 5005 is performed again), to update viewport center point information of the user or viewport region range information of the user. The server extracts the content in the FOV region from the panoramic video or renders the content in the FOV in real time, based on latest viewport information of the user, and then encodes and sends video data in the FOV.

In this embodiment of this application, to reduce a delay as much as possible, the viewport information may be transmitted by using an existing TCP or UDP communication protocol. The client feeds back a current viewpoint position or current viewport information to the server. The server sends, to the client based on a viewpoint position and viewport information that are requested by the client, specific window content corresponding to the viewpoint position. The sent content needs to carry a window position and size information.

When feeding back the viewport information to the server, the client sends the viewport information in a user-defined TLV (type, length, value) message mode.

Optionally, a possible TLV format used when the client reports the information is shown in Table 39.

TABLE 39

| Type | Semantics | Payload |
| --- | --- | --- |
| 0x00 | FOV range information | H, V |
| 0x01 | FOV position information | X, Y, Z |
| 0x02 | FOV range and position information | V, H, X, Y, Z |
| 0x03 | Viewpoint position information | position_x, position_y, position_z |
| 0x04 | Viewpoint displacement speed | speed_pos_x, speed_pos_y, speed_pos_z |
| 0x05 | FOV rotation speed | speed_fov_x, speed_fov_y, speed_fov_z |
| 0x06 | Viewpoint position information and FOV position information | position_x, position_y, position_z, X, Y, Z |
| 0x07 | Viewpoint position, and FOV position and range information | position_x, position_y, position_z, X, Y, Z, V, H |
| 0x08 | Viewpoint displacement and FOV rotation speed information | speed_x, speed_y, speed_z, speed_yaw, speed_pitch, speed_roll |
| Other | Reserved | Other |

In Table 37, H and V jointly describe an FOV range. H and V may respectively represent a horizontal coverage angle and a vertical coverage angle of VR spherical coordinates, or may respectively represent the width and the height of a two-dimensional picture.

X, Y and Z may jointly identify information about the center point of a viewport.

Optionally, in (X, Y, Z), X may correspond to an azimuth or a yaw of a three-dimensional coordinate system, Y may correspond to a pitch or elevation angle (pitch or elevation) in the three-dimensional coordinate system, and Z may correspond to a tilt angle (tilt) or a roll angle (roll) in the three-dimensional coordinate system.

The three-dimensional coordinate system may be a three-dimensional coordinate system with a position of the current viewpoint as the origin.

In addition, H and V jointly represent a range of sent video content. H and V may respectively represent a horizontal coverage angle and a vertical coverage angle of VR spherical coordinates, or H and V may respectively represent values of a width pixel quantity and a height pixel quantity of a two-dimensional picture.

speed_fov_x represents a change speed value of an azimuth or a yaw of an FOV in a three-dimensional coordinate system, speed_fov_y represents a change speed value of a pitch or elevation angle (pitch or elevation) of the FOV in the three-dimensional coordinate system, and speed_fov_z represents a change speed value of a tilt angle (tilt) or a roll angle (roll) of the FOV in the three-dimensional coordinate system.

When reporting the information to the server, the client reports the information in a TLV format; and when sending data to the client, the server also sends the data in a TLV format.

Optionally, a possible TLV format used by the server is shown in Table 40.

TABLE 40

| Type | Semantics | Payload |
| --- | --- | --- |
| 0x00 | Sent region range information | H, V |
| 0x01 | Sent region position information | X, Y, Z |
| 0x02 | Sent region range and position information | V, H, X, Y, Z |
| 0x03 | Region content data | video content |
| 0x04 | Region content data and region position data | video content, X, Y, Z |
| 0x05 | Region content data, region position data, and region range data | video content, X, Y, Z, H, V |
| 0x06 | Region content data, region position data, region range data, and viewpoint position of a current region | video content, X, Y, Z, H, V, position_x, position_y, position_z |
| 0x07 | Viewpoint position of the current region | position_x, position_y, position_z |
| 0x08 | Viewpoint position of the current region and sent region position information | X, Y, Z, position_x, position_y, position_z |
| Other | Reserved | Other |

In Table 40, H and V jointly describe a range, sent by the server to the client, of a video within a window. H and V may respectively represent a horizontal coverage angle and a vertical coverage angle of VR spherical coordinates, or may respectively represent the width and the height of a two-dimensional picture.

X, Y, and Z jointly identify information about a window center point.

Optionally, in (X, Y, Z), X may correspond to an azimuth or a yaw of a three-dimensional coordinate system, Y may correspond to a pitch or elevation angle (pitch or elevation) in the three-dimensional coordinate system, and Z may correspond to a tilt angle (tilt) or a roll angle (roll) in the three-dimensional coordinate system.

In addition, video content is compressed video data. position_x, position_y, and position_z represent currently sent position information of a viewpoint at which a window is located.

In this application, user-defined TLV format information can be used to support the client and the server in exchanging in real time the viewpoint position information, the viewpoint moving speed information, the viewport direction information, the viewport direction change speed information, and the region size information that are fed back, so that a transmission delay can be reduced as much as possible. This is applicable to an application scenario with a comparatively high real-time requirement.

Optionally, when feeding back information to the server, the client may alternatively feed back the information in a signal format that is defined in MMT and that is specific to a multimedia transmission application.

In this application, the viewport information reported by the client to the server, and picture-related information carried in a video data packet sent by the server to the client may be transmitted in a TLV format, or may be transmitted in a signal format that is defined in moving picture experts group media transport (MMT) and that is specific to a multimedia transmission application.

With reference to Embodiment 8, the following describes in detail a case in which spatial information of a video picture and viewport information are transmitted between a client and a server in a signal format that is defined in MMT and that is specific to a multimedia transmission application.

Embodiment 8

MMT (for example, specified in the standard ISO/IEC 23008-1) defines a set of signal formats specific to multimedia transmission applications. The standard ISO/IEC 23008-1 further defines the field "urn:mpeg:mmt:app:vr:2017" to identify that information is used for VR content transmission.

In the MMT standard, viewpoint information of an MMT VR receive end (which is equivalent to the foregoing client) needs to be periodically fed back to an MMT VR transmit end (which is equivalent to the foregoing server); or when a viewpoint position of a user changes, viewpoint information of an MMT VR receive end needs to be fed back to the MMT VR receive end, so that an MMT VR transmit end determines a viewpoint position of a current viewport. A new type is added to existing MMT information types to describe change information of the viewpoint position, so as to support the application when the viewpoint changes.

In addition to feeding back the viewpoint position information to the MMT VR transmit end, the MMT VR receive end may further feed back, to the MMT VR transmit end, one or more of types of information such as viewport change speed information, viewpoint change speed information, relative direction change information of a viewport relative to a specific viewport, an initial viewport, or a previous viewport, and position change information of a viewpoint relative to a specific viewpoint, an initial viewpoint, or a previous viewpoint (or may feed back any information combination).

Optionally, one piece of indication information may be transmitted between the client and the server (where the indication information may be information sent by the client to the server, or may be information sent by the server to the client), to indicate that the information transmitted between the client and the server includes specific information in the information such as the viewport position information, the viewport change speed information, the viewpoint change speed information, the relative direction change information of the viewpoint relative to the specific viewport, the initial viewport, or the previous viewport, and the position change information of the viewpoint relative to the specific viewpoint, the initial viewpoint, or the previous viewpoint. Different values of different identifiers of the indication information indicate that different information is carried.

A relationship between a value of an identifier of the indication information and indicated information may be shown in Table 41.

TABLE 41

| Application message type (Application Message Type) | Application message name (Application Message Name) |
| --- | --- |
| 0x01 | VRViewDependentSupportQuery |
| 0x02 | VRViewDependentSupportResponse |
| ... | ... |
| 0x07 | VRViewpointChangeFeedback |
| 0x08 | VRViewportSpeedFeedback |
| 0x09 | VRViewpointSpeedFeedback |
| 0x0A | VRViewportDeltaChangeFeedback |
| 0x0B | VRViewpointDeltaChangeFeedback |
| 0x0C | VR_content_window_range |
| 0x0D | VR_content_window_center |
| 0x0E | VR_content_window_viewpoint |
| 0x0F-0xFF | Reserved for future use |

Meanings or functions of the application messages in Table 41 are as follows:

VRViewDependentSupportQuery and VRViewDependentSupportResponse represent application messages used by the client and the server to determine whether the server supports viewport-based video stream transmission.

VRViewDependentSupportQuery represents that the client uses this command to check whether the server supports viewport-based video stream transmission.

VRViewDependentSupportResponse represents that the server feeds back, to the client, an identifier indicating that the server supports viewport-based video stream transmission.

In Table 41, information corresponding to 0x07 to 0x0B is information fed back by the client to the server, and specific meanings are as follows:

VRViewpointChangeFeedback represents that position information of a current viewpoint is fed back.

VRViewportSpeedFeedback represents that viewport direction change speed information is fed back.

VRViewpointSpeedFeedback represents that viewpoint position change speed information is fed back.

VRViewportDeltaChangeFeedback represents that relative viewport change information is fed back.

VRViewpointDeltaChangeFeedback represents that relative viewpoint position change information is fed back.

In Table 41, information corresponding to 0x0C to 0x0E is selected or rendered window content information sent by the server to the client. Specific meanings are as follows:

VR_content_window_range represents size information of the content selected or rendered by the server.

VR_content_window_center represents center position information of the content selected or rendered by the server.

VR_content_window_viewpoint represents position information of a viewpoint at which the content selected or rendered by the server is located.

Optionally, a possible syntax of VRViewpointChangeFeedback is shown in Table 42.

TABLE 42

| Syntax (Syntax) | Value (Value) | Quantity of bits (No. of bits) | Mnemonic (Mnemonic) |
|---|---|---|---|
| Application( ){ | | | |
|    message_payload{ | | | |
|      application_identifier( ) | | | |
|      if(application_identifier == "urn:mpeg:mmt:app:vr:2017") | | | |
|        { | | | |
|          app_message_type | | 8 | uimsbf |
|          if(app_message_type == 0x0007){ | | | |
|            posx | | 16 | uimsbf |
|            posy | | 16 | uimsbf |
|            posz | | 16 | uimsbf |
|            ... | | | |
|          } | | | |
|        } | | | |
|    } | | | |
| } | | | |

In Table 42, app_message_type represents different message types shown in Table 41, and posx, posy, and posz represent coordinate values of a viewpoint position in a three-dimensional Cartesian coordinate system.

Optionally, a possible syntax of VRViewportSpeedFeedback is shown in Table 43.

TABLE 43

| Syntax (Syntax) | Value (Value) | Quantity of bits (No. of bits) | Mnemonic (Mnemonic) |
|---|---|---|---|
| Application( ){ | | | |
|    message_payload{ | | | |
|      application_identifier( ) | | | |
|      if(application_identifier == "urn:mpeg:mmt:app:vr:2017") | | | |
|        { | | | |
|          app_message_type | | 8 | uimsbf |
|          if(app_message_type == 0x0008){ | | | |
|            dirx_speed | | 16 | uimsbf |
|            diry_speed | | 16 | uimsbf |
|            dirz_speed | | 16 | uimsbf |
|            ... | | | |
|          } | | | |
|        } | | | |
|    } | | | |
| } | | | |

In Table 43, app_message_type represents different message types shown in Table 41, and dirx_speed, diry_speed, and dirz_speed represent viewport direction change speeds in a three-dimensional Cartesian coordinate system or a polar coordinate system.

Optionally, a possible syntax of VRViewpointSpeedFeedback is shown in Table 44.

TABLE 44

| Syntax (Syntax) | Value (Value) | Quantity of bits (No. of bits) | Mnemonic (Mnemonic) |
|---|---|---|---|
| Application( ){ | | | |
|    message_payload{ | | | |
|      application_identifier( ) | | | |
|      if(application_identifier == "urn:mpeg:mmt:app:vr:2017") | | | |
|        { | | | |
|          app_message_type | | 8 | uimsbf |
|          if(app_message_type == 0x0009){ | | | |

TABLE 44-continued

| Syntax (Syntax) | Value (Value) | Quantity of bits (No. of bits) | Mnemonic (Mnemonic) |
|---|---|---|---|
| posx_speed | | 16 | uimsbf |
| posy_speed | | 16 | uimsbf |
| posz_speed | | 16 | uimsbf |
| ... | | | |
| } | | | |
| } | | | |
| } | | | |
| } | | | |

In Table 44, app_message_type represents different message types shown in Table 41, and posx_speed, posy_speed, and posz_speed represent viewpoint position change speeds in a three-dimensional Cartesian coordinate system.

Optionally, a possible syntax of VRViewportDeltaChangeFeedback is shown in Table 45.

TABLE 45

| Syntax (Syntax) | Value (Value) | Quantity of bits (No. of bits) | Mnemonic (Mnemonic) |
|---|---|---|---|
| Application( ){ | | | |
|     message_payload{ | | | |
|       application_identifier( ) | | | |
|     if(application_identifier == "urn:mpeg:mmt:app:vr:2017") | | | |
|       { | | | |
|         app_message_type | | 8 | uimsbf |
|       if(app_message_type == 0x000A){ | | | |
|         delta_dirx | | 16 | uimsbf |
|         delta_posy | | 16 | uimsbf |
|         delta_posz | | 16 | uimsbf |
|         ... | | | |
|       } | | | |
|     } | | | |
|   } | | | |
| } | | | |

In Table 45, app_message_type represents different message types shown in Table 41, and delta_dirx, delta_diry, and delta_dirz represent relative direction change values of a viewport, in a three-dimensional Cartesian coordinate system or a polar coordinate system, relative to a specific viewport, an initial viewport, or a previous viewport.

Optionally, a possible syntax of VRViewpointDeltaChangeFeedback is shown in Table 46.

TABLE 46

| Syntax (Syntax) | Value (Value) | Quantity of bits (No. of bits) | Mnemonic (Mnemonic) |
|---|---|---|---|
| Application( ){ | | | |
|     message_payload{ | | | |
|       application_identifier( ) | | | |
|     if(application_identifier == "urn:mpeg:mmt:app:vr:2017") | | | |
|       { | | | |
|         app_message_type | | 8 | uimsbf |
|       if(app_message_type == 0x000B){ | | | |
|         delta_posx | | 16 | uimsbf |
|         delta_posy | | 16 | uimsbf |
|         delta_posz | | 16 | uimsbf |
|         ... | | | |
|       } | | | |
|     } | | | |
|   } | | | |
| } | | | |

In Table 46, app_message_type represents different message types shown in Table 41, and delta_posx, delta_posy, and delta_posz represent position change amounts of a viewpoint position, in a three-dimensional Cartesian coordinate system, relative to a specific viewpoint, an initial viewpoint, or a previous viewpoint.

Optionally, a possible syntax of VR_content_window_range is shown in Table 47.

TABLE 47

| Syntax (Syntax) | Value (Value) | Quantity of bits (No. of bits) | Mnemonic (Mnemonic) |
|---|---|---|---|
| Application( ){ | | | |
|   message_payload{ | | | |
|     application_identifier( ) | | | |
|     if(application_identifier == "urn:mpeg:mmt:app:vr:2017") | | | |
|     { | | | |
|       app_message_type | | 8 | uimsbf |
|       if(app_message_type == 0x000C){ | | | |
|         Hor_resolution | | 16 | uimsbf |
|         ver_resolution | | 16 | uimsbf |
|         Hor_fov | | 32 | uimsbf |
|         ver_fov | | 32 | uimsbf |
|       } | | | |
|     } | | | |
|   } | | | |
| } | | | |

In Table 47, semantics of main syntaxes is as follows:

app_message_type represents different message types shown in Table 41.

Hor_resolution represents a quantity of pixels, of the content rendered or sent by the server, in a width direction.

Ver_resolution represents a quantity of pixels, of the content rendered or sent by the server, in a height direction.

Hor_fov represents a horizontal field of view coverage range of the content rendered or sent by the server.

Ver_fov represents a vertical field of view coverage range of the content rendered or sent by the server.

Optionally, a possible syntax of VR_content_window_center is shown in Table 48.

TABLE 48

| Syntax (Syntax) | Value (Value) | Quantity of bits (No. of bits) | Mnemonic (Mnemonic) |
|---|---|---|---|
| Application( ){ | | | |
|   message_payload{ | | | |
|     application_identifier( ) | | | |
|     if(application_identifier == "urn:mpeg:mmt:app:vr:2017") | | | |
|     { | | | |
|       app_message_type | | 8 | uimsbf |
|       if(app_message_type == 0x000D){ | | | |
|         center_x | | 16 | uimsbf |
|         center_y | | 16 | uimsbf |
|         center_z | | 16 | uimsbf |
|         ... | | | |
|       } | | | |
|     } | | | |
|   } | | | |
| } | | | |

In Table 48, app_message_type represents different message types shown in Table 41, and center_x, center_y, and center_z represent center point position information, sent by the server to the client, of a video.

Optionally, center_x corresponds to an azimuth or a yaw of three-dimensional coordinates, center_y corresponds to a pitch or elevation angle (pitch or elevation), and center_z corresponds to a tilt angle (tilt) or a roll angle (roll).

It should be understood that only center_x and center_y may be reserved, and center_x and center_y represent two-dimensional coordinate values of the center point of a corresponding region or coordinate values of the top-left corner of a viewport region.

Optionally, a possible syntax of VR_content_window_viewpoint is shown in Table 49.

TABLE 49

| Syntax (Syntax) | Value (Value) | Quantity of bits (No. of bits) | Mnemonic (Mnemonic) |
|---|---|---|---|
| Application( ){ | | | |
|     message_payload{ | | | |
|         application_identifier( ) | | | |
|         if(application_identifier == "urn:mpeg:mmt:app:vr:2017") | | | |
|         { | | | |
|             app_message_type | | 8 | uimsbf |
|             if(app_message_type == 0x000E){ | | | |
|                 posx_s | | 16 | uimsbf |
|                 posy_s | | 16 | uimsbf |
|                 posz_s | | 16 | uimsbf |
|             ... | | | |
|             } | | | |
|         } | | | |
|     } | | | |
| } | | | |

In Table 49, app_message_type represents different message types shown in Table 41, and posx_s, posy_s, and pos_z represent viewpoint position information, sent by the server to the client, of a video within a window, and may be expressed by using coordinate position information in a three-dimensional Cartesian coordinate system.

In Embodiment 8, the viewpoint position information is added to MMT signaling, so that a VR viewport-based transmission application in a case of a viewpoint change can be supported.

A media data transmission method shown in embodiment 9 includes step 1301 and step 1302. The following describes in detail step 1301 and step 1302.

1301. A client sends a first message to a server. The first message may carry first information, first viewpoint information, or first eyeball gaze direction information.

The first message may be an RTMP message. RTMP is the abbreviation of Real Time Message Protocol. In the RTMP, a data packet may be used to carry information such as a user position and posture. Information sent between the server and the client includes but is not limited to at least one type of: user posture information (including but not limited to a gesture, a limb, a trunk, and an eyeball direction) and scenario information (including but not limited to a temperature, humidity, transparency, visibility, and illumination). The information may assist the server in generating corresponding content requested by the client, and may also assist the client in displaying information.

Optionally, the first information may be the foregoing first information. The first information may include at least one of: viewport direction information of a current viewport (a watching direction of a user), viewport size information of the current viewport (an FOV viewport size), relative direction change information of the current viewport, relative viewport size change information of the current viewport, direction change speed information of the current viewport, and a direction change acceleration of the current viewport.

It should be noted that a viewport size of the current viewport may also be referred to as a region range of the current viewport, and a viewport direction of the current viewport may also be referred to as a spatial position of the current viewport.

Optionally, the first viewpoint information may be the foregoing first viewpoint information, and the first viewpoint information is used to indicate a current viewpoint corresponding to the current viewport.

The client reports, to the server, viewpoint information of a viewpoint at which the current viewport is located, so that the client can obtain, from the server, a video picture that matches the current viewpoint, thereby improving a watching effect of the user.

Optionally, the first viewpoint information includes at least one of: spatial position information of the current viewpoint (a spatial position of the user), spatial position change information of the current viewpoint, position change speed information of the current viewpoint, and acceleration information of a position change speed of the current viewpoint.

Optionally, the first eyeball gaze direction information may be a relative value, and is used to further describe an eyeball gaze direction of the user based on the viewport direction. The first eyeball gaze direction information may alternatively be an absolute value, and is used to describe an eyeball gaze direction of the user. The first eyeball gaze direction information may include at least one of: an eyeball gaze direction, eyeball gaze direction change information, eyeball gaze direction change speed information, and eyeball gaze direction change acceleration information.

When the first message is an RTMP message, that the foregoing information is carried in an RTMP message header is used as an example. A carrying manner may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Message Type  |                 Payload length                |
|    (1 byte)   |                   (3 bytes)                   |
+-+-+-+-+-+-+-+-+-+-+-+-+-+-+-+-+-+-+-+-+-+-+-+-+-+-+-+-+-+-+-+-+
|                           Timestamp                           |
|                           (4 bytes)                           |
+-+-+-+-+-+-+-+-+-+-+-+-+-+-+-+-+-+-+-+-+-+-+-+-+-+-+-+-+-+-+-+-+
|           Stream ID           |            pos_x              |
|           (3 bytes)           |           (4 bytes)           |
+-+-+-+-+-+-+-+-+-+-+-+-+-+-+-+-+-+-+-+-+-+-+-+-+-+-+-+-+-+-+-+-+
|      pos_y       |      pos_z       |          X              |
|    (4 bytes)     |    (4 bytes)     |       (4 bytes)         |
+-+-+-+-+-+-+-+-+-+-+-+-+-+-+-+-+-+-+-+-+-+-+-+-+-+-+-+-+-+-+-+-+
|        Y         |        Z         |          H              |
|    (4 bytes)     |    (4 bytes)     |       (4 bytes)         |
+-+-+-+-+-+-+-+-+-+-+-+-+-+-+-+-+-+-+-+-+-+-+-+-+-+-+-+-+-+-+-+-+
|        V         |    pos_x_delta   |      pos_y_delta        |
|    (4 bytes)     |    (4 bytes)     |       (4 bytes)         |
```

```
+-+-+-+-+-+-+-+-+-+-+-+-+-+-+-+-+-+-+-+-+-+-+-+-+-+-+-+-+-+-+-+-+
|    pos_z_delta     |      X_delta       |      Y_delta       |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|      Z_delta       |      H_delta       |      V_delta       |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|    pos_x_sped      |    pos_y_sped      |    pos_z_sped      |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|      X_sped        |      Y_sped        |      Z_sped        |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|    pos_x_accel     |    pos_y_accel     |    pos_z_accel     |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|      X_accel       |      Y_accel       |      Z_accel       |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|       eye_X        |       eye_Y        |       eye_Z        |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|    eye_X_delta     |    eye_Y_delta     |    eye_Z_delta     |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|    eye_X_sped      |    eye_Y_sped      |    eye_Z_sped      |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|    eye_X_accel     |    eye_X_accel     |    eye_Z_accel     |
|     (4 bytes)      |     (4 bytes)      |     (4 bytes)      |
+-+-+-+-+-+-+-+-+-+-+-+-+-+-+-+-+-+-+-+-+-+-+-+-+-+-+-+-+-+-+-+-+
|      pose_id       |
|     (4 bytes)      |
+-+-+-+-+-+-+-+-+-+-+-+
```

In this example, semantics of fields is as follows:

pos_x, pos_y, and pos_z represent spatial position information, requested by the client, of the current viewpoint. Optionally, the coordinates may be three-dimensional Cartesian rectangular coordinates. The information may be used to assist the server in generating audio/video content of a spatial position of a client user.

X, Y, and Z represent a viewport direction, requested by the client, of the current viewpoint. Optionally, X corresponds to an azimuth or a yaw of three-dimensional coordinates, Y corresponds to a pitch or elevation angle (pitch or elevation), and Z corresponds to a tilt angle (tilt) or a roll angle (roll). It should be understood that only X and Y may alternatively be reserved, where X and Y represent two-dimensional coordinate values of the center point of a corresponding region or coordinate values of the top-left corner of a viewport region. Optionally, X, Y, and Z may be extended to X, Y, Z, and P that correspond to a rotation quaternion, respectively. Optionally, a rotation matrix (which is expressed by using a 3×3 matrix) may alternatively be carried to express viewport direction information. Optionally, spherical coordinates may be used to express a viewport direction. X represents a radial distance (a distance between viewport content and a viewpoint center), Y corresponds to a zenith angle in a spherical coordinate system, and Z corresponds to an azimuth in the spherical coordinate system. It should be understood that only Y and Z may alternatively be reserved, where Y corresponds to a zenith angle in a spherical coordinate system, and Z corresponds to an azimuth in the spherical coordinate system. The information is used by the server to determine a watching direction of the client user.

Optionally, a matrix (which is expressed by using a 4×4 matrix) that includes viewpoint coordinate information and the viewport direction information may be used to jointly express a viewpoint position and/or a viewport direction.

H and V jointly represent a field of viewport size that corresponds to a video and that is requested by the client (a viewport size of the current viewport). H and V may respectively represent an azimuth range azimuth range and a pitch or elevation range elevation_range of VR spherical coordinates, or H and V may respectively represent a value of a width pixel quantity of a two-dimensional picture and a value of a height pixel quantity of the two-dimensional picture. The information may be used to notify the server of a viewport value range currently requested by the client.

pos_x_delta, pos_y_delta, and pos_z_delta may be used as spatial position change information, requested by the client, of the current viewpoint, or may represent offsets of a viewpoint coordinate position relative to a previous requested coordinate position or relative to a previous received viewpoint coordinate position of the server. Optionally, a reference coordinate system for the offset may be a three-dimensional Cartesian rectangular coordinate system. The information and a previously requested viewpoint position may be added, to obtain a new viewpoint position.

X_delta, Y_delta, and Z_delta represent relative viewport direction change amounts requested by the client (relative direction change information of the current viewport). Optionally, X_delta corresponds to an azimuth (azimuth) or yaw (yaw) change amount of three-dimensional coordinates, Y_delta corresponds to a pitch or elevation angle (pitch or elevation) change amount, and Z_delta corresponds to a tilt angle (tilt) or roll angle (roll) change amount. It should be understood that only X_delta and Y_delta may alternatively be reserved, where X_delta and Y_delta represent change amounts of two-dimensional coordinate values of the center point of a corresponding region or change amounts of coordinate values of the top-left corner of a viewport region. Optionally, X_delta, Y_delta, and Z_delta may be extended to X_delta, Y_delta, Z_delta, and P_delta that correspond to change values corresponding to a previous rotation quaternion, respectively. Optionally, change values corresponding to the 3×3 matrix may alternatively be carried to express viewport direction change value information. Optionally, spherical coordinates may be used to express a viewport direction. X_delta represents a change value of a radial distance (a distance between viewport content and a viewpoint center), Y_delta corresponds to a change value of a zenith angle in a spherical coordinate system, and Z_delta corresponds to a change value of an azimuth in the spherical coordinate system. It should be understood that only Y_delta and Z_delta may alternatively be reserved, where Y_delta corresponds to a change value of a zenith angle in a spherical coordinate system, and Z_delta corresponds to a change value of an azimuth in the spherical coordinate system. The information and a previously requested viewport direction may be added, to obtain a new viewport direction.

Optionally, a 4×4 matrix may be used to jointly represent a viewpoint position change value and a viewport direction change value.

pos_x_sped, pos_y_sped, and pos_z_sped represent viewpoint coordinate position change speeds requested by the client (position change speed information of the current viewpoint). Optionally, a reference coordinate system for the speed value may be a three-dimensional Cartesian rectangular coordinate system. The information may be calculated with reference to time information, and a change amount and a previous requested viewpoint position may be added, to obtain a new viewpoint position. Alternatively, the information may be provided for the server for prediction of a new viewpoint position, to generate audio/video content in advance, thereby reducing a delay.

X_sped, Y_sped, and Z_sped represent viewport direction change speeds requested by the client (direction change speed information of the current viewport). Optionally, X_sped corresponds to an azimuth or yaw change speed of three-dimensional coordinates, Y_sped corresponds to a pitch or elevation angle (pitch or elevation) change speed, and Z_sped corresponds to a tilt angle (tilt) or roll angle (roll) change speed. It should be understood that only X_sped and Y_sped may alternatively be reserved, where X_sped and Y_sped represent change speeds of two-dimensional coordinate values of the center point of a corresponding region or change speeds of coordinate values of the top-left corner of a viewport region. Optionally, X_sped, Y_sped, and Z_sped may be extended to X_sped, Y_sped, Z_sped, and P_sped that correspond to change speeds corresponding to a previous rotation quaternion, respectively. Optionally, a 3×3 matrix may alternatively be carried to correspondingly express viewport direction change speed information. Optionally, spherical coordinates may be used to express a viewport direction. X_sped represents a change speed of a radial distance (a distance between viewport content and a viewpoint center), Y_sped corresponds to a zenith angle change speed in a spherical coordinate system, and Z_sped corresponds to an azimuth change speed in the spherical coordinate system. It should be understood that only Y_sped and Z_sped may alternatively be reserved, where Y_sped corresponds to a zenith angle change speed in a spherical coordinate system, and Z_sped corresponds to an azimuth change speed in the spherical coordinate system. With reference to the time information, calculation may be performed on the information based on a previously requested viewport direction, to obtain a new viewport direction. Alternatively, the information may be provided for the server for prediction of a new viewport direction, to generate audio/video content in advance, thereby reducing a delay.

Optionally, a 4×4 matrix with viewpoint coordinates may be used to jointly express a viewpoint position change value and a viewport direction change speed.

pos_x_accel, pos_y_accel, and pos_z_accel represent viewpoint coordinate position change accelerations requested by the client (acceleration information of position change speeds of a current viewpoint). Optionally, a reference coordinate system for the acceleration value may be three-dimensional Cartesian rectangular coordinates. With reference to the time information, calculation may be performed on the information based on a previous requested viewpoint position, to obtain a new viewpoint position. In this way, the server can be assisted in prediction of a viewpoint coordinate position that is at a next moment, to generate content in advance, thereby reducing a delay.

X_accel, Y_accel, and Z_accel represent viewport direction change accelerations requested by the client (direction change accelerations of the current viewport). Optionally, X_accel corresponds to an azimuth or yaw change acceleration of three-dimensional coordinates, Y_accel corresponds to a pitch or elevation angle (pitch or elevation) change acceleration, and Z_accel corresponds to a tilt angle (tilt) or roll angle (roll) change acceleration. It should be understood that only X_accel and Y_accel may alternatively be reserved, where X_accel and Y_accel represent change accelerations of two-dimensional coordinate values of the center point of a corresponding region or change accelerations of coordinate values of the top-left corner of a viewport region. Optionally, X_accel, Y_accel, and Z_accel may be extended to X_accel, Y_accel, Z_accel, and P_accel that correspond to change accelerations corresponding to a previous rotation quaternion, respectively. Optionally, a 3×3 rotation matrix may alternatively be carried to correspondingly express viewport direction change acceleration information. Optionally, spherical coordinates may be used to express a viewport direction. X_accel represents a change acceleration of a radial distance (a distance between viewport content and a viewpoint center), Y_accel corresponds to a zenith angle change acceleration in a spherical coordinate system, and Z_accel corresponds to an azimuth change acceleration in the spherical coordinate system. It should be understood that only Y_accel and Z_accel may be reserved, where Y_accel corresponds to a zenith angle change acceleration in a spherical coordinate system, and Z_accel corresponds to an azimuth change acceleration in the spherical coordinate system. In this way, the server can be assisted in prediction of a viewport direction that is at a next moment, to generate content in advance, thereby reducing a delay.

Optionally, a 4×4 matrix with viewpoint coordinates may be used to jointly express a viewpoint position change value and a viewport direction change acceleration.

eye_X, eye_Y, and eye_Z represent eyeball gaze directions requested by the client. A viewport direction is an orientation of a person's face. An eyeball direction is an orientation of the eyes. The eyeball direction may be an absolute value, or may be a relative value relative to the viewport direction. Optionally, eye_X corresponds to an azimuth or a yaw of three-dimensional coordinates, eye_Y corresponds to a pitch or elevation angle (pitch or elevation), and eye_Z corresponds to a tilt angle (tilt) or a roll angle (roll). It should be understood that only eye_X and eye_Y may alternatively be reserved, where eye_X and eye_Y represent two-dimensional coordinate values, and may represent a horizontal offset and a vertical offset that are relative to a viewport edge within a field of viewport, or may represent a horizontal offset and a vertical offset that are relative to a viewport center within a field of viewport. Optionally, eye_X, eye_Y, and eye_Z may be extended to eye_X, eye_Y, eye_Z, and eye_P that correspond to a rotation quaternion, respectively. Optionally, a 3×3 rotation matrix may alternatively be carried to express direction information. Optionally, spherical coordinates may be used to express a direction. eye_X represents a radial distance (for example, a distance between an eyeball and an object that the eyeball gazes), eye_Y corresponds to a zenith angle in a spherical coordinate system, and eye_Z corresponds to an azimuth in the spherical coordinate system. It should be understood that only eye_Y and eye_Z may alternatively be reserved, where eye_Y corresponds to a zenith angle in a spherical coordinate system, and eye_Z corresponds to an azimuth in the spherical coordinate system. The information is provided by the client for the server, and the server processes content of a specific part based on the eyeball gaze direction. For example, with the eyeball gaze direction as a center, video quality gradually decreases around. In this way, without subjective quality degradation, video compression efficiency is improved, bandwidth is reduced, and complexity of calculation for generating content by the server can also be reduced.

eye_X_delta, eye_Y_delta, and eye_Z_delta represent eyeball gaze direction change amounts requested by the client (eyeball gaze direction change information). Optionally, eye_X_delta corresponds to an azimuth or yaw change amount of three-dimensional coordinates, eye_Y_delta corresponds to a pitch or elevation angle (pitch or elevation) change amount, and eye_Z_delta corresponds to a tilt angle (tilt) or roll angle (roll) change amount. It should be understood that only eye_X_delta and eye_Y_delta may alternatively be reserved, where eye_X_delta and eye_Y_delta represent change amounts of two-dimensional coordinate values. Optionally, eye_X_delta, eye_Y_delta, and eye_Z_delta may be extended to eye_X_delta, eye_Y_delta, eye_Z_delta, and eye_P_delta that correspond to change amounts of a rotation quaternion, respectively. Optionally, a 3×3 rotation matrix may alternatively be carried to express direction information. Optionally, spherical coordinates may be used to express a direction. eye_X_delta represents a change amount of a radial distance (for example, a distance between an eyeball and an object that the eyeball gazes), eye_Y_delta corresponds to a change amount of a zenith angle in a spherical coordinate system, and eye_Z_delta corresponds to a change amount of an azimuth in the spherical coordinate system. It should be understood that only eye_Y_delta and eye_Z_delta may alternatively be reserved, where eye_Y_delta corresponds to a change amount of a zenith angle in a spherical coordinate system, and eye_Z_delta corresponds to a change amount of an azimuth in the spherical coordinate system. The information and a previously requested eyeball gaze direction are added, to obtain a new eyeball gaze direction.

eye_X_sped, eye_Y_sped, and eye_Z_sped represent eyeball gaze direction change speeds (eyeball gaze direction change speed information) requested by the client. Optionally, eye_X_sped corresponds to an azimuth or yaw change speed of three-dimensional coordinates, eye_Y_sped corresponds to a pitch or elevation angle (pitch or elevation) change speed, and eye_Z_sped corresponds to a tilt angle (tilt) or roll angle (roll) change speed. It should be understood that only eye_X_sped and eye_Y_sped may alternatively be reserved, where eye_X_sped and eye_Y_sped represent change speeds of two-dimensional coordinate value. Optionally, eye_X_sped, eye_Y_sped, and eye_Z_sped may be extended to eye_X_sped, eye_Y_sped, eye_Z_sped, and eye_P_sped that correspond to change speeds of a rotation quaternion, respectively. Optionally, a 3×3 rotation matrix may alternatively be carried to express direction information. Optionally, spherical coordinates may be used to express a direction. eye_X_sped represents a change speed of a radial distance (for example, a distance between an eyeball and an object that the eyeball gazes), eye_Y_sped corresponds to a change speed of a zenith angle in a spherical coordinate system, and eye_Z_sped corresponds to a change speed of an azimuth in the spherical coordinate system. It should be understood that only eye_Y_sped and eye_Z_sped may alternatively be reserved, where eye_Y_sped corresponds to a change speed of a zenith angle in a spherical coordinate system, and eye_Z_sped corresponds to a change speed of an azimuth in the spherical coordinate system. With reference to time information, calculation may be performed on the information based on a previously requested eyeball gaze direction, to obtain a new eyeball gaze direction. In this way, the server can be assisted in prediction of an eyeball gaze direction that is at a next moment, to generate content in advance, thereby reducing a delay.

eye_X_accel, eye_Y_accel, and eye_Z_accel represent eyeball gaze direction change accelerations (eyeball gaze direction change acceleration information) requested by the client. Optionally, eye_X_accel corresponds to an azimuth or yaw change acceleration of three-dimensional coordinates, eye_Y_accel corresponds to a pitch or elevation angle (pitch or elevation) change acceleration, and eye_Z_accel corresponds to a tilt angle (tilt) or roll angle (roll) change acceleration. It should be understood that only eye_X_accel and eye_Y_accel may alternatively be reserved, where eye_X_accel and eye_Y_accel represent change accelerations of two-dimensional coordinate value. Optionally, eye_X_accel, eye_Y_accel, and eye_Z_accel may be extended to eye_X_accel, eye_Y_accel, eye_Z_accel, and eye_P_accel that correspond to change accelerations of a rotation quaternion, respectively. Optionally, a 3×3 rotation matrix may alternatively be carried to express direction information. Optionally, spherical coordinates may be used to express a direction. eye_X_accel represents a change acceleration of a radial distance (for example, a distance between an eyeball and an object that the eyeball gazes), eye_Y_accel corresponds to a change acceleration of a zenith angle in a spherical coordinate system, and eye_Z_accel corresponds to a change acceleration of an azimuth in the spherical coordinate system. It should be understood that only eye_Y_accel and eye_Z_accel may alternatively be reserved, where eye_Y_accel corresponds to a change acceleration of a zenith angle in a spherical coordinate system, and eye_Z_accel corresponds to a change acceleration of an azimuth in the spherical coordinate system. With reference to time information, calculation may be performed on the information based on a previously requested eyeball gaze direction, to obtain a new eyeball gaze direction. In this way, the server can be assisted in prediction of an eyeball gaze direction that is at a next moment, to generate content in advance, thereby reducing a delay.

Optionally, the first message may further include a first message identifier (pose_id) that is used to indicate an identifier id corresponding to the foregoing information sent by the client.

Particularly, the information sent by the client to the server may include one of or any combination of a plurality of the following information such as a viewpoint position, a viewport direction, a field of viewport size, a relative viewpoint position change value, a relative viewport direction change value, a relative viewport size change value, a viewpoint change speed, a viewport direction change speed, a viewpoint change acceleration, a viewport direction change acceleration, an eyeball gaze direction, an eyeball gaze direction change value, an eyeball gaze direction change speed, and an eyeball gaze direction change acceleration. The information may carry an identifier id corresponding to the foregoing information combination.

For example, the foregoing information is carried in an RTMP message header. Another carrying manner may be as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Message Type |            Payload length                       |
|   (1 byte)   |             (3 bytes)                           |
+-+-+-+-+-+-+-+-+-+-+-+-+-+-+-+-+-+-+-+-+-+-+-+-+-+-+-+-+-+-+-+-+
|                          Timestamp                             |
|                          (4 bytes)                             |
+-+-+-+-+-+-+-+-+-+-+-+-+-+-+-+-+-+-+-+-+-+-+-+-+-+-+-+-+-+-+-+-+
|           Stream ID           |           pos_x                |
|           (3 bytes)           |           (4 bytes)            |
+-+-+-+-+-+-+-+-+-+-+-+-+-+-+-+-+-+-+-+-+-+-+-+-+-+-+-+-+-+-+-+-+
|     pos_y      |     pos_z      |          X                   |
|    (4 bytes)   |   (4 bytes)    |        (4 bytes)             |
+-+-+-+-+-+-+-+-+-+-+-+-+-+-+-+-+-+-+-+-+-+-+-+-+-+-+-+-+-+-+-+-+
|      Y         |      Z         |          H                   |
|   (4 bytes)    |   (4 bytes)    |       (4 bytes)              |
+-+-+-+-+-+-+-+-+-+-+-+-+-+-+-+-+-+-+-+-+-+-+-+-+-+-+-+-+-+-+-+-+
|      V         |
|   (4 bytes)    |
+-+-+-+-+-+-+-+-+
```

For semantics of related fields, refer to the foregoing descriptions. Details are not described herein again.

Particularly, the information sent by the client to the server may include one of or any combination of a plurality of a viewpoint position, a viewport direction, and a field of viewport size.

The RTMP message includes a message header and data. Data is divided into several chunks, and each chunk includes a chunk header and data. Interaction information may also be carried in a chunk header.

The chunk header includes the following three parts:

```
+---------------+------------------+----------------------+---------------------+
| Basic Header  | Message Header   | Extended Timestamp   | Chunk Data          |
+---------------+------------------+----------------------+---------------------+
|                                                         |
|<----------------------- Chunk Header ------------------>|
```

Basic Header includes a chunk type and a chunk ID.

Message Header includes a message sending timestamp increment, and a message length, a message type, and a message stream ID of the chunk.

Extended Timestamp includes a timestamp or a timestamp increment greater than 16777215.

The client sends, to the server, one of or any combination of a plurality of the following information such as a viewpoint position, a viewport direction, a field of viewport size, a relative viewpoint position change value, a relative viewport direction change value, a relative viewport size change value, a viewpoint change speed, a viewport direction change speed, a viewpoint change acceleration, a viewport direction change acceleration, an eyeball gaze direction, an eyeball gaze direction change value, an eyeball gaze direction change speed, and an eyeball gaze direction change acceleration of a user, and a mark pose_id corresponding to the information. The foregoing information may be carried in the chunk header of the RTMP message. For example, the information is carried in a message header of a type 0. A carrying manner may be as follows:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |            timestamp              |         message length    |
   +-+-+-+-+-+-+-+-+-+-+-+-+-+-+-+-+-+-+-+-+-+-+-+-+-+-+-+-+-+-+-+-+
   |   mesage length (cont)            |message type id| msg stream id |
   +-+-+-+-+-+-+-+-+-+-+-+-+-+-+-+-+-+-+-+-+-+-+-+-+-+-+-+-+-+-+-+-+
   |         message stream id (cont)              |      pos_x    |
   +-+-+-+-+-+-+-+-+-+-+-+-+-+-+-+-+-+-+-+-+-+-+-+-+-+-+-+-+-+-+-+-+
   |      pos_y          |      pos_z          |         X         |
   +-+-+-+-+-+-+-+-+-+-+-+-+-+-+-+-+-+-+-+-+-+-+-+-+-+-+-+-+-+-+-+-+
   |        Y            |        Z            |         H         |
   +-+-+-+-+-+-+-+-+-+-+-+-+-+-+-+-+-+-+-+-+-+-+-+-+-+-+-+-+-+-+-+-+
   |        V            |    pos_x_delta      |    pos_y_delta    |
   +-+-+-+-+-+-+-+-+-+-+-+-+-+-+-+-+-+-+-+-+-+-+-+-+-+-+-+-+-+-+-+-+
   |    pos_z_delta      |      X_delta        |     Y_delta       |
   +-+-+-+-+-+-+-+-+-+-+-+-+-+-+-+-+-+-+-+-+-+-+-+-+-+-+-+-+-+-+-+-+
   |      Z_delta        |     H_delta         |     V_delta       |
   +-+-+-+-+-+-+-+-+-+-+-+-+-+-+-+-+-+-+-+-+-+-+-+-+-+-+-+-+-+-+-+-+
   |    pos_x_sped       |    pos_y_sped       |    pos_z_sped     |
   +-+-+-+-+-+-+-+-+-+-+-+-+-+-+-+-+-+-+-+-+-+-+-+-+-+-+-+-+-+-+-+-+
   |      X_sped         |      Y_sped         |     Z_sped        |
   +-+-+-+-+-+-+-+-+-+-+-+-+-+-+-+-+-+-+-+-+-+-+-+-+-+-+-+-+-+-+-+-+
   |    pos_x_accel      |    pos_y_accel      |    pos_z_accel    |
   +-+-+-+-+-+-+-+-+-+-+-+-+-+-+-+-+-+-+-+-+-+-+-+-+-+-+-+-+-+-+-+-+
   |      X_accel        |      Y_accel        |     Z_accel       |
   +-+-+-+-+-+-+-+-+-+-+-+-+-+-+-+-+-+-+-+-+-+-+-+-+-+-+-+-+-+-+-+-+
   |       eye_X         |       eye_Y         |      eye_Z        |
   +-+-+-+-+-+-+-+-+-+-+-+-+-+-+-+-+-+-+-+-+-+-+-+-+-+-+-+-+-+-+-+-+
   |    eye_X_delta      |    eye_Y_delta      |   eye_Z_delta     |
   +-+-+-+-+-+-+-+-+-+-+-+-+-+-+-+-+-+-+-+-+-+-+-+-+-+-+-+-+-+-+-+-+
   |     eye_X_sped      |     eye_Y_sped      |    eye_Z_sped     |
   +-+-+-+-+-+-+-+-+-+-+-+-+-+-+-+-+-+-+-+-+-+-+-+-+-+-+-+-+-+-+-+-+
   |     eye_X_accel     |     eye_X_accel     |    eye_Z_accel    |
   +-+-+-+-+-+-+-+-+-+-+-+-+-+-+-+-+-+-+-+-+-+-+-+-+-+-+-+-+-+-+-+-+
   |      pose_id        |
   +-+-+-+-+-+-+-+-+-+-+-+
```

For semantics of related fields, refer to the foregoing descriptions. Details are not described herein again.

Particularly, the information sent by the client to the server may include one of or any combination of a plurality of the following information such as a viewpoint position, a viewport direction, a field of viewport size, a relative viewpoint position change value, a relative viewport direction change value, a relative viewport size change value, a viewpoint change speed, a viewport direction change speed, a viewpoint change acceleration, a viewport direction change acceleration, an eyeball gaze direction, an eyeball gaze direction change value, an eyeball gaze direction change speed, and an eyeball gaze direction change acceleration. The information may carry an identifier id corresponding to the foregoing information combination.

At least one type of information, sent by the client to the server, such as a viewpoint position, a viewport direction, and a field of viewport of a user, may be carried in a message header. For example, the information is carried in a message header of a type 0. Another carrying manner may be as follows:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |            timestamp              |         message length    |
   +-+-+-+-+-+-+-+-+-+-+-+-+-+-+-+-+-+-+-+-+-+-+-+-+-+-+-+-+-+-+-+-+
   |   message length (cont)           |message type id| msg stream id |
   +-+-+-+-+-+-+-+-+-+-+-+-+-+-+-+-+-+-+-+-+-+-+-+-+-+-+-+-+-+-+-+-+
   |         message stream id (cont)              |      pos_x    |
   +-+-+-+-+-+-+-+-+-+-+-+-+-+-+-+-+-+-+-+-+-+-+-+-+-+-+-+-+-+-+-+-+
   |      pos_y          |      pos_z          |         X         |
   +-+-+-+-+-+-+-+-+-+-+-+-+-+-+-+-+-+-+-+-+-+-+-+-+-+-+-+-+-+-+-+-+
   |        Y            |        Z            |         H         |
   +-+-+-+-+-+-+-+-+-+-+-+-+-+-+-+-+-+-+-+-+-+-+-+-+-+-+-+-+-+-+-+-+
   |        V            |
   +-+-+-+-+-+-+-+-+-+-+-+
```

For semantics of related fields, refer to the foregoing descriptions. Details are not described herein again.

Particularly, the information sent by the client to the server may include one of or any combination of a plurality of the following information such as a viewpoint position, a viewport direction, and a field of viewport size.

It should be understood that information sent between the client and the server in this embodiment may be carried in a header of one or more chunks of types 0, 1, 2, and 3, or in a part of information added to a chunk header.

The information may be carried in a message header of the type 1. A carrying manner is as follows:

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |         timestamp delta           |         message length    |
   +-+-+-+-+-+-+-+-+-+-+-+-+-+-+-+-+-+-+-+-+-+-+-+-+-+-+-+-+-+-+-+-+
   |   message length (cont)           |message type id|   pos_x   |
   +-+-+-+-+-+-+-+-+-+-+-+-+-+-+-+-+-+-+-+-+-+-+-+-+-+-+-+-+-+-+-+-+
   |      pos_y          |      pos_z          |         X         |
```

```
+-+-+-+-+-+-+-+-+-+-+-+-+-+-+-+-+-+-+-+-+-+-+-+-+-+-+-+-+-+-+-+-+
|       Y       |       Z       |       H       |
+-+-+-+-+-+-+-+-+-+-+-+-+-+-+-+-+-+-+-+-+-+-+-+-+-+-+-+-+-+-+-+-+
|       V       |
+-+-+-+-+-+-+-+-+-+
```

Alternatively, the information may be carried in a message header of the type 2. A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|        timestamp delta        |             pos_x             |
+-+-+-+-+-+-+-+-+-+-+-+-+-+-+-+-+-+-+-+-+-+-+-+-+-+-+-+-+-+-+-+-+
|     pos_y     |     pos_z     |               X               |
+-+-+-+-+-+-+-+-+-+-+-+-+-+-+-+-+-+-+-+-+-+-+-+-+-+-+-+-+-+-+-+-+
|       Y       |       Z       |       H       |
+-+-+-+-+-+-+-+-+-+-+-+-+-+-+-+-+-+-+-+-+-+-+-+-+-+-+-+-+-+-+-+-+
|       V       |
+-+-+-+-+-+-+-+-+-+
```

Alternatively, the information may alternatively be directly carried and transmitted as a message header of the type 3.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     pos_x     |     pos_y     |     pos_z     |
+-+-+-+-+-+-+-+-+-+-+-+-+-+-+-+-+-+-+-+-+-+-+-+-+-+-+-+-+-+-+-+-+
|       X       |       Y       |       Z       |
+-+-+-+-+-+-+-+-+-+-+-+-+-+-+-+-+-+-+-+-+-+-+-+-+-+-+-+-+-+-+-+-+
|       H       |       V       |
+-+-+-+-+-+-+-+-+-+-+-+-+-+-+-+-+-+
```

A chunk header includes three parts:

```
+---------------+------------------+-------------------------+-------------------+
| Basic Header  | Message Header   | Extended Timestamp      | Chunk
Data           |
+---------------+------------------+-------------------------+-------------------+
|                                                                                |
|<----------------------- Chunk Header -------------------->|
```

A part may alternatively be added to the chunk header.

```
        +---------------+------------------+-------------------------+------------+--------------
-+
        | Basic Header  | Message Header   | Extended Timestamp      | FOV info   | Chunk Data
|
        +---------------+------------------+-------------------------+------------+--------------
-+
        |                                                                         |
        |<------------------ Chunk Header ---------------->|
```

Information exchanged between the client and the server may be carried in FOV_info. A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|     pos_x     |     pos_y     |     pos_z     |
+-+-+-+-+-+-+-+-+-+-+-+-+-+-+-+-+-+-+-+-+-+-+-+-+-+-+-+-+-+-+-+-+
|       X       |       Y       |       Z       |
```

```
+-+-+-+-+-+-+-+-+-+-+-+-+-+-+-+-+-+-+-+-+-+-+-+-+-+-+-+-+-+-+-+-+
|       H       |       V       |
+-+-+-+-+-+-+-+-+-+-+-+-+-+-+-+-+-+
```

For semantics of related fields, refer to the foregoing descriptions. Details are not described herein again.

1302. The server sends, to the client, a second message corresponding to a video picture (or the client receives a second message that corresponds to a video picture and that is sent by the server).

The second message may carry second information, second viewpoint information, or second eyeball gaze direction information.

It should be noted that the second message corresponding to the video picture may include the video data packets corresponding to the foregoing second target video picture. The second information may be the foregoing second information, and the second viewpoint information may be the foregoing second viewpoint information.

Optionally, after receiving a client request (that is, the first message), the server generates video content (that is, the video picture), encodes and encapsulates the video content into a second message. The second message may be an RTMP message (which may carry data packets corresponding to the video picture). A message header carries at least one type of information such as a viewpoint position, a viewport direction, a field of viewport size, a relative viewpoint position change value, a relative viewport direction change value, a relative field of viewport size change value, an eyeball gaze direction, and an eyeball gaze direction change value that correspond to the video content, and an identifier id corresponding to the information.

Optionally, the second information may include at least one of: viewport direction information corresponding to the video content, viewport size information corresponding to the video content, relative direction change information corresponding to the video content, and relative viewport size change information corresponding to the video content.

Optionally, the second viewpoint information may include at least one of: spatial position information of a viewpoint corresponding to the video content and spatial position change information of the viewpoint corresponding to the video content.

Optionally, the second eyeball gaze direction information may include at least one of: an eyeball gaze direction and eyeball gaze direction change information.

For example, the second information is carried in an RTMP message header. A carrying manner may be as follows:

```
 0                   1                   2                   3
 0 1 2 3 4 5 6 7 8 9 0 1 2 3 4 5 6 7 8 9 0 1 2 3 4 5 6 7 8 9 0 1
```

-continued

```
+-+-+-+-+-+-+-+-+-+-+-+-+-+-+-+-+-+-+-+-+-+-+-+-+-+-+-+-+-+-+-+-+
| Message Type |           Payload length                       |
| (1 byte)     |             (3 bytes)                           |
+-+-+-+-+-+-+-+-+-+-+-+-+-+-+-+-+-+-+-+-+-+-+-+-+-+-+-+-+-+-+-+-+
|                         Timestamp                              |
|                         (4 bytes)                              |
+-+-+-+-+-+-+-+-+-+-+-+-+-+-+-+-+-+-+-+-+-+-+-+-+-+-+-+-+-+-+-+-+
|                  Stream ID          |         pos_x            |
|                  (3 bytes)          |         (4 bytes)        |
+-+-+-+-+-+-+-+-+-+-+-+-+-+-+-+-+-+-+-+-+-+-+-+-+-+-+-+-+-+-+-+-+
|     pos_y        |       pos_z        |          X             |
|    (4 bytes)     |      (4 bytes)     |       (4 bytes)        |
+-+-+-+-+-+-+-+-+-+-+-+-+-+-+-+-+-+-+-+-+-+-+-+-+-+-+-+-+-+-+-+-+
|      Y           |         Z          |          H             |
|   (4 bytes)      |      (4 bytes)     |       (4 bytes)        |
+-+-+-+-+-+-+-+-+-+-+-+-+-+-+-+-+-+-+-+-+-+-+-+-+-+-+-+-+-+-+-+-+
|      V           |     pos_x_delta    |      pos_y_delta       |
|   (4 bytes)      |      (4 bytes)     |       (4 bytes)        |
+-+-+-+-+-+-+-+-+-+-+-+-+-+-+-+-+-+-+-+-+-+-+-+-+-+-+-+-+-+-+-+-+
|   pos_z_delta    |      X_delta       |       Y_delta          |
|   (4 bytes)      |     (4 bytes)      |       (4 bytes)        |
+-+-+-+-+-+-+-+-+-+-+-+-+-+-+-+-+-+-+-+-+-+-+-+-+-+-+-+-+-+-+-+-+
|    Z_delta       |      H_delta       |       V_delta          |
|   (4 bytes)      |     (4 bytes)      |       (4 bytes)        |
+-+-+-+-+-+-+-+-+-+-+-+-+-+-+-+-+-+-+-+-+-+-+-+-+-+-+-+-+-+-+-+-+
|    eye_X         |      eye_Y         |        eye_Z           |
|   (4 bytes)      |     (4 bytes)      |       (4 bytes)        |
+-+-+-+-+-+-+-+-+-+-+-+-+-+-+-+-+-+-+-+-+-+-+-+-+-+-+-+-+-+-+-+-+
|   eye_X_delta    |    eye_Y_delta     |     eye_Z_delta        |
|   (4 bytes)      |     (4 bytes)      |       (4 bytes)        |
+-+-+-+-+-+-+-+-+-+-+-+-+-+-+-+-+-+-+-+-+-+-+-+-+-+-+-+-+-+-+-+-+
|    pose_id       |       FOV_id       |       subpic_ID        |
|   (4 bytes)      |     (4 bytes)      |       (4 bytes)        |
+-+-+-+-+-+-+-+-+-+-+-+-+-+-+-+-+-+-+-+-+-+-+-+-+-+-+-+-+-+-+-+-+
```

The fields in this example are as follows:

pos_x, pos_y, and pos_z represent a viewpoint coordinate position corresponding to the video content generated by the server (spatial position information of a viewpoint corresponding to the video content). Optionally, the coordinates may be three-dimensional Cartesian rectangular coordinates. The client learns, based on the information, that corresponding processing is performed based on the viewpoint corresponding to the received video content. Optionally, the client needs to generate video content of a new virtual viewpoint by using the video content and viewpoint information corresponding to the video content.

X, Y, and Z represent viewport directions corresponding to the video content. Optionally, X corresponds to an azimuth or a yaw of three-dimensional coordinates, Y corresponds to a pitch or elevation angle (pitch or elevation), and Z corresponds to a tilt angle (tilt) or a roll angle (roll). It should be understood that only X and Y may alternatively be reserved, where X and Y represent two-dimensional coordinate values of the center point of a corresponding region or coordinate values of the top-left corner of a viewport region. Optionally, X, Y, and Z may be extended to X, Y, Z, and P that correspond to a rotation quaternion, respectively. Optionally, a rotation matrix (which is expressed by using a 3×3 matrix) may alternatively be carried to express viewport direction information. Optionally, spherical coordinates may be used to express a viewport direction. X represents a radial distance (a distance between viewport content and a viewpoint center), Y corresponds to a zenith angle in a spherical coordinate system, and Z corresponds to an azimuth in the spherical coordinate system. It should be understood that only Y and Z may alternatively be reserved, where Y corresponds to a zenith angle in a spherical coordinate system, and Z corresponds to an azimuth in the spherical coordinate system. The client renders a video based on a viewport direction corresponding to the video, and displays the video in the corresponding viewport direction.

Optionally, a matrix (which is expressed by using a 4×4 matrix) that includes viewpoint coordinate information and the viewport direction information may be used to jointly express a viewpoint position and a viewport direction.

H and V jointly represent a field of viewport size corresponding to a video that is sent by the server (the viewport size information corresponding to the video content). H and V may respectively represent an azimuth range azimuth range and a pitch or elevation range elevation_range of VR spherical coordinates, or H and V may respectively represent a value of a width pixel quantity of a two-dimensional picture and a value of a height pixel quantity of the two-dimensional picture. It should be understood that four elements H, V, H2, and V2 may be carried together, where H represents an azimuth range azimuth range of the video content, V represents a pitch or elevation range elevation range, H2 represents a picture width pixel, and V2 represents a value of a height pixel quantity of the picture. The client renders the video content to a field of viewport of a corresponding size based on the field of viewport size corresponding to the video content.

pos_x_delta, pos_y_delta, and pos_z_delta represent offsets of the viewpoint coordinate position that correspond to the video content and that are sent by the server, relative to a previous sent coordinate position or a previous received viewpoint coordinate position requested from the client (spatial position change information, corresponding to the video content, of the viewpoint). Optionally, a reference coordinate system for the offset may be a three-dimensional Cartesian rectangular coordinate system. The information and a previous viewpoint position may be added, to obtain a new viewpoint position.

X_delta, Y_delta, and Z_delta represent relative viewport direction change amounts that correspond to the video content and that are sent by the server (relative direction change information corresponding to the video content). Optionally, X_delta corresponds to an azimuth or yaw change amount of three-dimensional coordinates, Y_delta corresponds to a pitch or elevation angle (pitch or elevation) change amount, and Z_delta corresponds to a tilt angle (tilt) or roll angle (roll) change amount. It should be understood that only X_delta and Y_delta may alternatively be reserved, where X_delta and Y_delta represent change amounts of two-dimensional coordinate values of the center point of a corresponding region or change amounts of coordinate values of the top-left corner of a viewport region. Optionally, X_delta, Y_delta, and Z_delta may be extended to X_delta, Y_delta, Z_delta, and P_delta that correspond to change values corresponding to a previous rotation quaternion, respectively. Optionally, a 3×3 matrix may alternatively be carried to express viewport direction change value information. Optionally, spherical coordinates may be used to express a viewport direction. X_delta represents a change value of a radial distance (a distance between viewport content and a viewpoint center), Y_delta corresponds to a change value of a zenith angle in a spherical coordinate system, and Z_delta corresponds to a change value of an azimuth in the spherical coordinate system. It should be understood that only Y_delta and Z_delta may alternatively be reserved, where Y_delta corresponds to a change value of a zenith angle in a spherical coordinate system, and Z_delta corresponds to a change value of an azimuth in the spherical coordinate system. The information and a previous viewport direction may be added, to obtain a new viewport direction.

Optionally, a 4×4 matrix that includes a viewpoint change value and a viewport direction change value may be used to jointly express a viewpoint position change value and the viewport direction change value.

eye_X, eye_Y, and eye_Z represent eyeball gaze directions that correspond to the video content and that are sent by the server. Optionally, eye_X corresponds to an azimuth (or a yaw of three-dimensional coordinates, eye_Y corresponds to a pitch or elevation angle (pitch or elevation), and eye_Z corresponds to a tilt angle (tilt) or a roll angle (roll). It should be understood that only eye_X and eye_Y may alternatively be reserved, where eye_X and eye_Y represent two-dimensional coordinate values, and may represent a horizontal offset and a vertical offset that are relative to a viewport edge within a field of viewport, or may represent a horizontal offset and a vertical offset that are relative to a viewport center within a field of viewport. Optionally, eye_X, eye_Y, and eye_Z may be extended to eye_X, eye_Y, eye_Z, and eye_P that correspond to a rotation quaternion, respectively. Optionally, a 3×3 rotation matrix may alternatively be carried to express direction information. Optionally, spherical coordinates may be used to express a direction. eye_X represents a radial distance (for example, a distance between an eyeball and an object that the eyeball gazes), eye_Y corresponds to a zenith angle in a spherical coordinate system, and eye_Z corresponds to an azimuth in the spherical coordinate system. It should be understood that only eye_Y and eye_Z may alternatively be reserved, where eye_Y corresponds to a zenith angle in a spherical coordinate system, and eye_Z corresponds to an azimuth in the spherical coordinate system. During encoding and transmission, the server identifies a high-quality region of the video content based on the information, and implements high-priority encoding and transmission for the high-quality video region, thereby ensuring watching quality of the client. The client may also use a historical high-quality video region to improve video content quality in a real-time eyeball gaze direction of the client.

eye_X_delta, eye_Y_delta, and eye_Z_delta represent eyeball gaze direction change amounts (eyeball gaze direction change information) that correspond to the video content and that are sent by the server. Optionally, eye_X_delta corresponds to an azimuth (or yaw change amount of three-dimensional coordinates, eye_Y_delta corresponds to a pitch or elevation angle (pitch or elevation) change amount, and eye_Z_delta corresponds to a tilt angle (tilt) or roll angle (roll) change amount. It should be understood that only eye_X_delta and eye_Y_delta may alternatively be reserved, where eye_X_delta and eye_Y_delta represent change amounts of two-dimensional coordinate values. Optionally, eye_X_delta, eye_Y_delta, and eye_Z_delta may be extended to eye_X_delta, eye_Y_delta, eye_Z_delta, and eye_P_delta that correspond to change amounts of a rotation quaternion, respectively. Optionally, a 3×3 rotation matrix may alternatively be carried to express direction information. Optionally, spherical coordinates may be used to express a direction. eye_X_delta represents a change amount of a radial distance (for example, a distance between an eyeball and an object that the eyeball gazes), eye_Y_delta corresponds to a change amount of a zenith angle in a spherical coordinate system, and eye_Z_delta corresponds to a change amount of an azimuth in the spherical coordinate system. It should be understood that only eye_Y_delta and eye_Z_delta may alternatively be reserved, where eye_Y_delta corresponds to a change amount of a zenith angle in a spherical coordinate system, and eye_Z_delta corresponds to a change amount of an azimuth in the spherical coordinate system. The information and a previous eyeball gaze direction may be added, to obtain a new eyeball gaze direction.

Optionally, the second message corresponding to the video picture may further carry a second message identifier (pose_id), to describe identification id information corresponding to the video content. The information is used by the client to determine a posture, a scenario, and the like corresponding to a received audio/video, and corresponds to the first message identifier (pose_id) sent by the client. For example, when the second message identifier (pose_id) is the same as the first message identifier (pose_id) sent by the client, the second message corresponding to the video picture includes a data packet used to respond to the first message.

FOV_id represents an identification number of a frame in which an FOV is located and that is generated by the server, where each frame corresponds to one identification number.

subpic_ID represents an identification number of each sub-picture frame obtained by dividing the frame in which the FOV is located and that is generated by the server, where the client merges a plurality of sub-picture frames whose subpic_ID belonging to the same FOV_id, to form the complete frame in which the FOV is located. In this division manner, processes such as encoding, transmission, and decoding can be implemented through pipelining, thereby reducing a delay effectively.

The information that is carried in the video content sent by the server to the client and that assists the client in displaying may include one of or any combination of a plurality of the following information such as a viewpoint position, a viewport direction, a field of viewport size, a relative viewpoint position change value, a relative viewport direction change value, and a relative viewport size change value that correspond to the video content, an eyeball gaze direction corresponding to video content (an eyeball gaze direction corresponding to video content generated based on the eyeball gaze direction), and an eyeball gaze direction change value; and may further include identification id information (pose_id) corresponding to the video content. The identification id information is consistent with a request identifier id sent by the client, and may carry a sub-picture ID identifier used for end-to-end pipelining processing and a corresponding viewport frame identifier.

It should be understood that only the client may carry information, but the server does not need to carry the information.

For example, the information is carried in an RTMP message header. Another carrying manner may be as follows:

After receiving the request from the client, the server generates the video content; and carries, in the RTMP message, at least one of: a viewpoint position, a viewport direction, and a field of viewport that correspond to the video content.

```
0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Message Type |            Payload length                      |
|   (1 byte)   |              (3 bytes)                          |
+-+-+-+-+-+-+-+-+-+-+-+-+-+-+-+-+-+-+-+-+-+-+-+-+-+-+-+-+-+-+-+-+
|                          Timestamp                             |
|                          (4 bytes)                             |
+-+-+-+-+-+-+-+-+-+-+-+-+-+-+-+-+-+-+-+-+-+-+-+-+-+-+-+-+-+-+-+-+
|             Stream ID            |         pos_x              |
|             (3 bytes)            |         (4 bytes)          |
```

-continued

```
+-+-+-+-+-+-+-+-+-+-+-+-+-+-+-+-+-+-+-+-+-+-+-+-+-+-+-+-+-+-+-+-+
|      pos_y       |      pos_z       |        X         |
|    (4 bytes)     |    (4 bytes)     |    (4 bytes)     |
+-+-+-+-+-+-+-+-+-+-+-+-+-+-+-+-+-+-+-+-+-+-+-+-+-+-+-+-+-+-+-+-+
|        Y         |        Z         |        H         |
|    (4 bytes)     |    (4 bytes)     |    (4 bytes)     |
+-+-+-+-+-+-+-+-+-+-+-+-+-+-+-+-+-+
|        V         |
|    (4 bytes)     |
+-+-+-+-+-+-+-+-+-+-+
```

For semantics of the foregoing parameters, refer to the foregoing descriptions. Details are not described herein again.

Particularly, the information that is carried in the video content sent by the server to the client and that assists the client in displaying may include one of or any combination of a viewpoint position, a viewport direction, and a field of viewport size that correspond to the video content.

It should be understood that the client sends the information to the server, and the server may not carry the information corresponding to the video in this embodiment.

After receiving the request from the client, the server generates the video content, and encodes and encapsulates the video content into the RTMP message. The message header carries at least one type of information such as a viewpoint position, a viewport direction, a field of viewport size, a relative viewpoint position change value, a relative viewport direction change value, a relative viewport size change value, a viewpoint change speed, a viewport direction change speed, a viewpoint change acceleration, a viewport direction change acceleration, an eyeball gaze direction, an eyeball gaze direction change value, an eyeball gaze direction change speed, and an eyeball gaze direction change acceleration; and may further include an identifier id (pose_id) corresponding to the information.

The foregoing information may be carried in the chunk header of the RTMP message. For example, the foregoing information is carried in a message header of a type 0 (the foregoing information may be carried in a message header of any one of types 0, 1, 2, and 3, and the following is merely an example). A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            timestamp          |        message length         |
+-+-+-+-+-+-+-+-+-+-+-+-+-+-+-+-+-+-+-+-+-+-+-+-+-+-+-+-+-+-+-+-+
|   message length (cont)   | message type id | msg stream id   |
+-+-+-+-+-+-+-+-+-+-+-+-+-+-+-+-+-+-+-+-+-+-+-+-+-+-+-+-+-+-+-+-+
|           message stream id (cont)           |     pos_x      |
+-+-+-+-+-+-+-+-+-+-+-+-+-+-+-+-+-+-+-+-+-+-+-+-+-+-+-+-+-+-+-+-+
|      pos_y       |      pos_z       |        X         |
+-+-+-+-+-+-+-+-+-+-+-+-+-+-+-+-+-+-+-+-+-+-+-+-+-+-+-+-+-+-+-+-+
|        Y         |        Z         |        H         |
+-+-+-+-+-+-+-+-+-+-+-+-+-+-+-+-+-+-+-+-+-+-+-+-+-+-+-+-+-+-+-+-+
|        V         |   pos_x_delta    |    pos_y_delta   |
+-+-+-+-+-+-+-+-+-+-+-+-+-+-+-+-+-+-+-+-+-+-+-+-+-+-+-+-+-+-+-+-+
|   pos_z_delta    |     X_delta      |     Y_delta      |
+-+-+-+-+-+-+-+-+-+-+-+-+-+-+-+-+-+-+-+-+-+-+-+-+-+-+-+-+-+-+-+-+
|     Z_delta      |     H_delta      |     V_delta      |
+-+-+-+-+-+-+-+-+-+-+-+-+-+-+-+-+-+-+-+-+-+-+-+-+-+-+-+-+-+-+-+-+
|   pos_x_sped     |    pos_y_sped    |    pos_z_sped    |
+-+-+-+-+-+-+-+-+-+-+-+-+-+-+-+-+-+-+-+-+-+-+-+-+-+-+-+-+-+-+-+-+
|     X_sped       |     Y_sped       |     Z_sped       |
+-+-+-+-+-+-+-+-+-+-+-+-+-+-+-+-+-+-+-+-+-+-+-+-+-+-+-+-+-+-+-+-+
|   pos_x_accel    |   pos_y_accel    |   pos_z_accel    |
+-+-+-+-+-+-+-+-+-+-+-+-+-+-+-+-+-+-+-+-+-+-+-+-+-+-+-+-+-+-+-+-+
|     X_accel      |     Y_accel      |     Z_accel      |
+-+-+-+-+-+-+-+-+-+-+-+-+-+-+-+-+-+-+-+-+-+-+-+-+-+-+-+-+-+-+-+-+
|     eye_X        |     eye_Y        |     eye_Z        |
+-+-+-+-+-+-+-+-+-+-+-+-+-+-+-+-+-+-+-+-+-+-+-+-+-+-+-+-+-+-+-+-+
|   eye_X_delta    |   eye_Y_delta    |   eye_Z_delta    |
+-+-+-+-+-+-+-+-+-+-+-+-+-+-+-+-+-+-+-+-+-+-+-+-+-+-+-+-+-+-+-+-+
|    eye_X_sped    |    eye_Y_sped    |   eye_Z_sped     |
+-+-+-+-+-+-+-+-+-+-+-+-+-+-+-+-+-+-+-+-+-+-+-+-+-+-+-+-+-+-+-+-+
|   eye_X_accel    |   eye_X_accel    |   eye_Z_accel    |
+-+-+-+-+-+-+-+-+-+-+-+-+-+-+-+-+-+-+-+-+-+-+-+-+-+-+-+-+-+-+-+-+
|    pose_id       |
+-+-+-+-+-+-+-+-+-+-+
```

For semantics of related fields, refer to the foregoing descriptions. Details are not described herein again.

The information that is carried in the video content sent by the server to the client and that assists the client in displaying may include one of or any combination of a plurality of the following information such as a viewpoint position, a viewport direction, a field of viewport size, a relative viewpoint position change value, a relative viewport direction change value, and a relative viewport size change value that correspond to the video content, an eyeball gaze direction corresponding to video content (an eyeball gaze direction corresponding to video content generated based on the eyeball gaze direction), and an eyeball gaze direction change value; and may further include identification id information (pose_id) corresponding to the video content.

It should be understood that only the client may carry information, but the server does not need to carry the information.

It should be understood that information sent between the client and the server may be carried in a header of one or more chunks of types 0, 1, 2, and 3, or in a part of information added to a chunk header.

After receiving the request from the client, the server generates the video content, and encodes and encapsulates the video content. A message header Message Header of a type 0 carries a viewpoint position, a viewport direction, and a field of viewport that correspond to the video content. For example, the information is carried in the header Message Header of the type 0 (the foregoing information may be carried in a message header of any one of types 0, 1, 2, and 3, and the following is merely an example). A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            timestamp          |        message length         |
+-+-+-+-+-+-+-+-+-+-+-+-+-+-+-+-+-+-+-+-+-+-+-+-+-+-+-+-+-+-+-+-+
|   message length (cont)   | message type id | msg stream id   |
+-+-+-+-+-+-+-+-+-+-+-+-+-+-+-+-+-+-+-+-+-+-+-+-+-+-+-+-+-+-+-+-+
|           message stream id (cont)           |     pos_x      |
+-+-+-+-+-+-+-+-+-+-+-+-+-+-+-+-+-+-+-+-+-+-+-+-+-+-+-+-+-+-+-+-+
|      pos_y       |      pos_z       |        X         |
+-+-+-+-+-+-+-+-+-+-+-+-+-+-+-+-+-+-+-+-+-+-+-+-+-+-+-+-+-+-+-+-+
|        Y         |        Z         |        H         |
+-+-+-+-+-+-+-+-+-+-+-+-+-+-+-+-+-+-+-+-+-+-+-+-+-+-+-+-+-+-+-+-+
|        V         |
+-+-+-+-+-+-+-+-+-+-+
```

For semantics of related fields, refer to the foregoing descriptions. Details are not described herein again.

The information may be carried in a message header of the type 1. A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            timestamp delta            |    message length     |
+-+-+-+-+-+-+-+-+-+-+-+-+-+-+-+-+-+-+-+-+-+-+-+-+-+-+-+-+-+-+-+-+
|   message length (cont)   |message type id|       pos_x       |
+-+-+-+-+-+-+-+-+-+-+-+-+-+-+-+-+-+-+-+-+-+-+-+-+-+-+-+-+-+-+-+-+
|      pos_y        |      pos_z        |         X             |
+-+-+-+-+-+-+-+-+-+-+-+-+-+-+-+-+-+-+-+-+-+-+-+-+-+-+-+-+-+-+-+-+
|       Y           |        Z          |         H             |
+-+-+-+-+-+-+-+-+-+-+-+-+-+-+-+-+-+-+-+-+-+-+-+-+-+-+-+-+-+-+-+-+
|       V           |
+-+-+-+-+-+-+-+-+-+-+
```

Alternatively, the information may be carried in a message header of the type 2. A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|            timestamp delta            |        pos_x          |
+-+-+-+-+-+-+-+-+-+-+-+-+-+-+-+-+-+-+-+-+-+-+-+-+-+-+-+-+-+-+-+-+
|      pos_y        |      pos_z        |         X             |
+-+-+-+-+-+-+-+-+-+-+-+-+-+-+-+-+-+-+-+-+-+-+-+-+-+-+-+-+-+-+-+-+
|       Y           |        Z          |         H             |
+-+-+-+-+-+-+-+-+-+-+-+-+-+-+-+-+-+-+-+-+-+-+-+-+-+-+-+-+-+-+-+-+
|       V           |
+-+-+-+-+-+-+-+-+-+-+
```

Alternatively, the information may alternatively be directly carried and transmitted as a message header of the type 3.

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|      pos_x        |      pos_y        |       pos_z           |
+-+-+-+-+-+-+-+-+-+-+-+-+-+-+-+-+-+-+-+-+-+-+-+-+-+-+-+-+-+-+-+-+
|        X          |        Y          |         Z             |
+-+-+-+-+-+-+-+-+-+-+-+-+-+-+-+-+-+-+-+-+-+-+-+-+-+-+-+-+-+-+-+-+
|        H          |        V          |
+-+-+-+-+-+-+-+-+-+-+-+-+-+-+-+-+-+-+-+-+
```

A chunk header includes the following three parts:

Information exchanged between the client and the server may be carried in FOV_info. A carrying manner is as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|    pos_x          |      pos_y        |       pos_z           |
+-+-+-+-+-+-+-+-+-+-+-+-+-+-+-+-+-+-+-+-+-+-+-+-+-+-+-+-+-+-+-+-+
|      X            |        Y          |         Z             |
+-+-+-+-+-+-+-+-+-+-+-+-+-+-+-+-+-+-+-+-+-+-+-+-+-+-+-+-+-+-+-+-+
|      H            |        V          |
+-+-+-+-+-+-+-+-+-+-+-+-+-+-+-+-+-+-+-+-+
```

For semantics of related fields, refer to the foregoing descriptions. Details are not described herein again.

NetStream defines a channel through which audio, a video, and a data message flow on NetConnection used for a connection between the client and the server. One NetConnection object supports a plurality of NetStreams to be used for a plurality of data streams. Commands that can be sent from the client to the server through NetStream are as follows (the command may also be an RTMP message):

play play2 deleteStream closeStream receiveAudio receiveVideo publish usr_info_feedback seek pause The client sends the command usr_info_feedback to request the server to generate multimedia content based on information carried in the command. A structure of the command sent by the client to the server is as follows:

```
+---------------+-----------------+------------------------+------------------+
| Basic Header  | Message Header  |   Extended Timestamp   |   Chunk Data     |
+---------------+-----------------+------------------------+------------------+
|                                                          |
|<--------------------- Chunk Header --------------------->|
```

A part may alternatively be added to the chunk header.

```
+---------------+-----------------+------------------------+---------------+---------------
|
-+
| Basic Header  | Message Header  |   Extended Timestamp   |   FOV info    |  Chunk Data
|
                +---------------+-----------------+------------------------+---------------+---------------
|
-+
|                                                                          |
|<-------------------         Chunk Header          ------------------    >|
```

| Field Name | Type | Description |
|---|---|---|
| Command Name | String | The command name is set to "usr_info_feedback" |
| Transaction ID | Number | A traction ID is 0 |
| Command Object | Null | If command information does not exist, the command is set to null. |
| usr ID | String | Client name (which is applicable to a plurality of clients) |
| yaw/azimuth | Number | Azimuth or yaw angle |
| pitch/elevation | Number | Pitch or elevation angle |
| roll/tilt | Number | Tilt angle (tilt) or roll angle |
| x | Number | Coordinate information of a spatial position |
| y | Number | Coordinate information of a spatial position |
| z | Number | Coordinate information of a spatial position |
| FOV_H | Number | Azimuth range of VR spherical coordinates, a value of a width pixel quantity of a two-dimensional picture |
| FOV_V | Number | Pitch or elevation range of VR spherical coordinates, a value of a height pixel quantity of a two-dimensional picture |
| yaw_sped/ azimuth_sped | Number | Azimuth or yaw change speed |
| pitch_sped / elevation_sped | Number | Pitch or elevation change speed |
| roll_sped / tilt_sped | Number | Tilt angle (tilt) or roll change speed |
| x_sped | Number | Coordinate change speed of a spatial position |
| y_sped | Number | Coordinate change speed of a spatial position |

```
|                                                                                              |
| z_sped     | Number  |  Coordinate change speed of a spatial position                        |
|                                                                                              |
```

In the foregoing parameters, parameters related to an azimuth, a yaw, a pitch or elevation angle, a tilt angle (tilt), or a roll are used to describe information about the current viewport. Parameters related to a spatial position are used to describe information about the current viewpoint. For specific descriptions, refer to the foregoing descriptions. Details are not described herein again.

A file/segment transmission mode is used in the AVS immersive media system standard; consequently, requirements of a low-delay transmission platform cannot be met. Therefore, the embodiments provide a framework of a low-delay transmission based system.

Figure 13A:
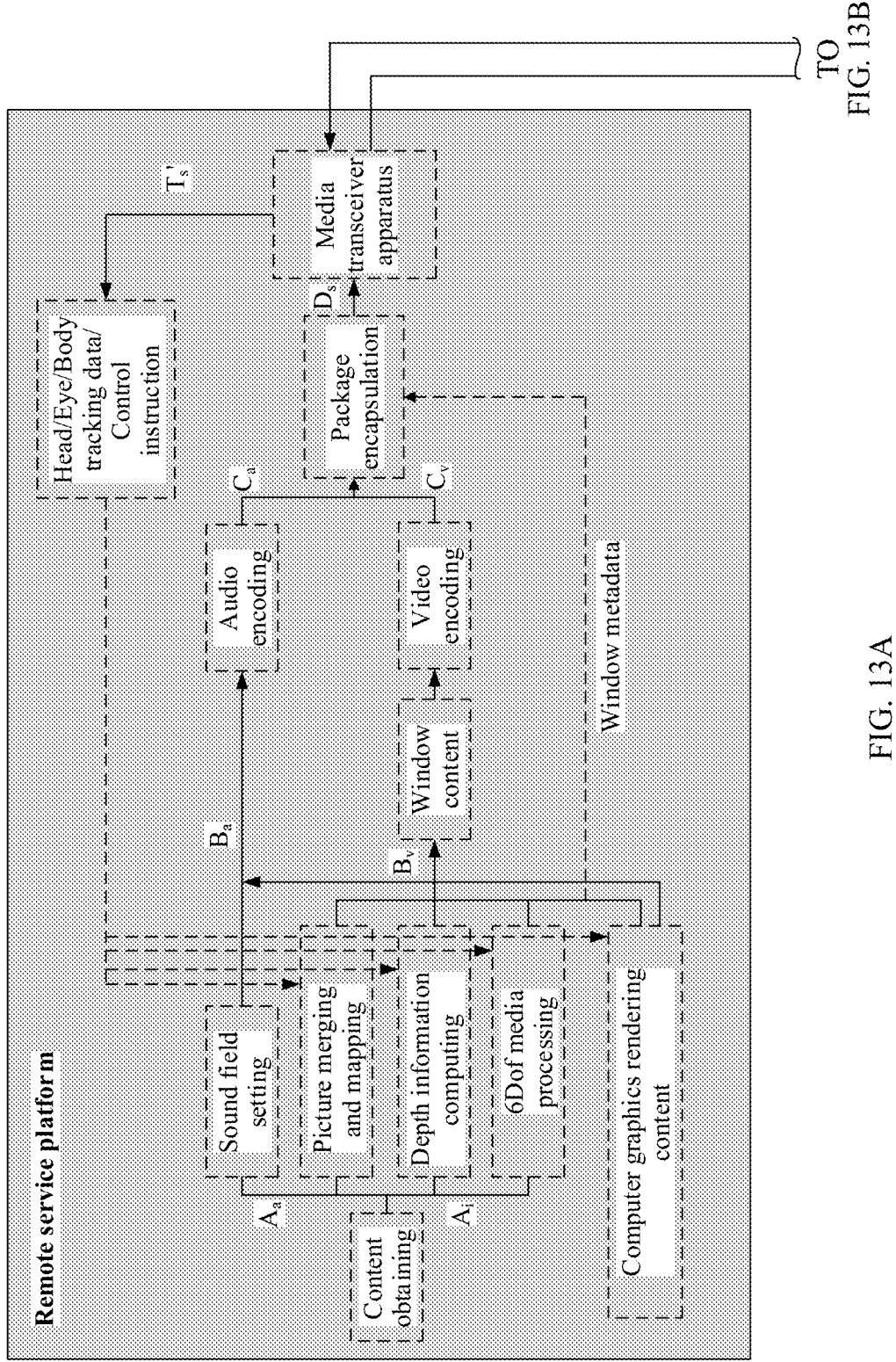
FIG. 13A and FIG. 13B are a schematic diagram of an AVS-I architecture of a low-delay transmission system.
Figure 13B:
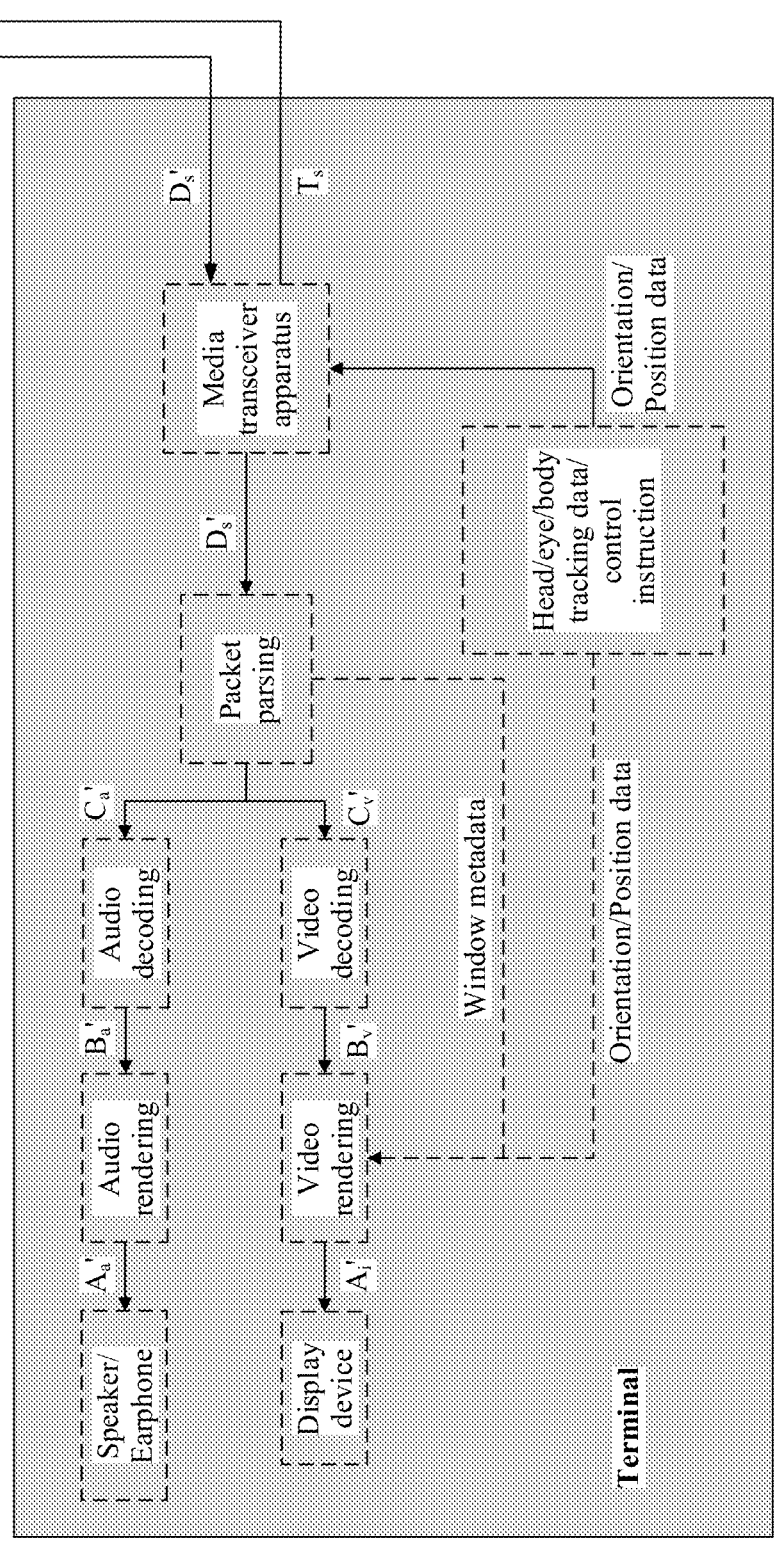

FIG. 13A and FIG. 13B show a typical architecture of an immersive media system based on low-delay transmission. A sound-visual scenario ($A_a$, $A_i$) in a real world is collected by using an audio sensor, a camera device (a common camera, a stereo camera, or a light field camera), and a sensing device (a lidar), or virtual content is calculated or rendered by a computer to obtain digital audio and video signals. The obtained digital audio signal ($B_a$) is sent to an audio encoder for encoding, to generate an audio bitstream ($C_a$). In addition, the server performs, based on the obtained digital video signal by using head/eye/body tracking data or a control instruction ($T_s'$) fed back by a terminal, to generate viewport-based window content ($B_v$), and sends the viewport-based window content to a video encoder for real-time encoding, to generate a video bitstream ($C_v$). The audio bitstream and the video bitstream that are obtained after encoding, and window metadata corresponding to the window content are encapsulated by packet, to obtain a media packet stream ($D_s$) suitable for real-time transmission, and the media packet stream is transmitted to the terminal. The window metadata is data used to describe a window content attribute or used to assist in window content presentation, and includes orientation/position/field-of-view data corresponding to a window, and the like.

A media packet is transmitted to a user terminal by using a real-time transmission mechanism (for example, RTP). In a terminal system, a media packet stream transmitted by a server in real time is parsed by packet to obtain an audio bitstream (Ca'), a video bitstream (Cv'), and window metadata. The audio bitstream and the video bitstream are decoded separately to obtain audio and video decoded data (Ba', Bv'). The audio data is rendered by an audio renderer. The video data is window content. Head/eye/body tracking data or a control instruction of a user and the window metadata that are collected in real time based on a sensing apparatus are rendered, and played on the terminal. The head/eye/body tracking data or the control instruction of the user that is collected in real time is reversely transmitted and fed back to the server for generating the window content.

Feasibly, the system is a client reference model of a low-delay transmission system for application of immersive media. Functional components of the client are mainly specified in FIG. 4.

Figure 14:
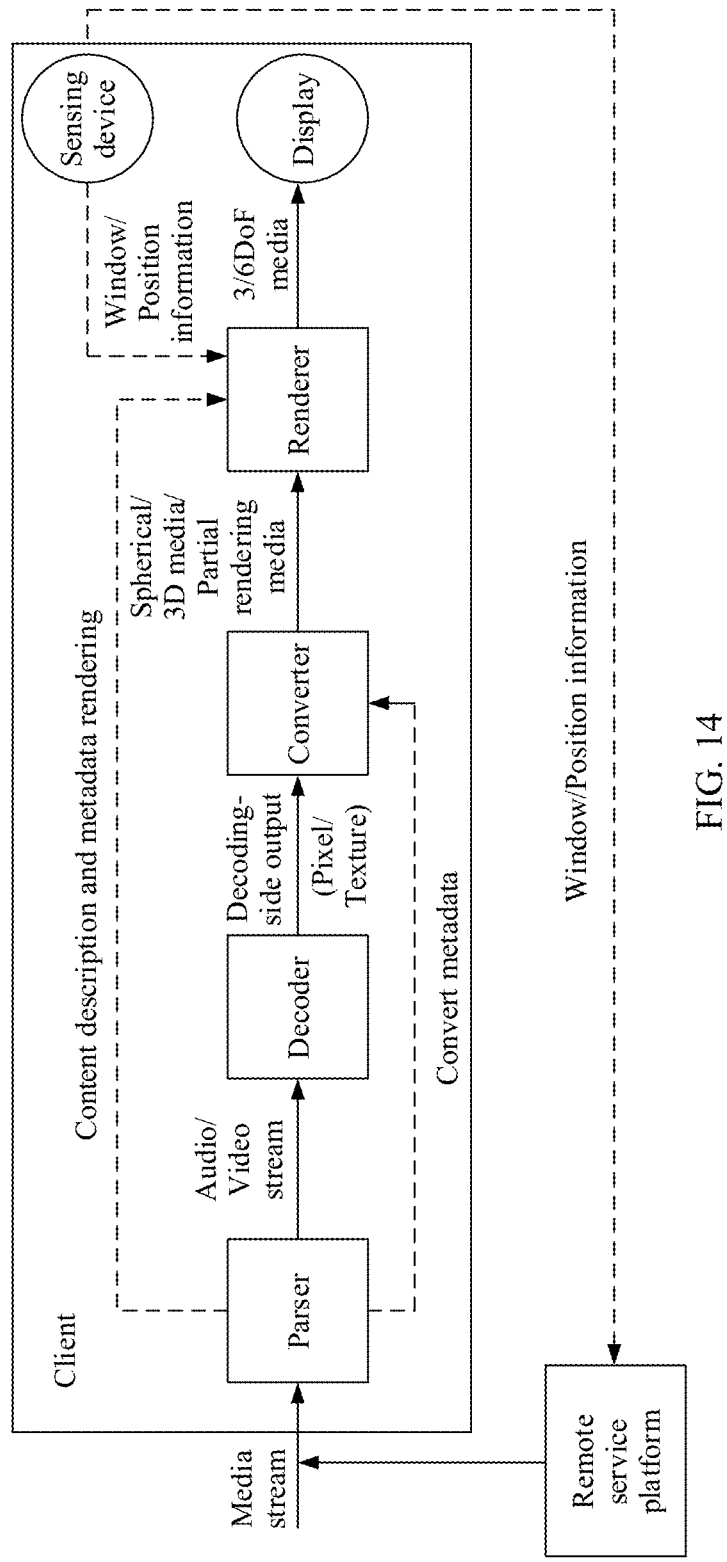
FIG. 14 is a schematic diagram of a client reference model of a low-delay AVS-I transmission system.

In the client reference model, shown in FIG. 14, of the low-delay transmission system, window/position information obtained by a sensing apparatus is fed back to a remote service platform, and the platform renders window content based on the window/position information or window metadata in a data packet, and sends rendered window content to a client. A media stream received by the client from the remote service platform passes through a parser, a decoder, a converter, and a renderer, and is rendered.

Figure 10:
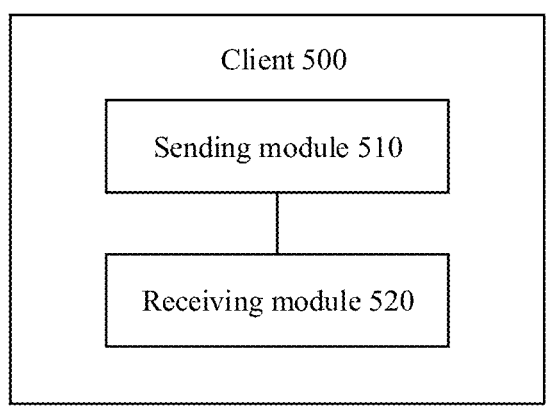
FIG. 10 is a schematic block diagram of a client according to an embodiment of this application.

FIG. 10 is a schematic block diagram of a client according to an embodiment of this application. The client 500 shown in FIG. 10 includes a sending module 510 and a receiving module 520.

The sending module 510 and the receiving module 520 of the client 500 may perform the steps in the methods shown in FIG. 1 and FIG. 2.

When the client 500 performs the method shown in FIG. 1, specific functions of the sending module 510 and the receiving module 520 are as follows:

The sending module 510 is configured to send first information to a server. The first information is used to indicate spatial information of a region in which a first target video picture is located, and the first target video picture includes a video picture within a current viewport.

The receiving module 520 is configured to receive video data packets that correspond to a second target video picture and that are sent by the server. The second target video picture includes the first target video picture, at least one of the video data packets corresponding to the second target video picture jointly carries second information, and the second information is used to indicate spatial information of a region in which the second target video picture is located.

When the client 500 performs the method shown in FIG. 2, specific functions of the sending module 510 and the receiving module 520 are as follows:

The receiving module 510 is configured to receive a description file sent by the server. The description file carries session description information of at least two sessions, the at least two sessions are sessions between the client and the server, each of the at least two sessions is used to transmit bitstream data of a sub-regional picture corresponding to the session, the session description information includes spatial information of a sub-region corresponding to the bitstream data of the sub-regional picture that is transmitted by using each session, the sub-region is obtained by dividing a region in which a panoramic video picture is located, and the sub-regional picture is a video picture in a sub-region.

The sending module 520 is configured to send first information to the server. The first information is used to indicate a session corresponding to a sub-region covered by a current viewport, and the first information is determined based on the current viewport and the session description information.

The receiving module 510 is further configured to receive bitstream data of a target video picture, where the bitstream data of the target video picture is sent by the server. The target video picture includes a video picture in the sub-region covered by the current viewport.

Figure 11:
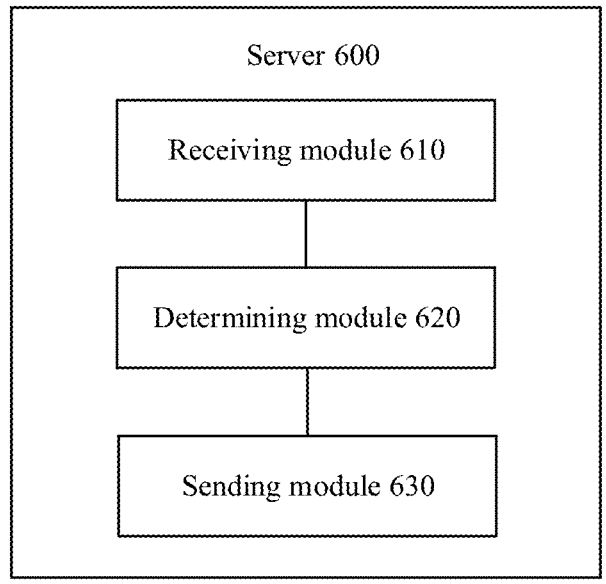
FIG. 11 is a schematic block diagram of a server according to an embodiment of this application.

FIG. 11 is a schematic block diagram of a server according to an embodiment of this application. The server 600 shown in FIG. 11 includes a receiving module 610, a determining module 620, and a sending module 630.

The receiving module 610, the determining module 620, and the sending module 630 of the server 600 may perform the steps in the methods shown in FIG. 3 and FIG. 4.

When the server 600 performs the method shown in FIG. 3, specific functions of the receiving module 610, the determining module 620, and the sending module 630 are as follows:

The receiving module 610 is configured to receive first information sent by a client. The first information is used to indicate a spatial position of a region in which a first target video picture is located, and the first target video picture includes a video picture within a current viewport.

The determining module 620 is configured to determine a second target video picture based on the first information. The second target video picture includes the first target video picture.

The sending module 630 is configured to send, video data packets corresponding to the second target video picture. At least one of the video data packets corresponding to the second target video picture jointly carries second information, and the second information is used to indicate spatial information of a region in which the second target video picture is located.

It should be understood that, when the server 600 performs the method shown in FIG. 4, only the receiving module 610 and the sending module 630 need to be used. Specific functions of the receiving module 610 and the sending module 630 are as follows:

The sending module 630 is configured to send a description file to a client. The description file carries session description information of at least two sessions, the at least two sessions are sessions between the client and the server, each of the at least two sessions is used to transmit bitstream data of a sub-regional picture corresponding to the session, the session description information includes spatial information of a sub-region corresponding to the bitstream data of the sub-regional picture that is transmitted by using each session, the sub-region is obtained by dividing a region in which a panoramic video picture is located, and the sub-regional picture is a video picture in a sub-region.

The receiving module 610 is configured to receive first information sent by the client. The first information is used to indicate a session corresponding to a sub-region covered by a current viewport, and the first information is determined based on the current viewport and the session description information.

The sending module 630 is further configured to send bitstream data of a target video picture to the client. The target video picture includes a video picture in the sub-region covered by the current viewport.

Figure 12:
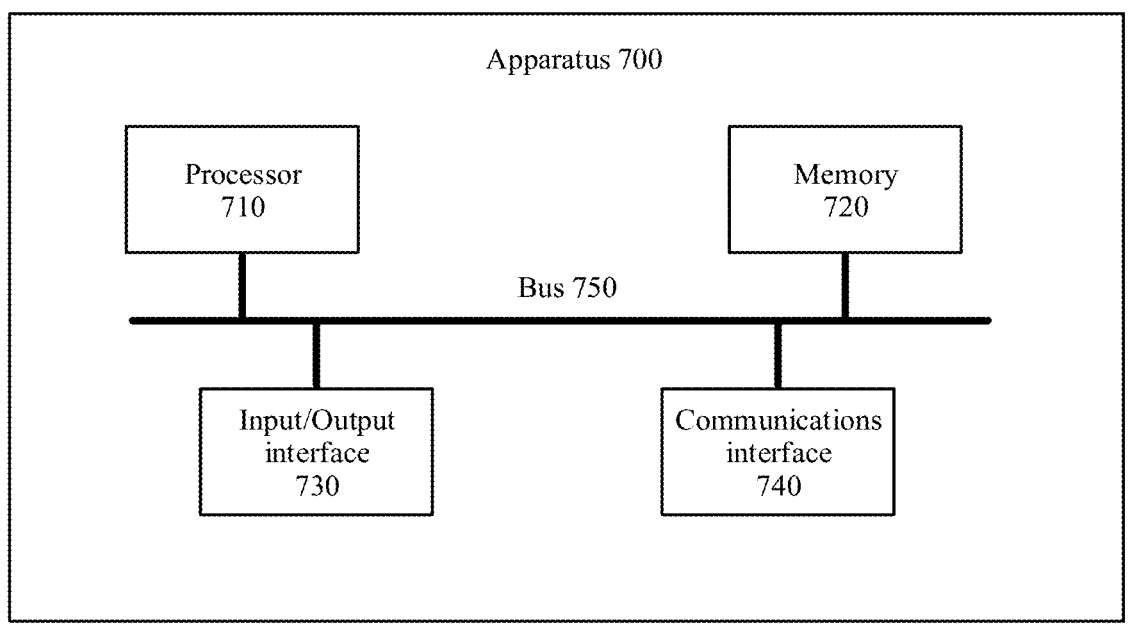
FIG. 12 is a schematic structural diagram of hardware of a media data transmission apparatus according to an embodiment of this application.

FIG. 12 is a schematic structural diagram of hardware of a media data transmission apparatus according to an embodiment of this application. The apparatus 700 shown in FIG. 12 may be considered as a computer device, and the apparatus 700 may be an implementation of the client 500 or the server 600 in the embodiments of this application, or may be an implementation of the media data transmission method in the embodiments of this application. The apparatus 700 includes a processor 710, a memory 720, an input/output interface 730, and a bus 750; and may further include a communications interface 740. Communications connections between the processor 710, the memory 720, the input/output interface 730, and the communications interface 740 are implemented through the bus 750.

The processor 710 may be a general-purpose central processing unit (CPU), a microprocessor, an application-specific integrated circuit (ASIC), or one or more integrated circuits. The processor 710 is configured to execute related programs to implement functions that need to be executed by the modules of the client or the server in the embodiments of this application, or to perform the media data transmission method in the method embodiments of this application. The processor 710 may be an integrated circuit chip and has a signal processing capability. In an implementation process, the steps in the foregoing methods can be implemented by using a hardware integrated logical circuit in the processor 710, or by using instructions in a form of software. The processor 710 may be a general-purpose processor, a digital signal processor (DSP), an ASIC, a field-programmable gate array (FPGA) or another programmable logical device, a discrete gate or transistor logic device, or a discrete hardware component; and can implement or perform the methods, steps, and logical block diagrams disclosed in the embodiments of this application. The general-purpose processor may be a microprocessor, or the processor may be any conventional processor or the like. The steps in the methods disclosed with reference to the embodiments of this application may be directly performed and completed by using a hardware decoding processor, or may be performed and completed by using a combination of hardware and software modules in a decoding processor. A software module may be located in a storage medium mature in the art, such as a random access memory, a flash memory, a read-only memory, a programmable read-only memory, an electrically erasable programmable memory, or a register. The storage medium is located in the memory 720. The processor 710 reads information in the memory 720; and completes, in combination with hardware of the processor 710, functions that need to be implemented by the modules included in the client or the server in the embodiments of this application, or performs the media data transmission method in the method embodiments of this application.

The memory 720 may be a read-only memory (ROM), a static storage device, a dynamic storage device, or a random access memory (RAM). The memory 720 may store an operating system and another application program. When the functions that need to be implemented by the modules included in the client or the server in the embodiments of this application or the media data transmission method in the method embodiments of this application is implemented by using software or firmware, program code used to implement the technical solutions provided in the embodiments of this application is stored in the memory 720, and the processor 710 performs the operations that need to be performed by the modules included in the client or the server or performs the media data transmission method in the method embodiments of this application.

The input/output interface 730 is configured to receive input data and information, and output data such as an operation result.

The communications interface 740 uses a transceiver apparatus, for example, but not limited to, a transceiver, to implement communication between the apparatus 700 and another device or a communications network. The communications interface 704 may be used as an obtaining module or a sending module in a processing apparatus.

The bus 750 may include a path, for transmitting information between the components (for example, the processor 710, the memory 720, the input/output interface 730, and the communications interface 740) of the apparatus 700.

It should be noted that, although only the processor 710, the memory 720, the input/output interface 730, the communications interface 740, and the bus 750 of the apparatus 700 are shown in FIG. 12, in a specific implementation process, a person skilled in the art should understand that the apparatus 700 further includes another device required for implementing normal running, for example, may further include a display configured to display to-be-played video data. In addition, based on a specific requirement, a person skilled in the art should understand that the apparatus 700 may further include hardware components for implementing other additional functions. In addition, a person skilled in the art should understand that the apparatus 700 may include only components required for implementing the embodiments of this application, but does not need to include all the components shown in FIG. 12.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or a part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes any medium that can store program code, such as a USB flash drive, a removable hard disk, a read-only memory (ROM), a random access memory (rRAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A media data transmission method, comprising:
   sending, by a client, first information to a server, wherein the first information is used to indicate spatial information of a region in which a first target video picture is located, and the first target video picture comprises a video picture within a current viewport;
   sending, by the client, second indication information to the server, wherein the second indication information comprises a second identifier, a value of the second identifier is used to indicate composition information of the spatial information of the current viewport, and the value of the second identifier is used to indicate at least one of the following cases:
   when the second identifier is a third value, the spatial information of the current viewport comprises viewport direction information of the current viewport;
   when the second identifier is a fourth value, the spatial information of the current viewport comprises the viewport direction information of the current viewport and position information of a viewpoint at which the current viewport is located; and
   when the second identifier is a fifth value, the spatial information of the current viewport comprises the viewport direction information of the current viewport, the position information of the viewpoint at which the current viewport is located, and viewport size information of the current viewport; and
   receiving, by the client, video data packets that correspond to a second target video picture and that are sent by the server, wherein the second target video picture comprises the first target video picture, at least one of the video data packets corresponding to the second target video picture jointly carries second information, and the second information is used to indicate spatial information of a region in which the second target video picture is located.

2. The method according to claim 1, wherein the first target video picture is the video picture within the current viewport, and the first information comprises spatial information of the current viewport.

3. The method according to claim 2, wherein the method further comprises:
   sending, by the client, first viewpoint information to the server, wherein the first viewpoint information is used to indicate a current viewpoint at which the current viewport is located.

4. The method according to claim 3, wherein the first viewpoint information comprises at least one of spatial position information of the current viewpoint, position change speed information of the current viewpoint, and acceleration information of a position change speed of the current viewpoint.

5. The method according to claim 3, wherein the first viewpoint information comprises spatial position information of the current viewpoint, and the method further comprises:
sending, by the client, first indication information to the server, wherein the first indication information comprises a first identifier, and a value of the first identifier is used to indicate whether the spatial position information of the current viewpoint is relative spatial position information or absolute spatial position information; and
when the first identifier is a first value, the spatial position information of the current viewpoint is relative spatial position information; and
when the first identifier is a second value, the spatial position information of the current viewpoint is absolute spatial position information.

6. The method according to claim 1, wherein a panoramic video picture comprises at least two sub-regions obtained by dividing the panoramic video picture, the current viewport covers at least one sub-region, the first information is used to indicate the sub-region covered by the current viewport, and the sub-region covered by the current viewport is merged to obtain the region in which the first target video picture is located.

7. The method according to claim 1, wherein the second information comprises the spatial information of the region in which the second target video picture is located.

8. The method according to claim 1, wherein a panoramic video picture comprises the at least two sub-regions obtained by dividing the panoramic video picture, the current viewport covers at least one sub-region, the second information is used to indicate a sub-region covered by the second target video picture, and the sub-region covered by the second target video picture is merged to obtain the region in which the second target video picture is located.

9. The method according to claim 8, wherein the second information comprises at least one piece of third information, each of the at least one video data packet carries third information, the at least one video data packet jointly carries the at least one piece of third information, and third information carried in any one of the at least one video data packet is used to indicate a sub-region to which a video picture corresponding to the any one video data packet belongs.

10. The method according to claim 1, wherein the at least one video data packet comprises a video data packet that carries a viewport identifier.

11. The method according to claim 1, wherein the method further comprises:
receiving, by the client, a description file sent by the server, wherein the description file carries first viewport information or second viewport information, the first viewport information is used to indicate a maximum region range that is of a viewport and that is supported by the server, and the second viewport information is used to indicate a region range of an initial viewport.

12. The method according to claim 11, wherein when the description file carries the second viewport information, the description file further carries third viewport information, wherein the third viewport information is further used to indicate a spatial position of the initial viewport.

13. The method according to claim 1, wherein the method further comprises:
receiving, by the client, a description file sent by the server, wherein a panoramic video picture comprises at least two sub-regions obtained by dividing the panoramic video picture, the description file carries sub-region description information of each sub-region, and the sub-region description information comprises spatial information of a sub-region.

14. The method according to claim 13, wherein the sub-region description information comprises spatial information of each sub-region on a plane, the sub-region description information further comprises mapping-type information of a video picture in each sub-region, and spatial information of each sub-region on a sphere is determined based on the mapping-type information and the spatial information of the sub-region on the plane.

15. The method according to claim 13, wherein the sub-region description information comprises spatial information of each sub-region on a sphere, and the sub-region description information further comprises shape information of each sub-region.

16. The method according to claim 1, wherein the at least one video data packet jointly carries second viewpoint information, and the second viewpoint information is used to indicate a viewpoint corresponding to the second target video picture.

17. A media data transmission method, comprising:
receiving, by a server, first information and second indication information sent by a client, wherein the first information is used to indicate a spatial position of a region in which a first target video picture is located, and the first target video picture comprises a video picture within a current viewport, wherein the second indication information comprises a second identifier, a value of the second identifier is used to indicate composition information of the spatial information of the current viewport, and the value of the second identifier is used to indicate at least one of the following cases;
when the second identifier is a third value, the spatial information of the current viewport comprises viewport direction information of the current viewport;
when the second identifier is a fourth value, the spatial information of the current viewport comprises the viewport direction information of the current viewport and position information of a viewpoint at which the current viewport is located; and
when the second identifier is a fifth value, the spatial information of the current viewport comprises the viewport direction information of the current viewport, the position information of the viewpoint at which the current viewport is located, and viewport size information of the current viewport;
determining, by the server, a second target video picture based on the first information, wherein the second target video picture comprises the first target video picture; and
sending, by the server to the client, video data packets corresponding to the second target video picture, wherein at least one of the video data packets corresponding to the second target video picture jointly carries second information, and the second information is used to indicate spatial information of a region in which the second target video picture is located.

18. A client, comprising:
a transceiver, configured to:
send first information to a server, wherein the first information is used to indicate spatial information of a region in which a first target video picture is located, and the first target video picture comprises a video picture within a current viewport;
send second indication information to the server, wherein the second indication information comprises a second identifier, a value of the second identifier is used to indicate composition information of the spatial information of the current viewport, and the value of the second identifier is used to indicate at least one of the following cases;
when the second identifier is a third value, the spatial information of the current viewport comprises viewport direction information of the current viewport;
when the second identifier is a fourth value, the spatial information of the current viewport comprises the viewport direction information of the current viewport and position information of a viewpoint at which the current viewport is located; and
when the second identifier is a fifth value, the spatial information of the current viewport comprises the viewport direction information of the current viewport, the position information of the viewpoint at which the current viewport is located, and viewport size information of the current viewport; and
receive video data packets that correspond to a second target video picture and that are sent by the server, wherein the second target video picture comprises the first target video picture, at least one of the video data packets corresponding to the second target video picture jointly carries second information, and the second information is used to indicate spatial information of a region in which the second target video picture is located.

19. A server, comprising:
a transceiver, configured to receive first information and second indication information sent by a client, wherein the first information is used to indicate a spatial position of a region in which a first target video picture is located, and the first target video picture comprises a video picture within a current viewport, wherein the second indication information comprises a second identifier, a value of the second identifier is used to indicate composition information of the spatial information of the current viewport, and the value of the second identifier is used to indicate at least one of the following cases;
when the second identifier is a third value, the spatial information of the current viewport comprises viewport direction information of the current viewport;
when the second identifier is a fourth value, the spatial information of the current viewport comprises the viewport direction information of the current viewport and position information of a viewpoint at which the current viewport is located; and
when the second identifier is a fifth value, the spatial information of the current viewport comprises the viewport direction information of the current viewport, the position information of the viewpoint at which the current viewport is located, and viewport size information of the current viewport;
a processor, configured to determine a second target video picture based on the first information, wherein the second target video picture comprises the first target video picture; and
the transceiver is further configured to send, to the client, video data packets corresponding to the second target video picture, wherein at least one of the video data packets corresponding to the second target video picture jointly carries second information, and the second information is used to indicate spatial information of a region in which the second target video picture is located.

* * * * *

UNITED STATES PATENT AND TRADEMARK OFFICE
CERTIFICATE OF CORRECTION

PATENT NO. : 11,368,729 B2
APPLICATION NO. : 17/164838
DATED : June 21, 2022
INVENTOR(S) : Fang et al.

It is certified that error appears in the above-identified patent and that said Letters Patent is hereby corrected as shown below:

In the Claims

Claim 17: Column 102, Line 42: "is used to indicate at least one of the following cases;" should read -- is used to indicate at least one of the following cases: --.

Claim 18: Column 103, Line 14: "following cases;" should read -- following cases: --.

Claim 19: Column 104, Line 13: "following cases;" should read -- following cases: --.

Signed and Sealed this
Twenty-fifth Day of October, 2022

Katherine Kelly Vidal
*Director of the United States Patent and Trademark Office*